US012684055B1

(12) United States Patent
Sibbesen et al.

(10) Patent No.: US 12,684,055 B1
(45) Date of Patent: Jul. 14, 2026

(54) PORTABLE ELECTRONIC DEVICE CASE MODULAR FOLIO STAND SYSTEM

(71) Applicant: Pioneer Square Brands, Inc., High Point, NC (US)

(72) Inventors: Soren Sibbesen, Jamestown, NC (US); Brian Lewis Piper, Seattle, WA (US); Quentin Wade Forbes, Winston Salem, NC (US); Richard Kennedy, Antioch, TN (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/433,814

(22) Filed: Dec. 27, 2025

Related U.S. Application Data

(60) Provisional application No. 63/789,384, filed on Apr. 15, 2025.

(51) Int. Cl.
H04M 1/02 (2006.01)
(52) U.S. Cl.
CPC ................................. H04M 1/0203 (2025.01)
(58) Field of Classification Search
CPC ...... H04M 1/0203; H04M 1/04; H04M 1/185; H04M 1/0216; H04M 1/021; H04M 1/02;

H04M 1/0268; H04B 1/3888; G06F 1/1656; G06F 1/1626; G06F 1/166; G06F 1/181; G06F 1/1681; G06F 1/1632; G06F 1/1675
See application file for complete search history.

(56) References Cited

U.S. PATENT DOCUMENTS

| | | | | |
|---|---|---|---|---|
| 11,029,728 B1 * | 6/2021 | Ferren et al. | ........ | A45C 11/003 |
| 11,294,426 B1 * | 4/2022 | Piper | .................... | G06F 1/1669 |
| 2017/0005689 A1 * | 1/2017 | Smith | .................... | B32B 37/14 |

* cited by examiner

*Primary Examiner* — Jing Gao

(74) *Attorney, Agent, or Firm* — Grandview Law

(57) ABSTRACT

This application relates to a modular device enclosure including a frame assembly, stand assembly, trim member, and a tablet-shaped electronic device. The frame includes side portions, flange portions, recessed structures, and stand-offs that enable precise positioning and retention of the stand assembly. The stand assembly includes sidewalls, a coupling structure with tab members and apertures, and a front interface with a keypad and trackpad. A trim member includes boss members for coupling with the stand assembly and is positioned to conceal and protect coupling features. A tablet-shaped electronic device may be received within the frame and cooperate with the stand assembly and trim. Exploded and assembled views illustrate the configuration in open and closed orientations. In various implementations, the assemblies are tool-less, positionally indexed, and designed to accommodate tactile input and electronic interface with a touch-sensitive display.

20 Claims, 62 Drawing Sheets

30d

30e1

30c

30

30e

30a

30e2

30b

10

10a

10

70

10

40e

PORTABLE ELECTRONIC DEVICE CASE MODULAR FOLIO STAND SYSTEM

In one or more aspects a case system for a portable electronic device including I. a frame assembly including: A. side portions each having a flange portion, B. a recessed structure defined by end portions, a back portion, and a base portion, C. a standoff plurality including standoffs extending upward from the base portion, D. a tab plurality including tabs positioned between the standoffs, and E. an edge portion along the recessed structure; and II. a stand assembly including: A. side portions, B. a coupling structure having a first aperture plurality arranged to receive the standoff plurality and a second aperture plurality arranged to receive the tab plurality, C. a front portion including front panel portions separated by front crease portions, and D. a back portion including back panel portions separated by back crease portions, wherein the frame assembly is couplable with the portable electronic device, and wherein the stand assembly is removably coupled to the recessed structure via the coupling structure and is retained in the recessed structure by the standoff plurality and the tab plurality.

Implementations include a trim assembly, wherein the trim assembly includes side portions defining an outer surface having boss members arranged to engage selected standoffs of the standoff plurality, and wherein the standoff plurality is positioned on the base portion adjacent the edge portion.

In implementations the tabs of the tab plurality are positioned between adjacent standoffs of the standoff plurality.

In implementations the flange portions extend inward over the recessed structure.

In implementations the boss members of the trim assembly are dimensioned to engage a pair of the standoffs.

In implementations the front panel portions and the back panel portions are foldable about the front crease portions and the back crease portions.

In implementations the coupling structure and the recessed structure are configured for removable engagement.

In implementations the portable electronic device has a display exposed through the frame assembly.

In one or more aspects a case system for a portable electronic device including I. a frame assembly having a recessed structure including a standoff plurality and a tab plurality; and II. a stand assembly having a coupling structure with a first aperture plurality arranged to receive the standoff plurality and a second aperture plurality arranged to receive the tab plurality, wherein the frame assembly is couplable with the frame assembly, and wherein the stand assembly is removably coupled to the recessed structure by engagement of the standoff plurality and the tab plurality with the first aperture plurality and the second aperture plurality.

Implementations include a trim assembly coupled to the frame assembly by engagement of boss members with the standoff plurality.

In implementations the stand assembly includes the front portion and the back portion foldable along the front crease portions and the back crease portions.

In implementations the tabs of the tab plurality are positioned between adjacent standoffs of the standoff plurality.

In implementations the standoff plurality includes standoffs located along the base portion of the recessed structure.

In implementations the portable electronic device has a display exposed through the frame assembly.

In one or more aspects a case system for a portable electronic device, the system including I. a frame assembly including a recessed structure having a base portion, a standoff plurality extending from the base portion, and a tab plurality positioned relative to the standoff plurality; II. a stand assembly including a coupling structure with apertures dimensioned for engagement with the standoff plurality and the tab plurality; and III. a trim assembly including boss members configured to engage selected standoffs of the standoff plurality, wherein the frame assembly is couplable with the portable electronic device, and wherein the stand assembly and the trim assembly are removable from the recessed structure while the portable electronic device remains coupled with the frame assembly.

In implementations the stand assembly includes the front portion and the back portion foldable along the front crease portions and the back crease portions.

In implementations the flange portions of the frame assembly extend inward over the recessed structure.

In implementations the tab plurality is positioned between adjacent standoffs of the standoff plurality.

In implementations the standoff plurality extends upward from the base portion to overlie the coupling structure.

In implementations the coupling structure is seated on the base portion between the standoff plurality and the tab plurality.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Portable Electronic Device Case Modular Folio Stand System, articles of manufacture, compositions of matter for same that may provide context, for instance, in introducing one or more processes and/or devices described herein.

DETAILED DESCRIPTION

Figure 1:
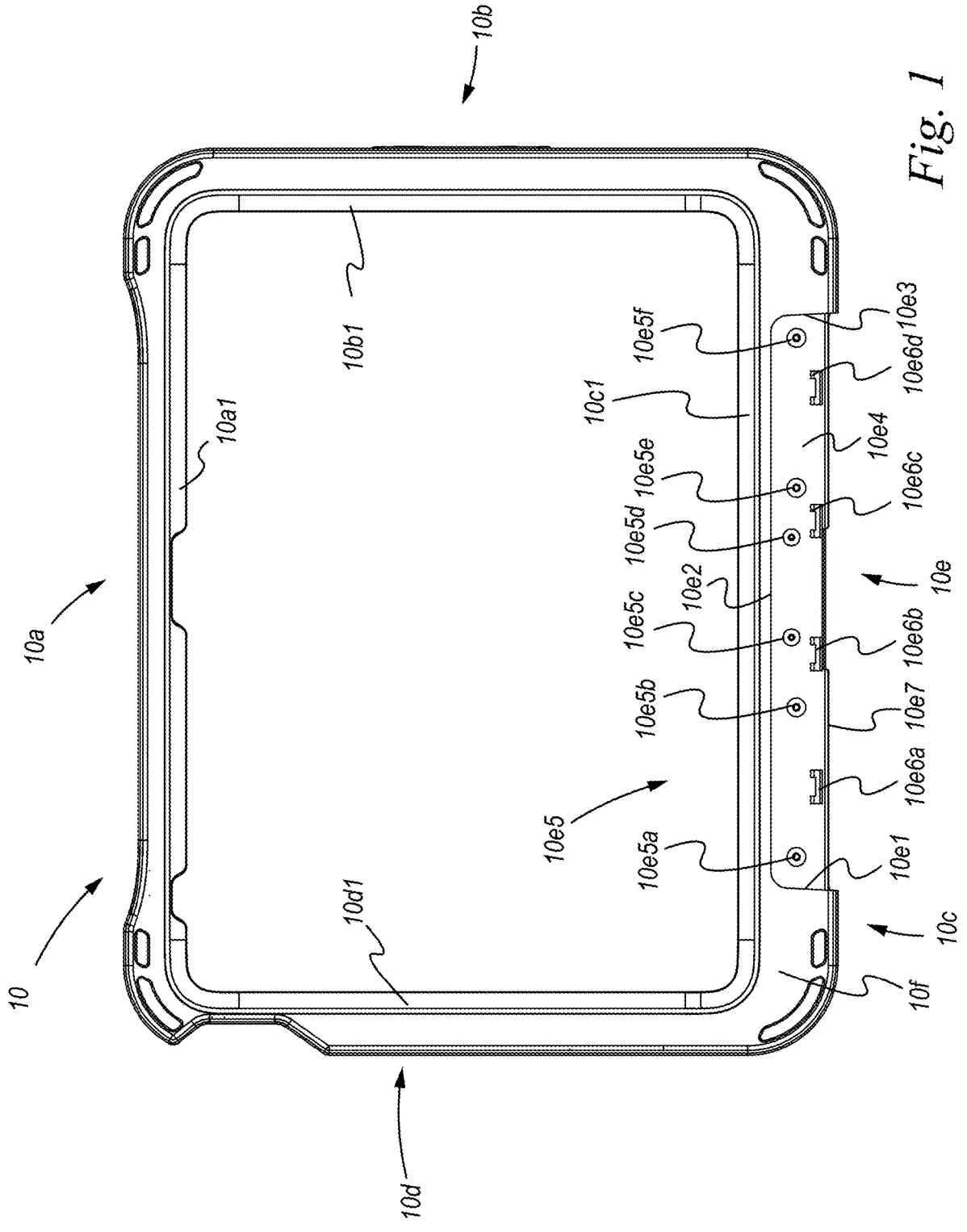
FIG. 1 is a front elevational view of a frame assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front elevational view of frame assembly 10 including side portions 10*a*, 10*b*, 10*c*, and 10*d*, each having corresponding flange portions 10*a*1, 10*b*1, 10*c*1, and 10*d*1 that extend inward toward a central recessed structure 10*e*. Recessed structure 10*e* includes end portions 10*e*1 and 10*e*3, back portion 10*e*2, and base portion 10*e*4, collectively defining a perimeter boundary that receives the stand assembly. Disposed within the recessed structure is standoff plurality 10*e*5 of standoffs 10*e*5*a*-10*e*5*f* and tab plurality 10*e*6 of tabs 10*e*6*a*-10*e*6*d*. The standoffs project upward from base portion 10*e*4, each having a generally cylindrical or rectangular peg structure with a central threaded hole or aperture for screw-type or snap-in coupling. The tabs are spaced between the standoffs and extend vertically or slightly inward, suggesting use as alignment or tension-fit members. Edge portion 10*e*7 runs along a side of the recessed structure to guide insertion or stabilize module coupling. Outer face portion 10*f* defines the front-facing periphery and may include a beveled transition into the recessed region, enabling smooth interfacing with module surfaces.

Frame assembly 10 is configured to receive modules (such as stand assembly described below) within recessed structure 10*e* such that modules are secured by the standoffs 10*e*5*a*-10*e*5*f* and tabs 10*e*6*a*-10*e*6*d*. The standoffs include central threaded holes dimensioned to receive threaded fasteners, facilitating secure coupling of the modules (such as stand assembly described below) to the frame. The tabs may engage side surfaces or edge notches of the modules, preventing undesired lateral motion. The flange portions along side portions 10*a*-10*d* define a partial overhang above the recessed region, which may serve to stabilize trim elements or prevent upward displacement of the coupled modules.

The structural arrangement of recessed structure 10*e*, including base portion 10*e*4 and edge portion 10*e*7, facilitates an interface between the frame and stand that is mechanically secure and laterally constrained. The positioning of the standoffs and tabs supports repeatable attachment and detachment during maintenance or part replacement. The perimeter and layout also allow for alignment with corresponding apertures in the modules (such as stand assembly described below) to form a unified assembly housing a portable electronic device.

Figure 2:
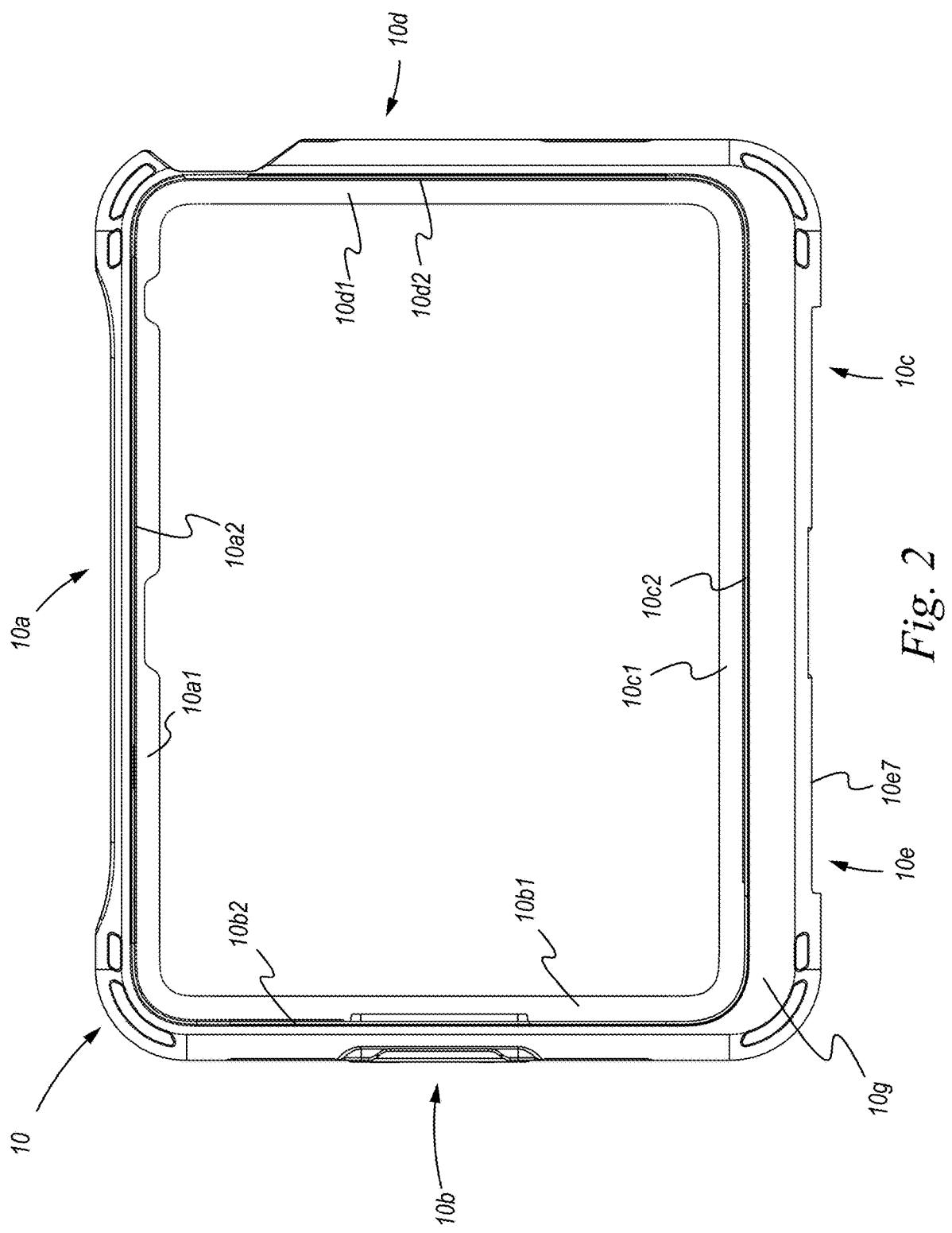
FIG. 2 is a back elevational view of the frame assembly of FIG. 1.

Turning to FIG. 2, depicted therein is a back elevational view of frame assembly 10, showing side portions 10*a*-10*d* from the rear side. Inner wall portions 10*a*2, 10*b*2, 10*c*2, and 10*d*2 are visible along the inside perimeter, forming a downward-facing channel or lip that likely retains the stand or aligns with mating trim elements. Outer face portion 10*g* defines the exterior boundary of the frame's rear surface and may serve to visually or structurally integrate with the trim when assembled. Also visible is the external profile of recessed structure 10*e*, including the back portion 10*e*2 and base portion 10*e*4, which together define a shallow sunken cavity that receives the modules (such as stand assembly described below) while leaving space for coupling hardware such as standoffs and tabs.

The recessed structure 10*e* is designed to interface with both the modules (such as stand assembly described below) and trim members (described below) in a layered configuration. The rear profile shown in this view suggests a housing structure capable of receiving a portable electronic device, within a rear cavity that is defined at least in part by back portion 10*e*2 and inner wall portions 10*a*2-10*d*2. The outer face portion 10*g* may act as a mechanical and cosmetic surface while forming a rigid support frame.

Figure 3:
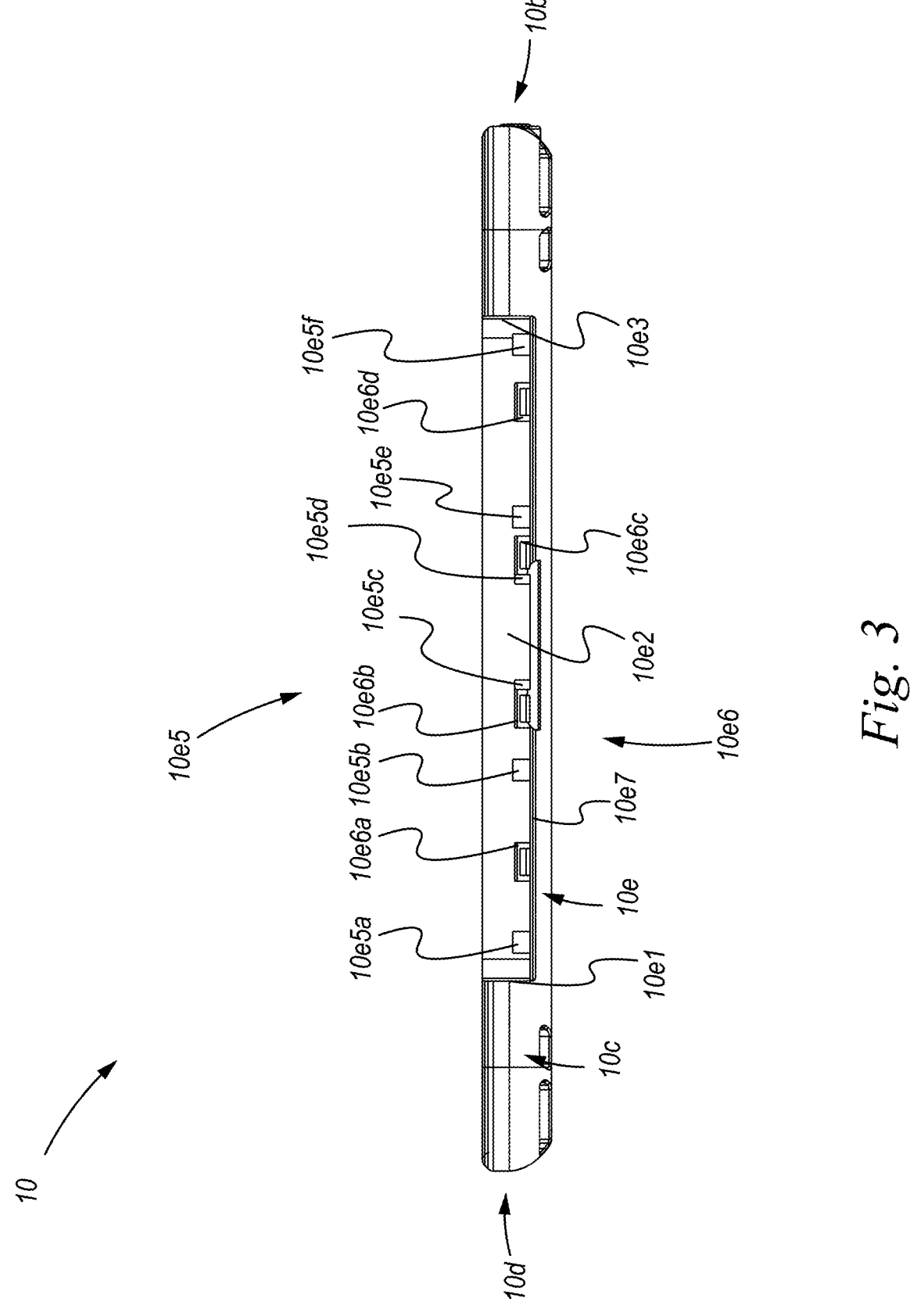
FIG. 3 is a left side elevational view of the frame assembly of FIG. 1.

Turning to FIG. 3, depicted therein is a left side elevational view of frame assembly 10. This side elevational perspective confirms the tiered arrangement of the recessed structure, which together define the mechanical interface between modules and frame assembly 10. The alignment of these components enables stable and repeatable assembly of modules with frame assembly 10.

Figure 4:
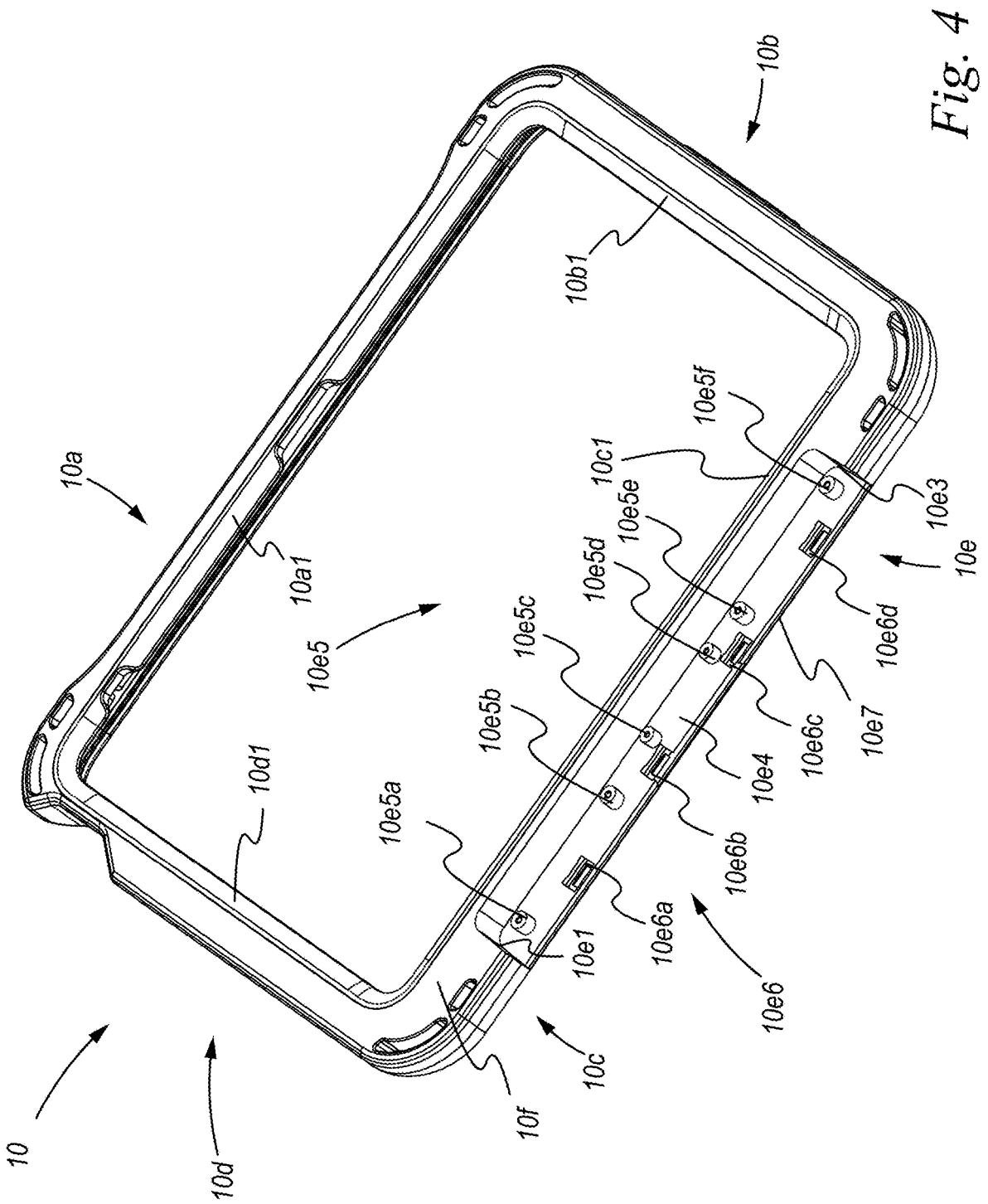
FIG. 4 is a first front perspective view of the frame assembly of FIG. 1.

Turning to FIG. 4, depicted therein is a first front perspective view of frame assembly 10. The recessed structure 10*e* includes end portions 10*e*1 and 10*e*3, a back portion 10*e*2, and a base portion 10*e*4, which together define the sunken compartment designed to receive modules such as (stand assembly described below). Within this base portion 10*e*4, a set of upwardly projecting standoffs 10*e*5*a*-10*e*5*f* are visible. These standoffs are positioned to align with coupling apertures in the modules and may include internal threading or hollow channels for receiving fasteners such as screws. The standoffs appear in a distributed array to provide balanced support and retention across the module surfaces.

Also visible in this view are multiple tabs 10*e*6*a*-10*e*6*d*, which extend vertically from base portion 10*e*4 and are spaced between or adjacent to the standoffs. These tabs are shaped to provide lateral engagement with the modules (such as stand assembly described below), either through frictional fit, compression, or alignment of mating surfaces. The tabs may include chamfered or angled tips to assist in guided insertion of the modules.

Figure 5:
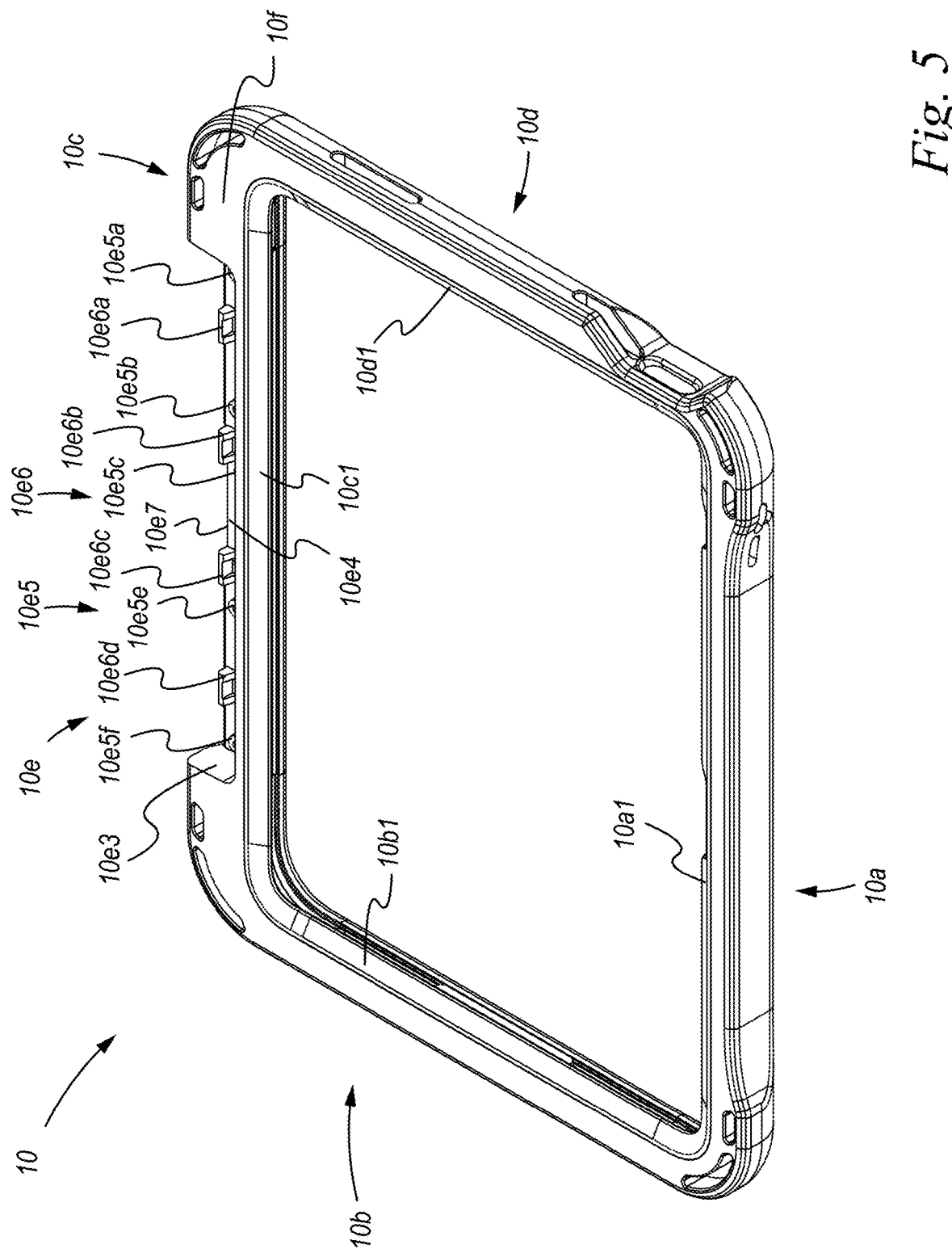
FIG. 5 is a second front perspective view of the frame assembly of FIG. 1.

Turning to FIG. 5, depicted therein is a second front perspective view of frame assembly 10, viewed from an angle complementary to that of FIG. 4. This view further clarifies the geometry and depth of the recessed structure 10*e* and its associated features.

Figure 6:
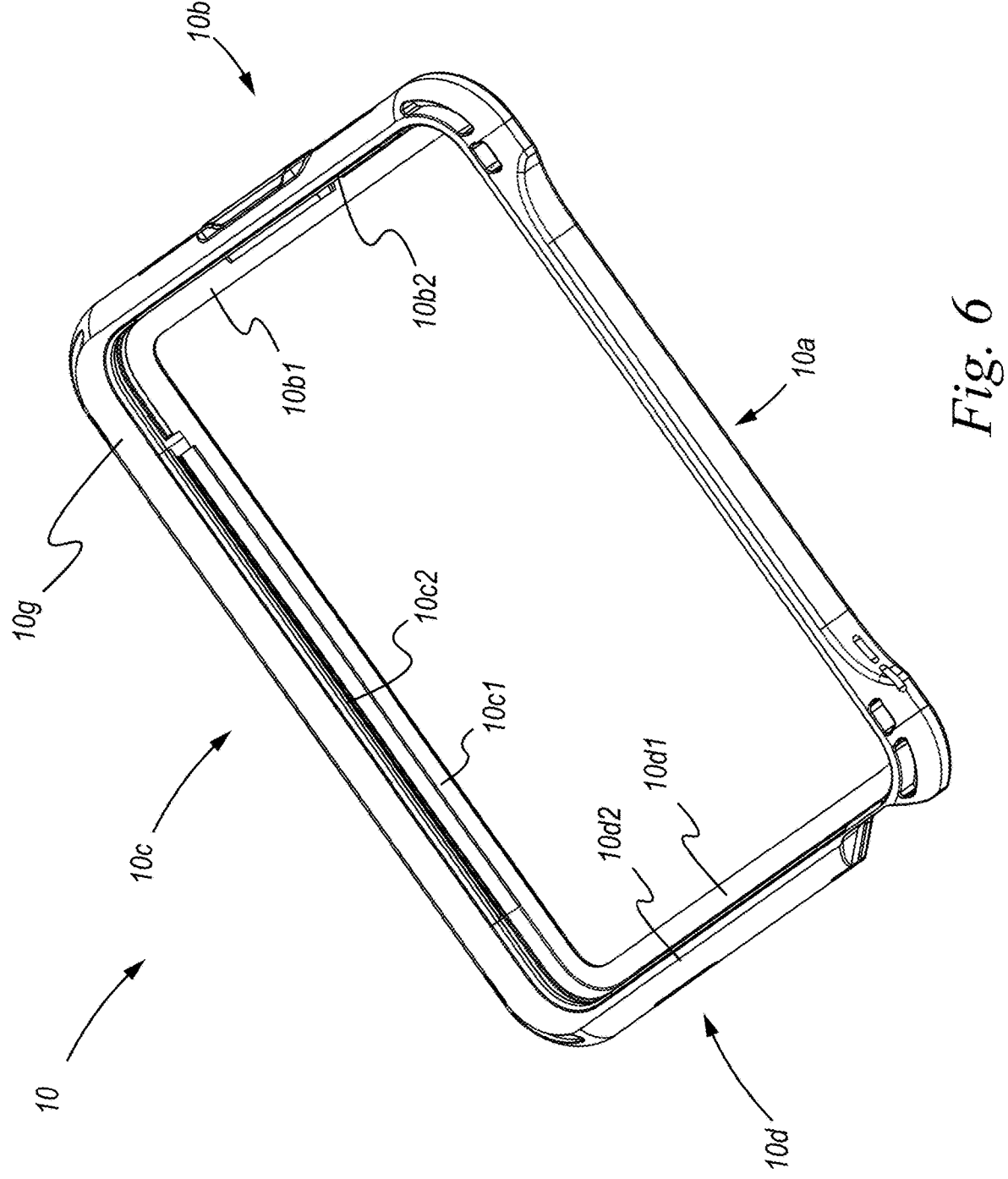
FIG. 6 is a first back perspective view of the frame assembly of FIG. 1.

Turning to FIG. 6, depicted therein is a first back perspective view of frame assembly 10, showing the rear and underside configuration of the assembly. This view helps illustrate the structural relationship between the outer face portion 10*g*, the inner wall portions 10*a*2-10*d*2, and the recessed internal region of the frame assembly that receives a back assembly and portable electronic device described below.

Figure 7:
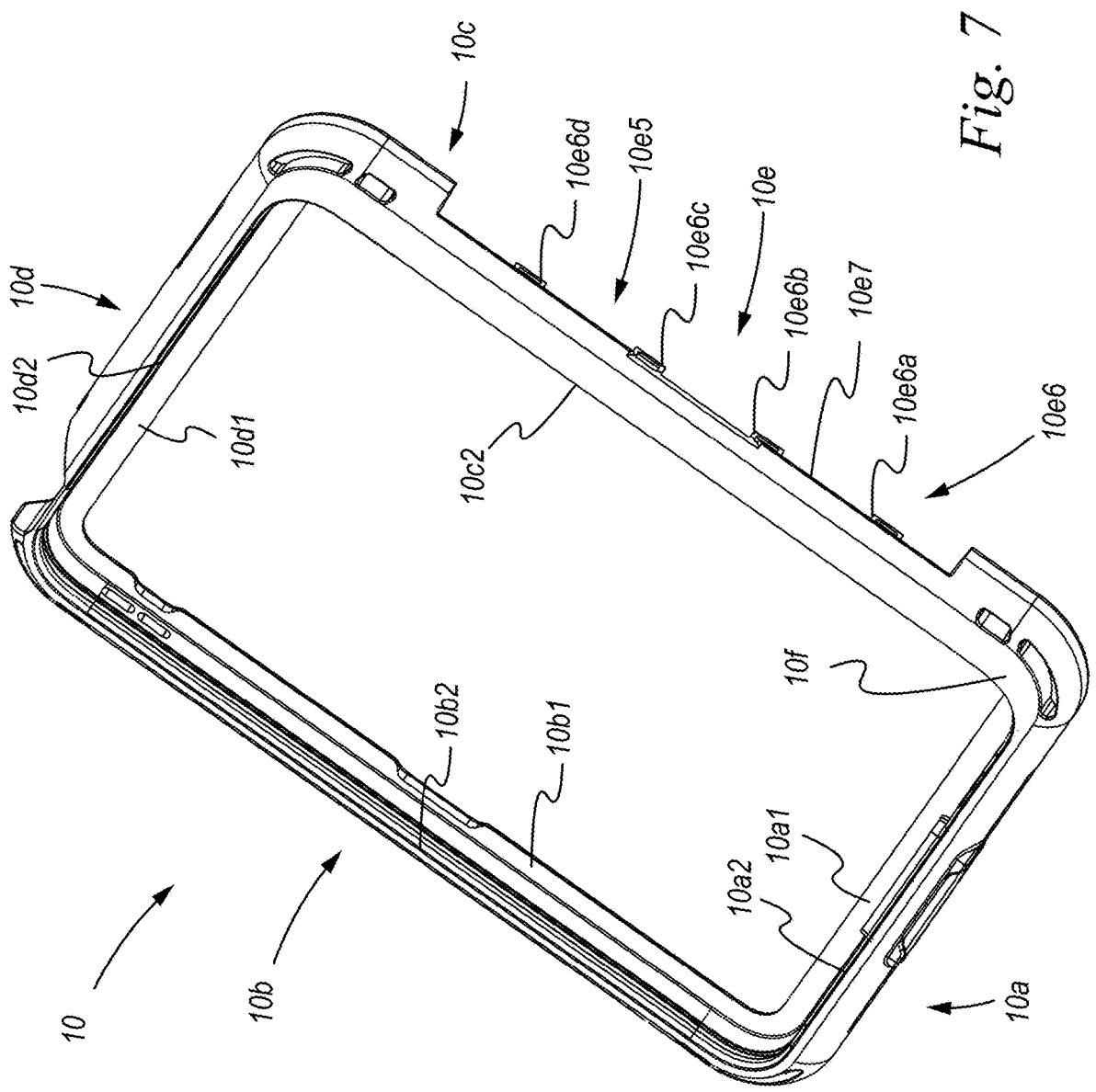
FIG. 7 is a second back perspective view of the frame assembly of FIG. 1.

Turning to FIG. 7, depicted therein is a second back perspective view of frame assembly 10, rotated relative to FIG. 6.

Figure 8:
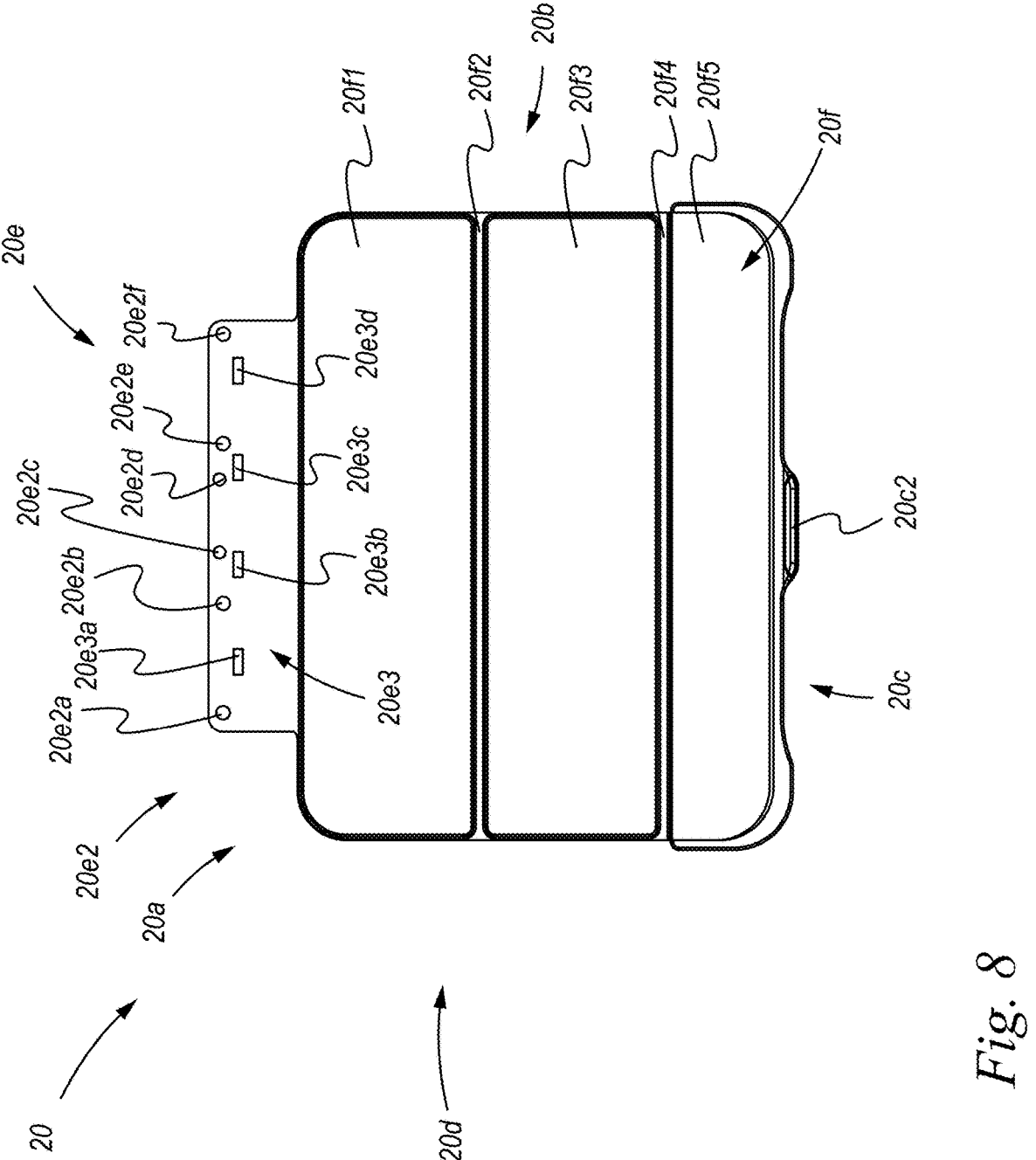
FIG. 8 is a front elevational view of a stand assembly.

Turning to FIG. 8, depicted therein is a front elevational view of stand assembly 20 in an unfolded state. The stand assembly 20 includes four side portions 20*a*, 20*b*, 20*c*, 20*d*, with side portion 20*c* having frame member 20*c*1 and latch member 20*c*2, and arranged in a generally rectangular shape and bounding front portion 20*f* including front panel portion 20*f*1, front crease portion 20*f*2, front panel portion 20*f*3, front crease portion 20*f*4, and front panel portion 20*f*5. Stand assembly 20 further includes coupling structure 20*e* with inner surface 20*e*1, and aperture plurality 20*e*2 including aperture 20*e*2*a*, aperture 20*e*2*b*, aperture 20*e*2*c*, aperture 20*e*2*d*, aperture 20*e*2*e*, and aperture 20*e*2*f*. Coupling structure 20*e* further includes aperture plurality 20*e*3 including aperture 20*e*3*a*, aperture 20*e*3*b*, aperture 20*e*3*c*, and aperture 20*e*3*d*. Aperture pluralities 20*e*2 and 20*e*3 are sized and positioned to couple with standoff plurality 10*e*5 and tab plurality 10*e*6, respectively.

Figure 9:
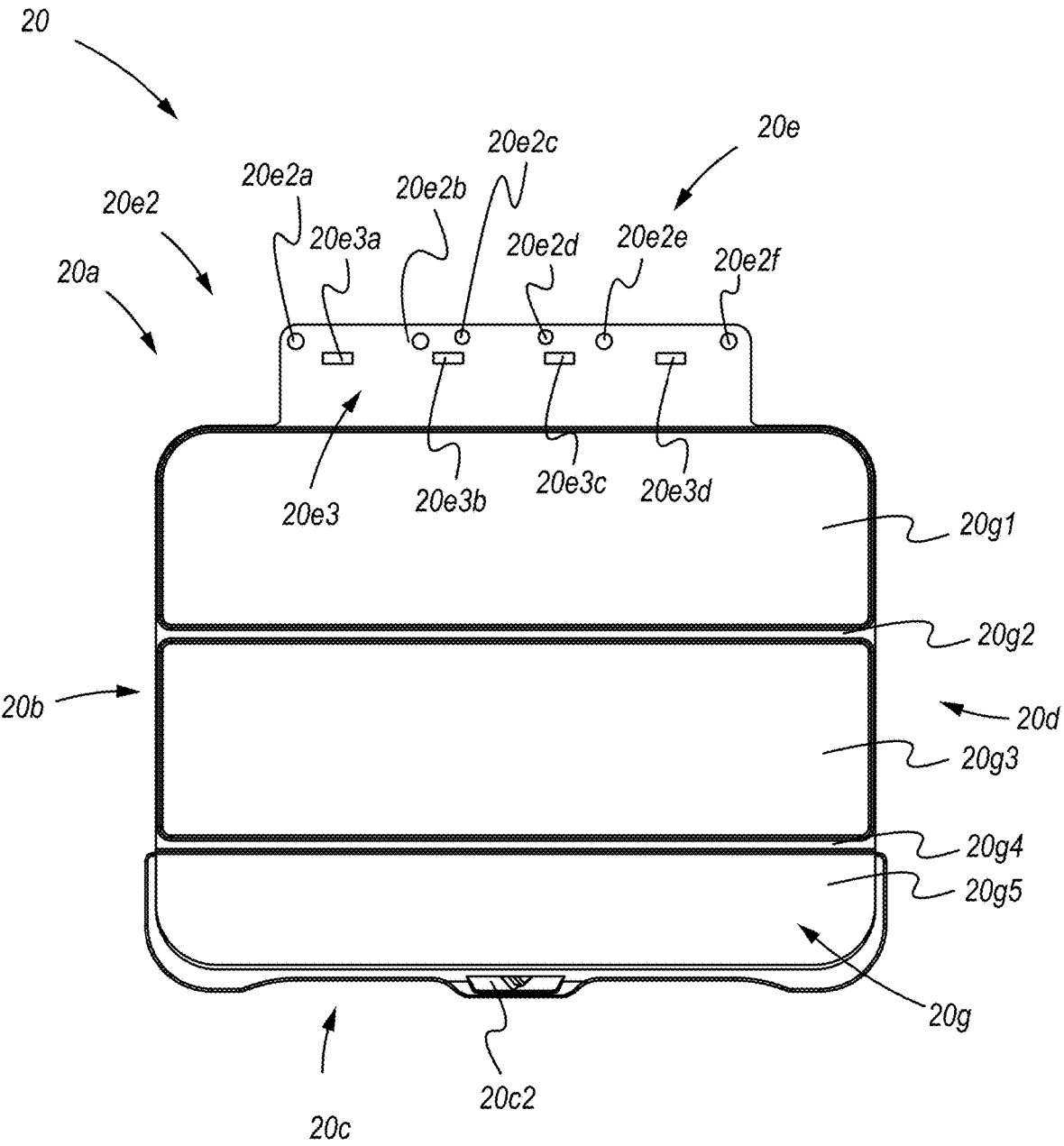
FIG. 9 is a back elevational view of the stand assembly of FIG. 8.

Turning to FIG. 9, depicted therein is a back elevational view of stand assembly 20 shown as unfolded to include back portion 20*g* including back panel portion 20*g*1, back crease portion 20*g*2, back panel portion 20*g*3, back crease portion 20*g*4, and back panel portion 20*g*5.

Figure 10:
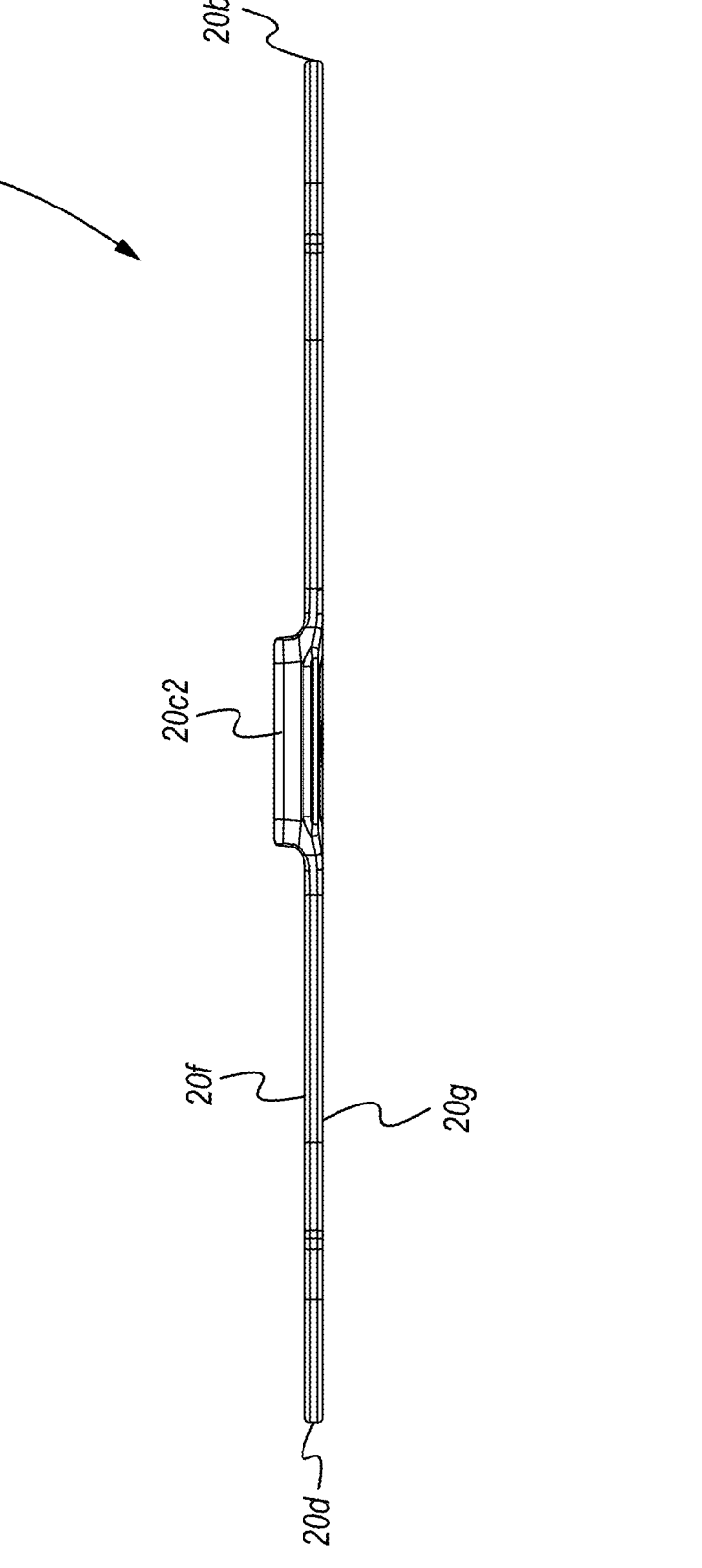
FIG. 10 is a left side elevational view of the stand assembly of FIG. 8.

Turning to FIG. 10, depicted therein is a left side elevational view of stand assembly 20.

Figure 11:
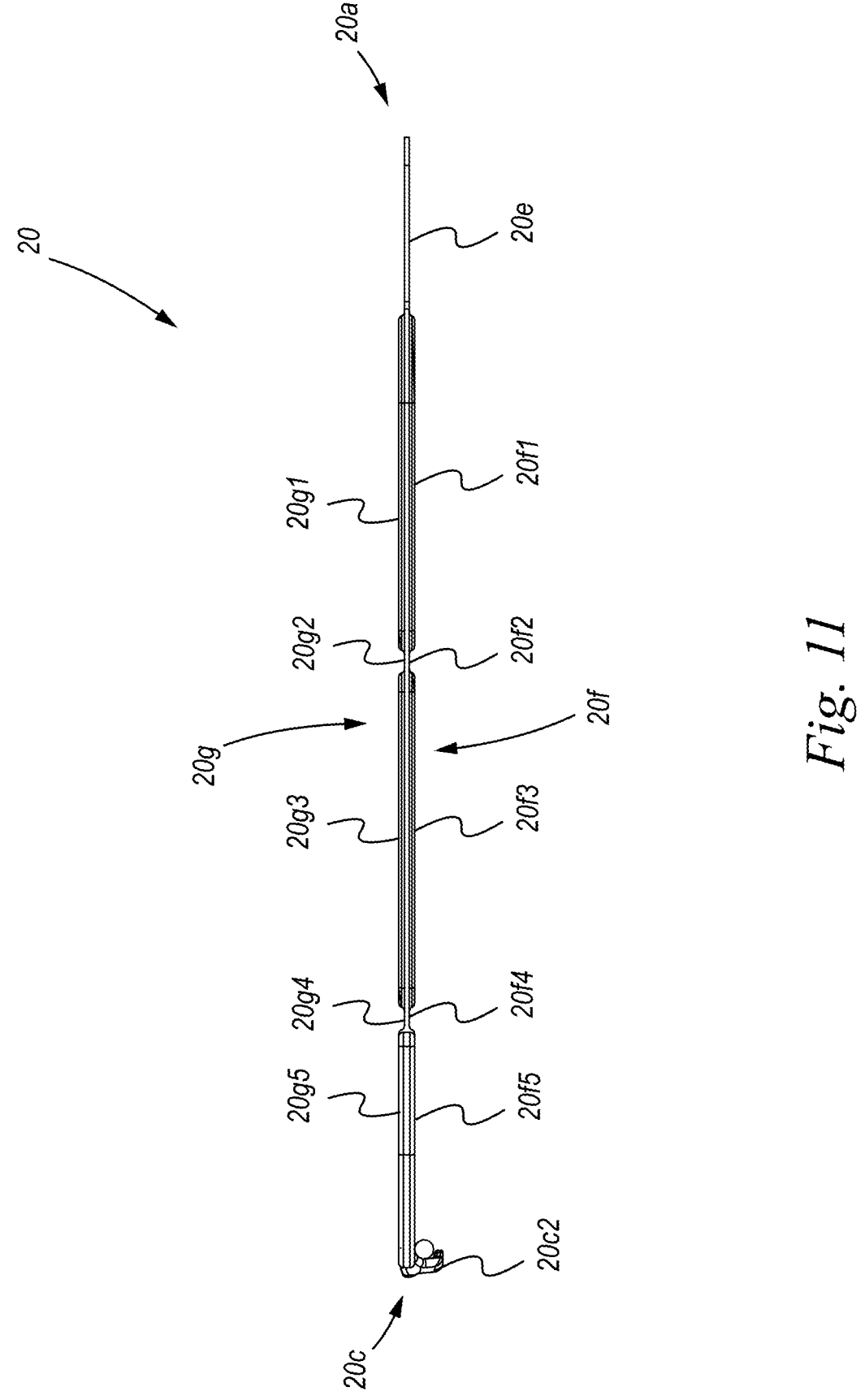
FIG. 11 is a top plan view of the stand assembly of FIG. 8.

Turning to FIG. 11, depicted therein is a top plan view of stand assembly 20.

Figure 12:
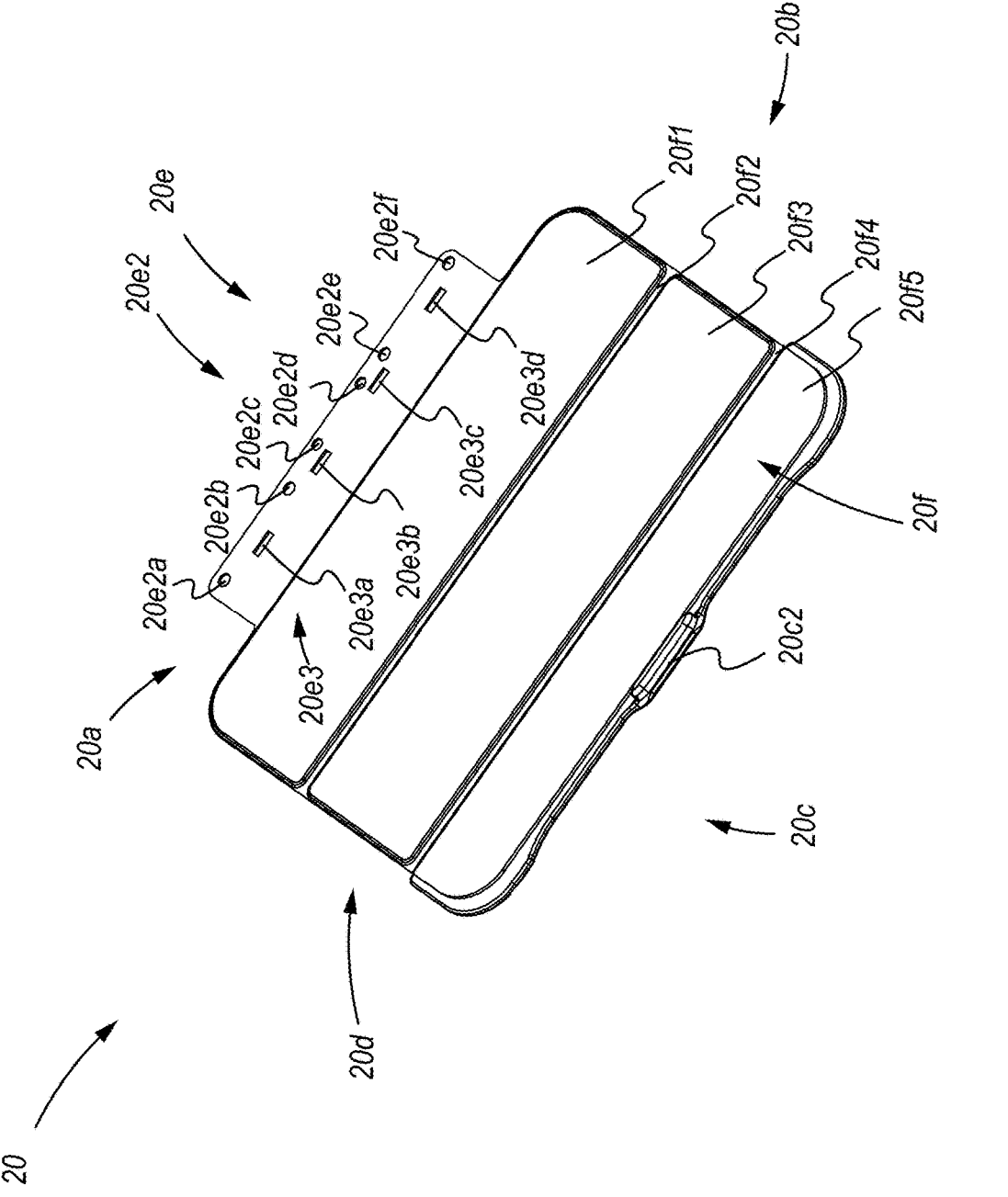
FIG. 12 is a first front perspective view of the stand assembly of FIG. 8.

Turning to FIG. 12, depicted therein is a first front perspective view of stand assembly 20.

Figure 13:
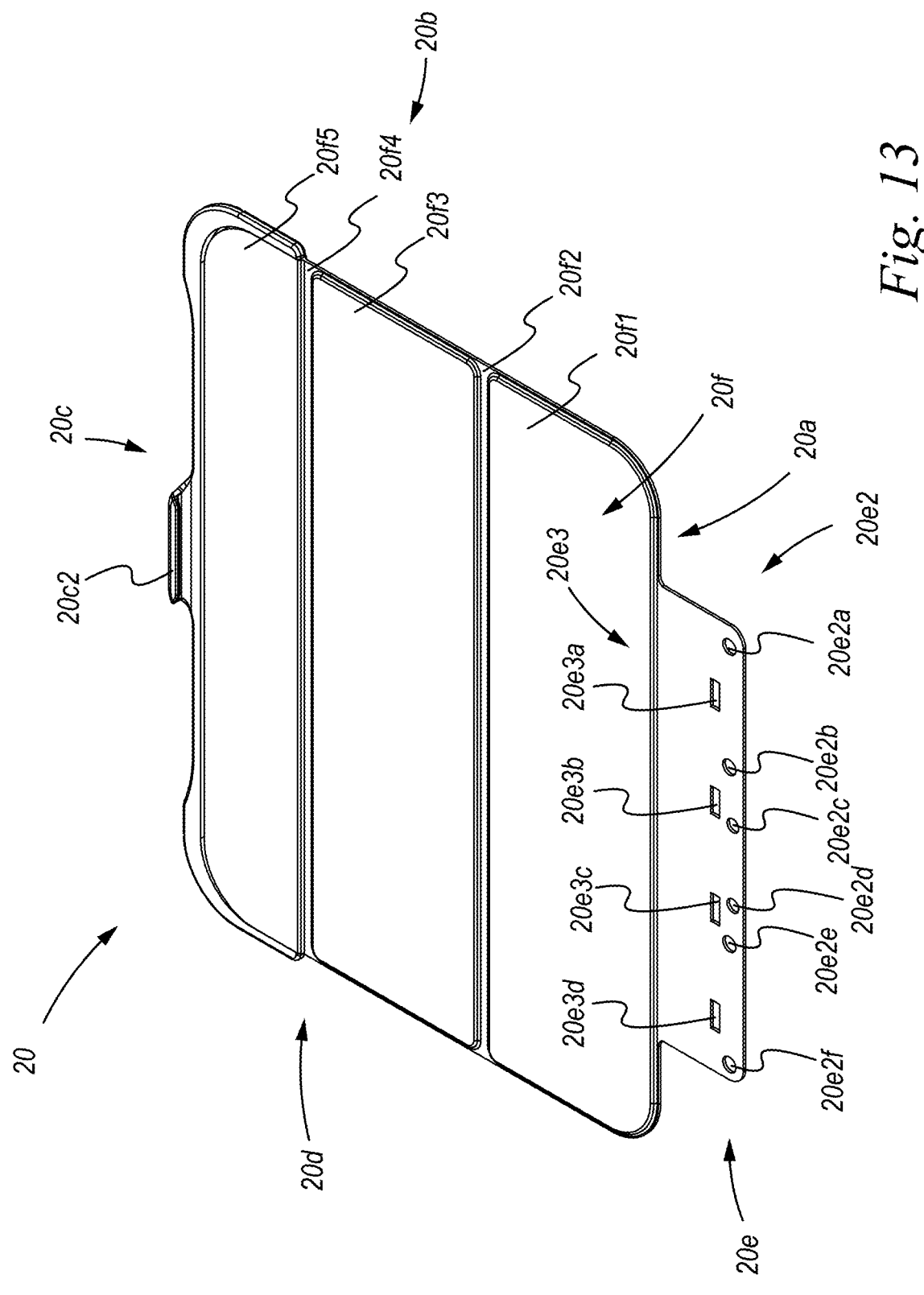
FIG. 13 is a second front perspective view of the stand assembly of FIG. 8.
Figure 14:
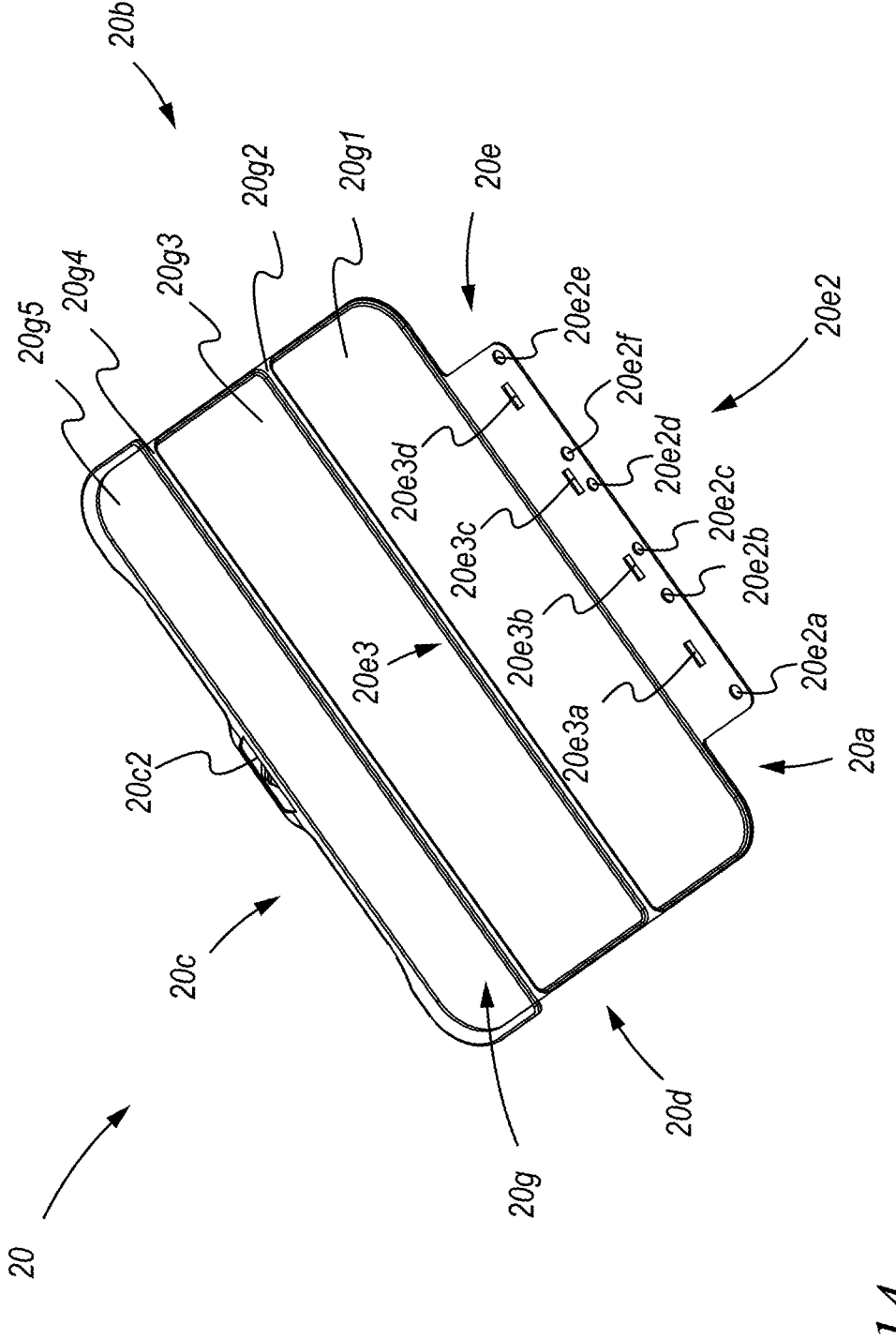
FIG. 14 is a first back perspective view of the stand assembly of FIG. 8.

Turning to FIG. 13, depicted therein is a second front perspective view of stand assembly 20, offering an alternate viewing angle Turning to FIG. 14, depicted therein is a first back perspective view of stand assembly 20.

Figure 15:
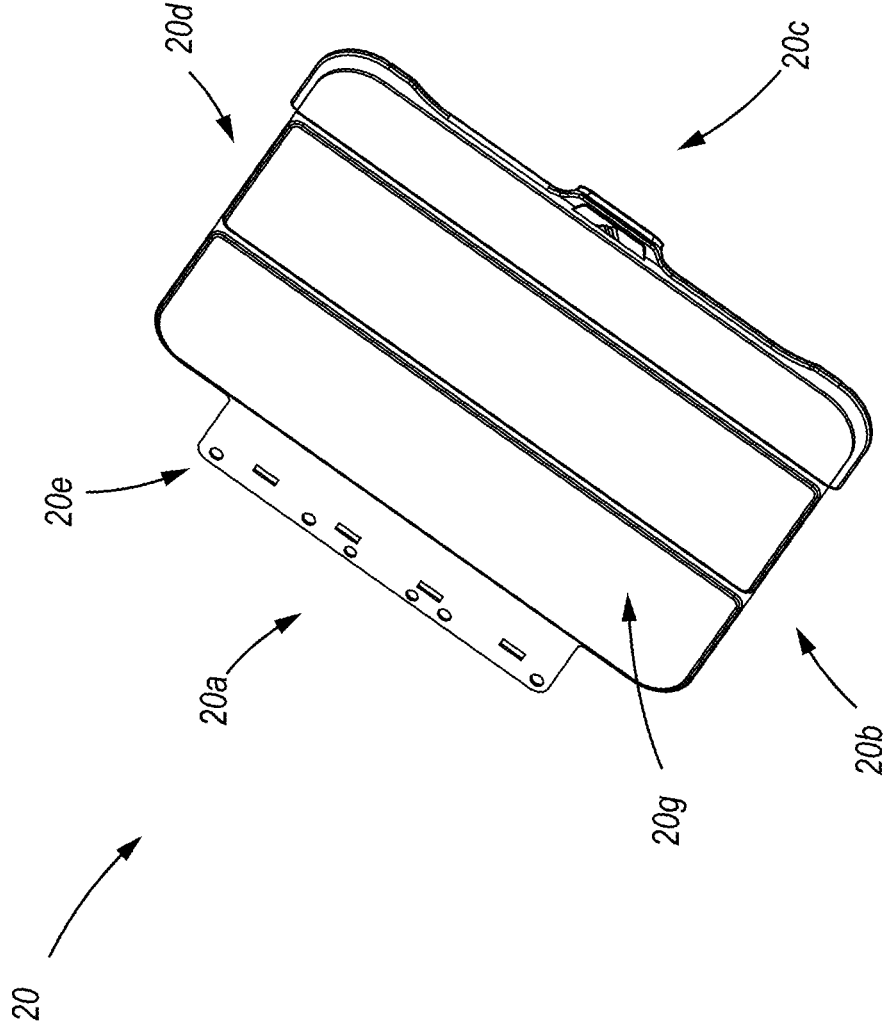
FIG. 15 is a second back perspective view of the stand assembly of FIG. 8.

Turning to FIG. 15, depicted therein is a second back perspective view of stand assembly 20.

Figure 16:
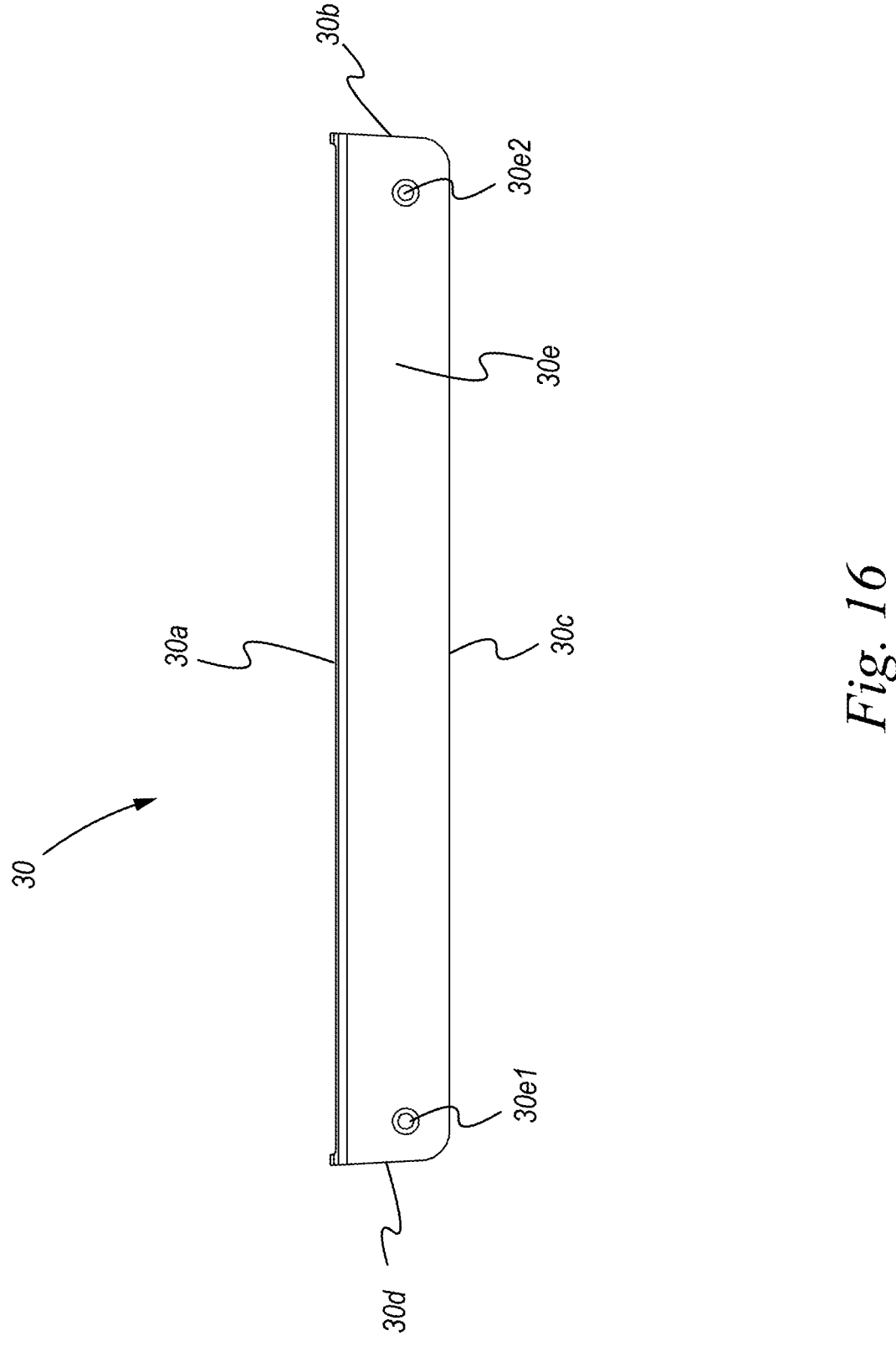
FIG. 16 is a front elevational view of a trim assembly.

Turning to FIG. 16, depicted therein is a front elevational view of trim assembly 30, including side portions 30*a*, 30*b*, 30*c*, and 30*d*, and outer surface 30*e* with boss members 30*e*1 and 30*e*2 to couple with a pair of standoffs from standoff plurality 10*e*5 of recessed structure 10*e* of frame assembly 10.

Figure 17:
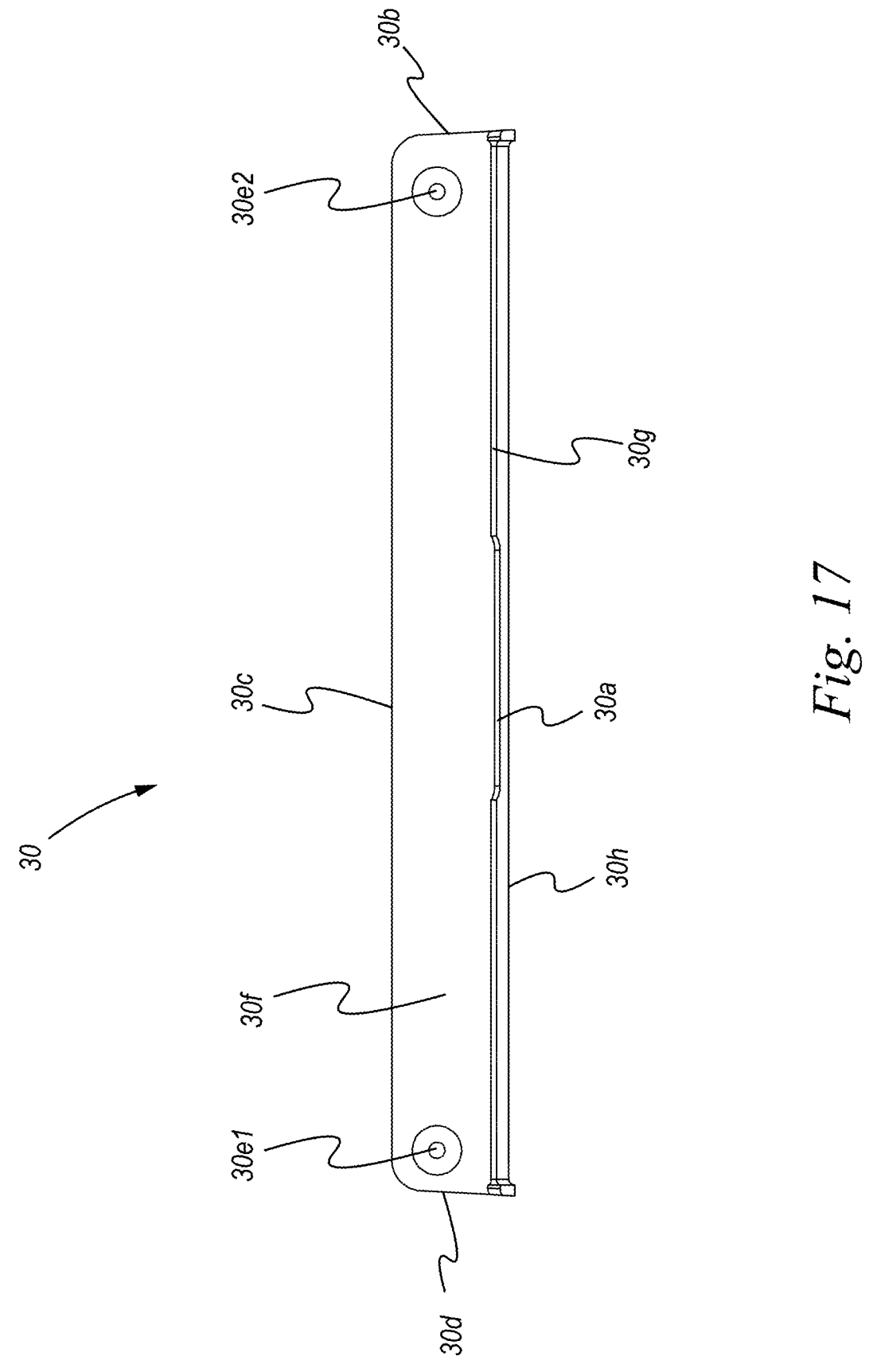
FIG. 17 is a back elevational view of the trim assembly of FIG. 16.

Turning to FIG. 17, depicted therein is a back elevational view of trim assembly 30, showing inner surfaces 30*f* and 30*g*, and outer surface 30*h*.

Figure 18:
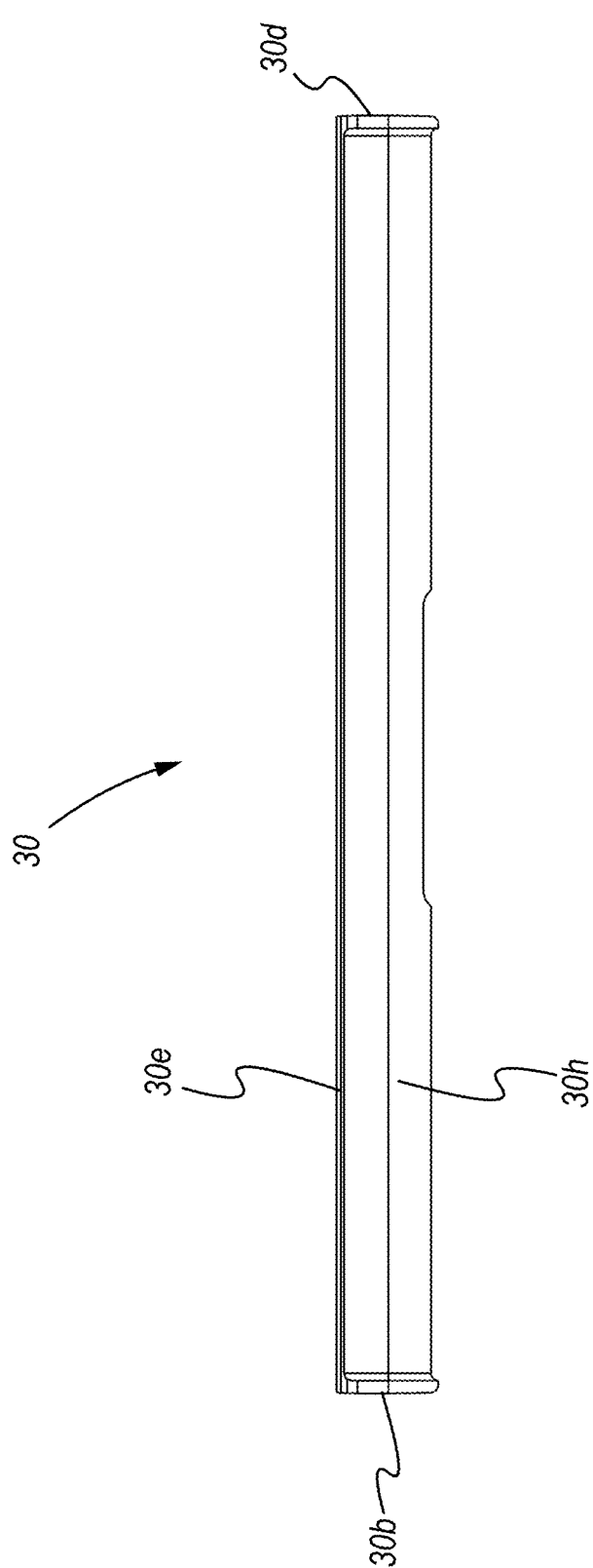
FIG. 18 is a left side elevational view of the trim assembly of FIG. 16.

Turning to FIG. 18, depicted therein is a left side elevational view of trim assembly 30.

Figure 19:
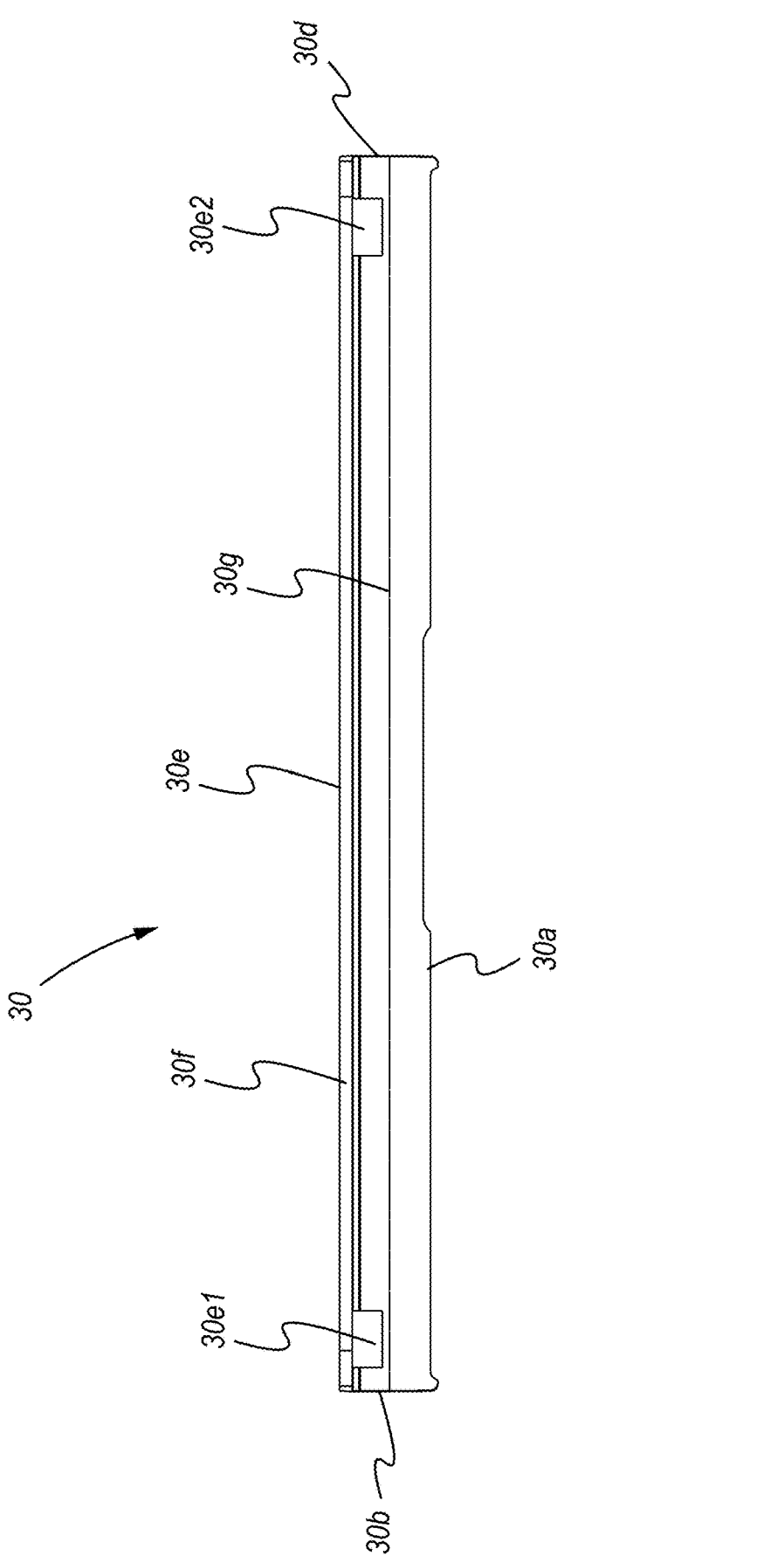
FIG. 19 is a right side elevational view of the trim assembly of FIG. 16.

Turning to FIG. 19, depicted therein is a right side elevational view of trim assembly 30.

Figure 20:
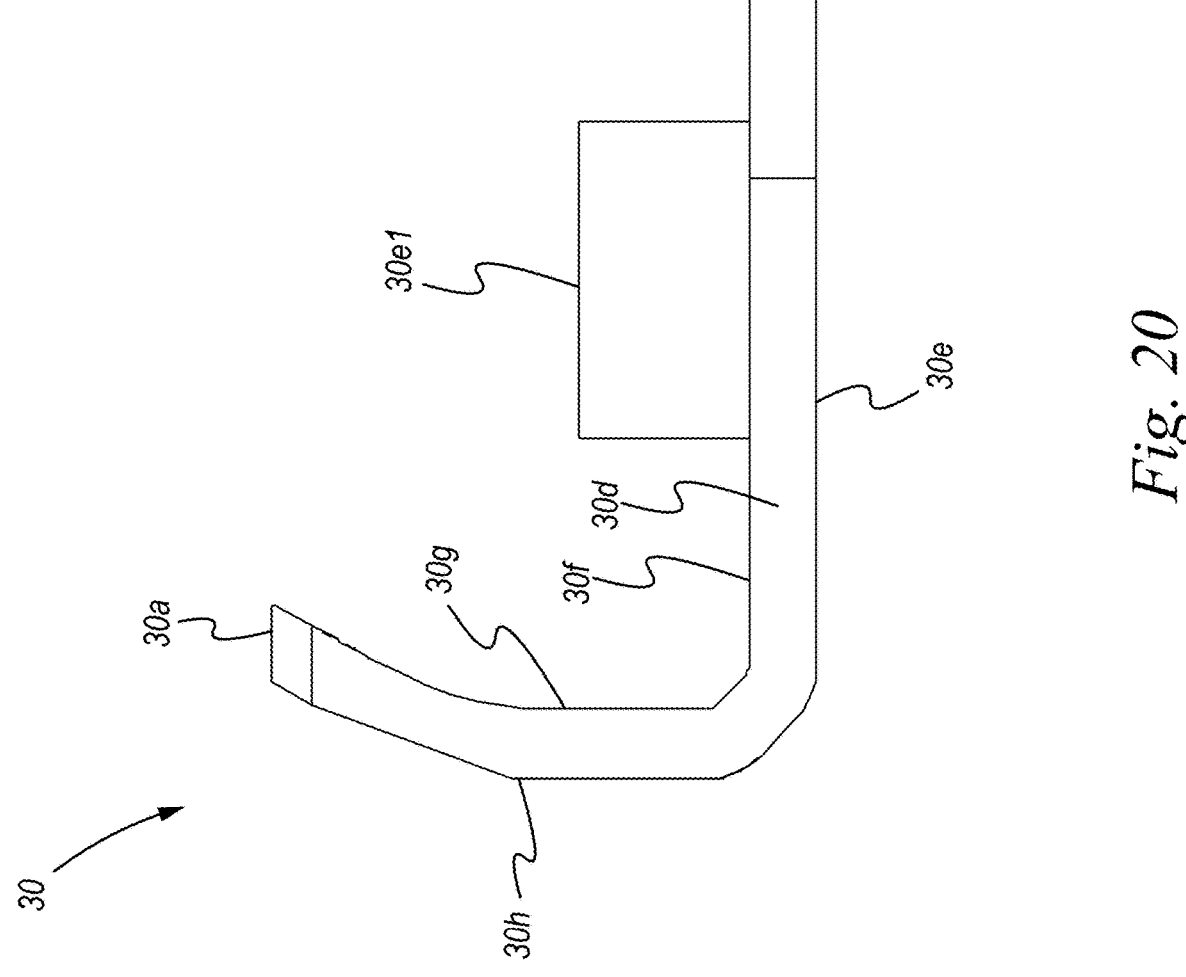
FIG. 20 is a top plan view of the trim assembly of FIG. 16.

Turning to FIG. 20, depicted therein is a top plan view of trim assembly 30.

Figure 21:
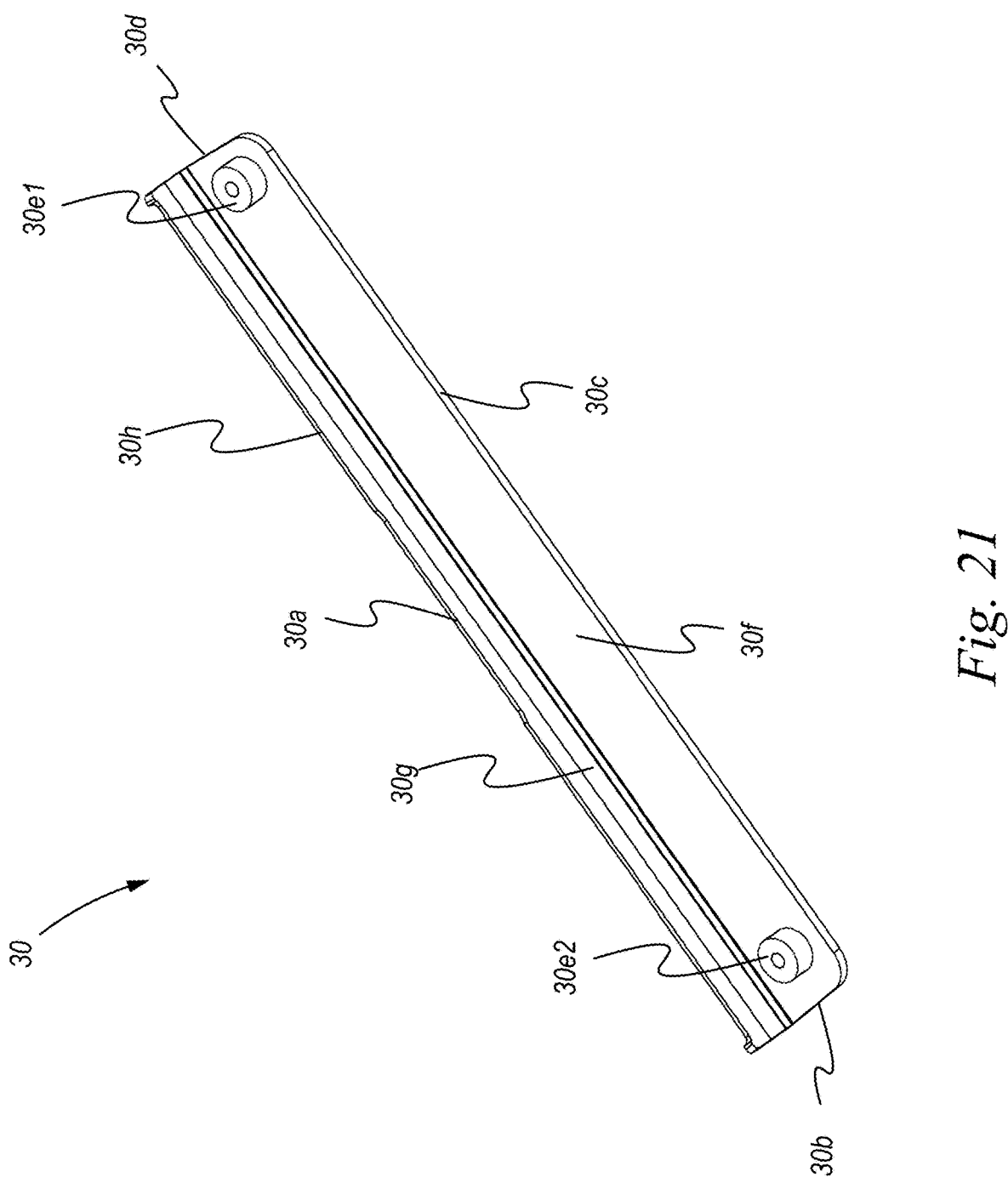
FIG. 21 is a first front perspective view of the trim assembly of FIG. 16.

Turning to FIG. 21, depicted therein is a first front perspective view of trim assembly 30.

Figure 22:
FIG. 22 is a second front perspective view of the trim assembly of FIG. 16.

Turning to FIG. 22, depicted therein is a second front perspective view of trim assembly 30.

Figure 23:
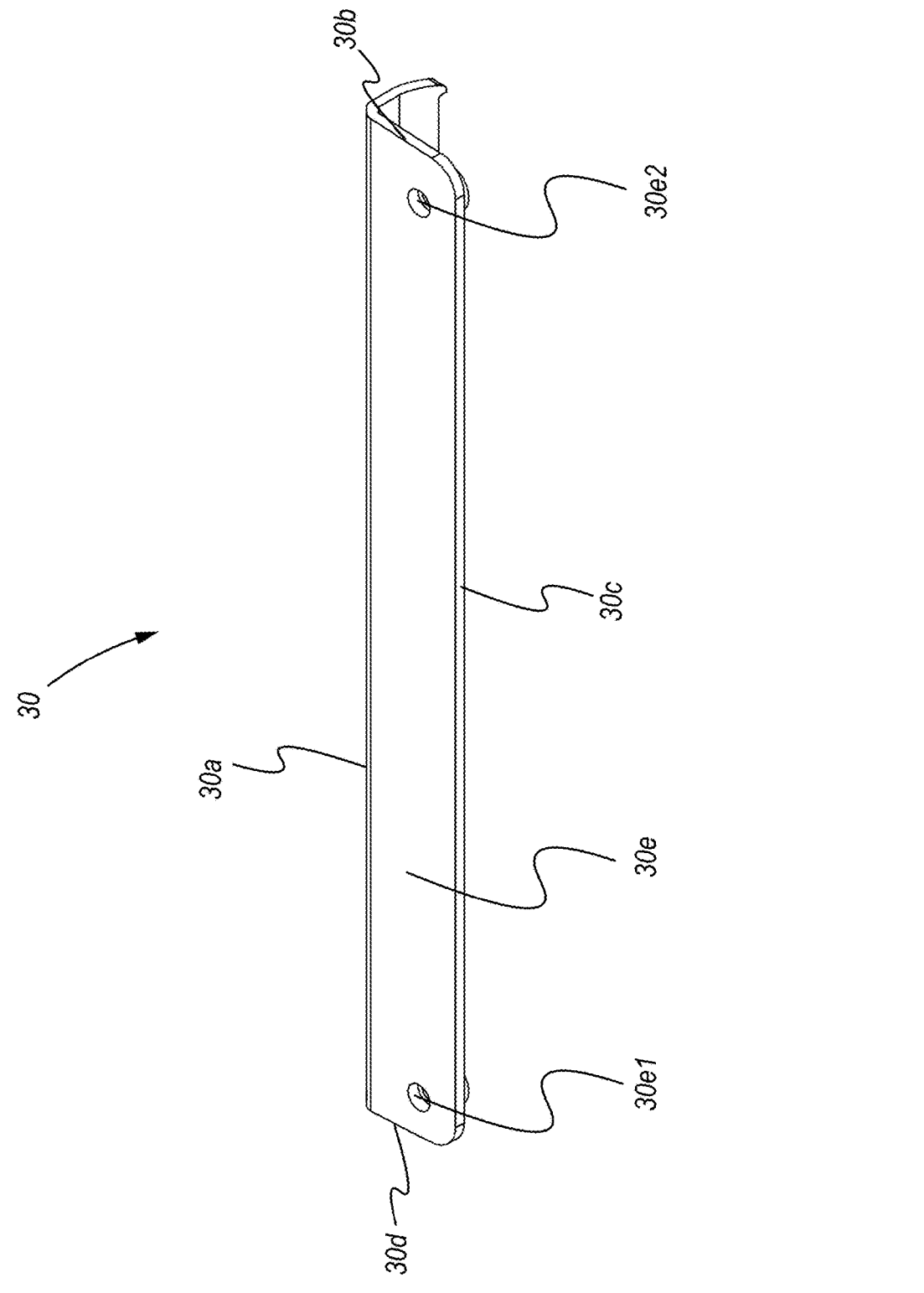
FIG. 23 is a first back perspective view of the trim assembly of FIG. 16.

Turning to FIG. 23, depicted therein is a first back perspective view of trim assembly 30.

Figure 24:
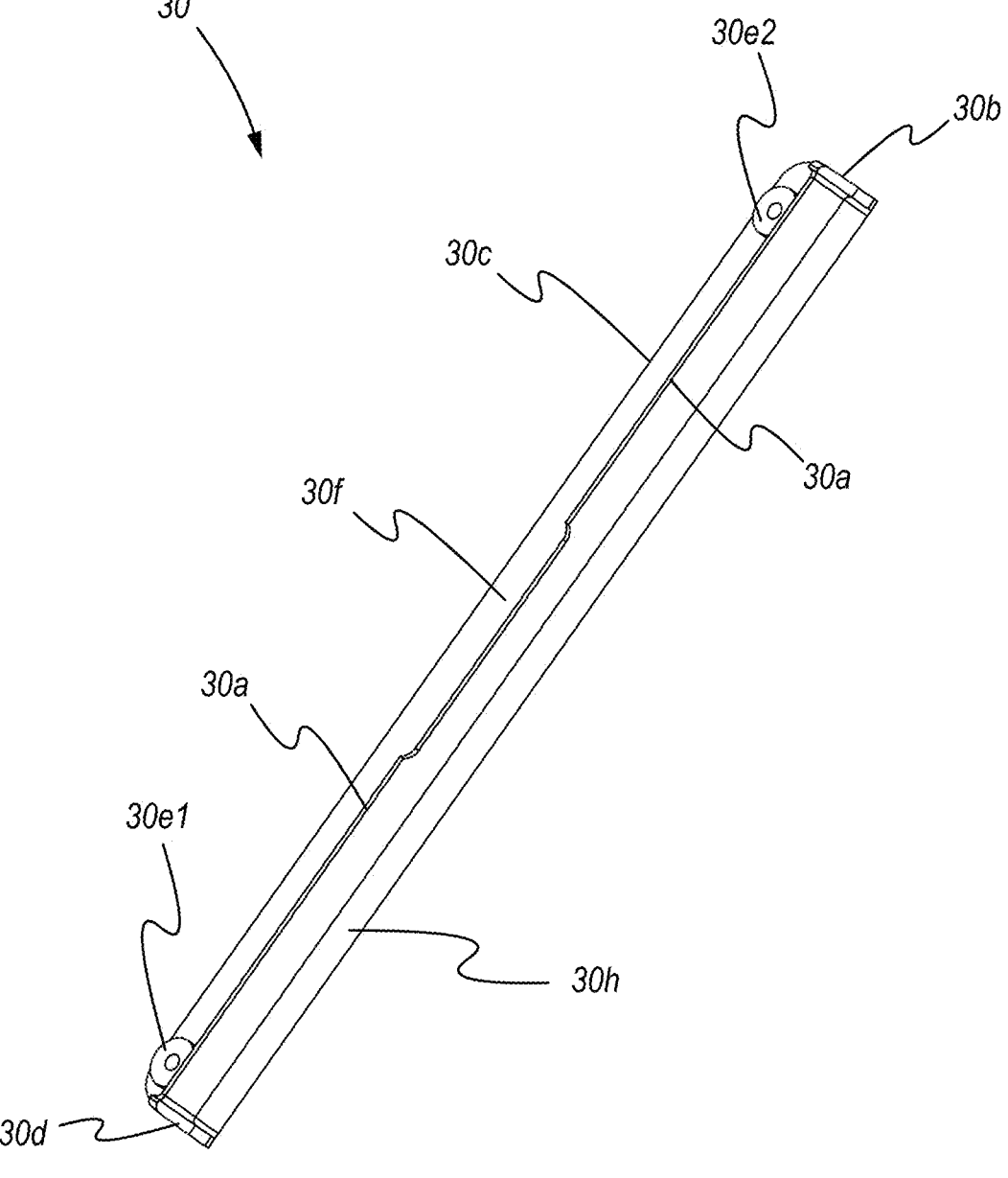
FIG. 24 is a second back perspective view of the trim assembly of FIG. 16.

Turning to FIG. 24, depicted therein is a second back perspective view of trim assembly 30, shown from an alternate angle.

Figure 25:
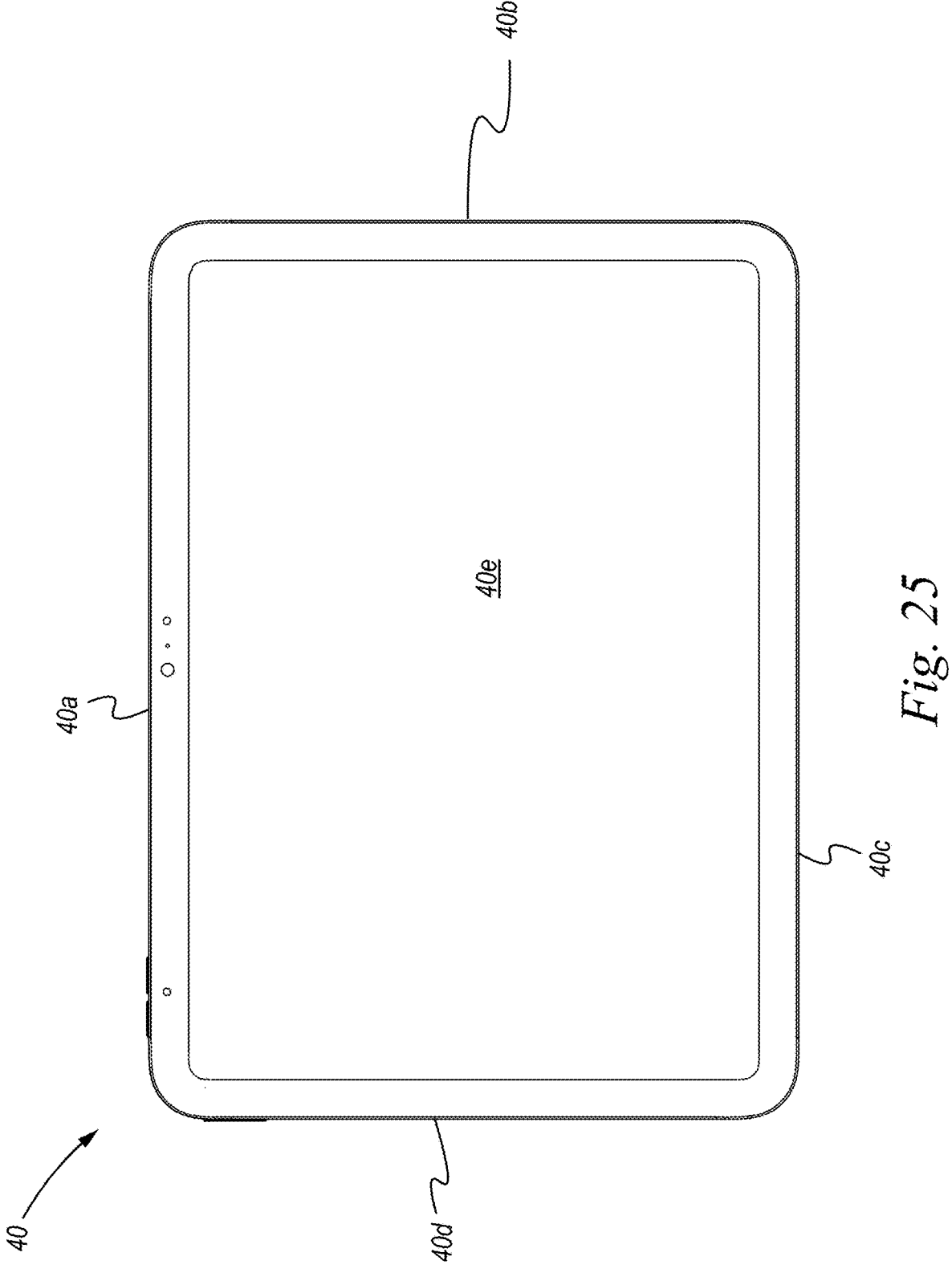
FIG. 25 is a front elevational view of a portable electronic device.

Turning to FIG. 25, depicted therein is a front elevational view of portable electronic device 40, including side edges 40*a*, 40*b*, 40*c*, and 40*d*, and a display 40*e*.

Figure 26:
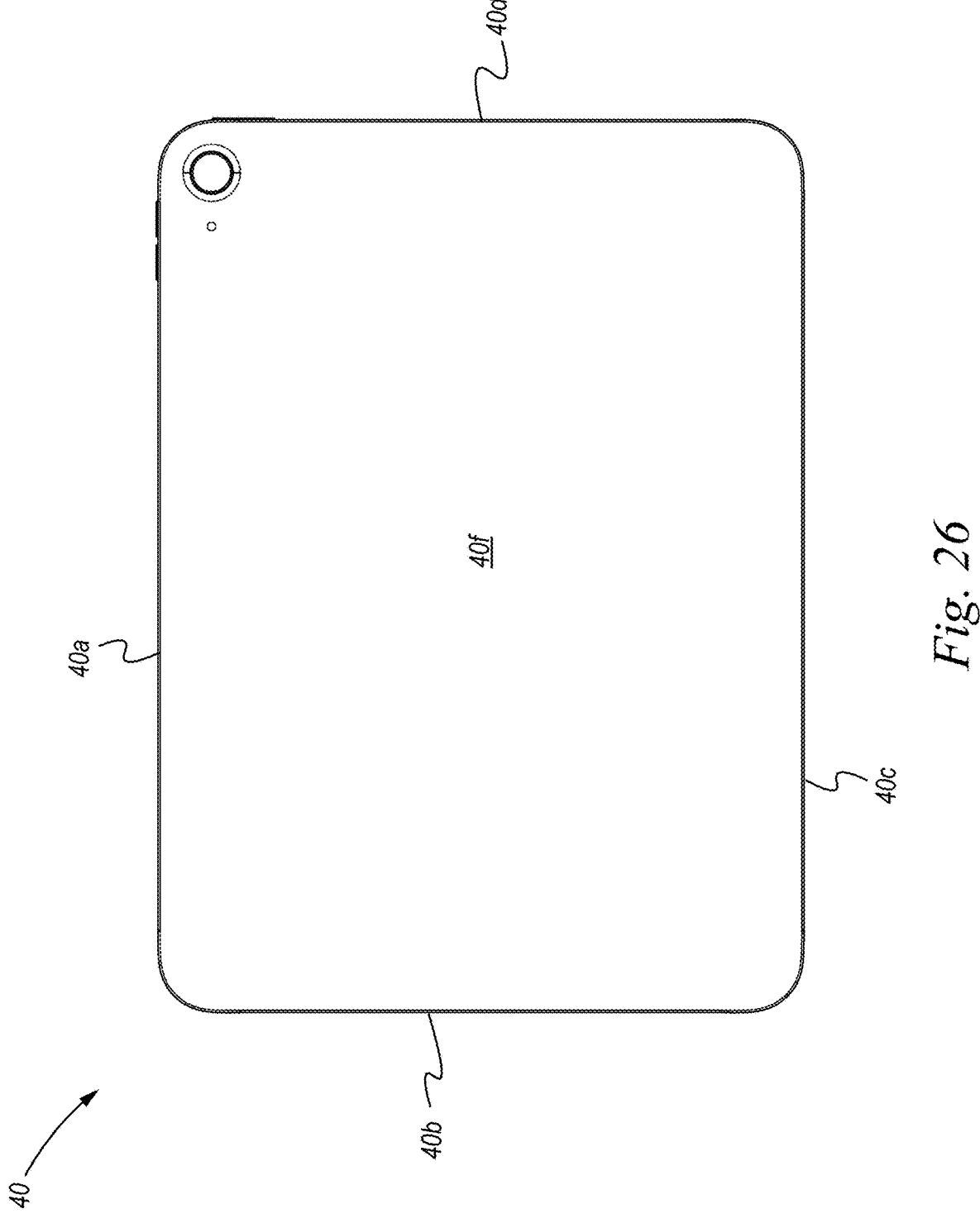
FIG. 26 is a back elevational view of the portable electronic device-shaped electronic device of FIG. 25.

Turning to FIG. 26, depicted therein is a back elevational view of portable electronic device 40, showing back 40*f*.

Figure 27:
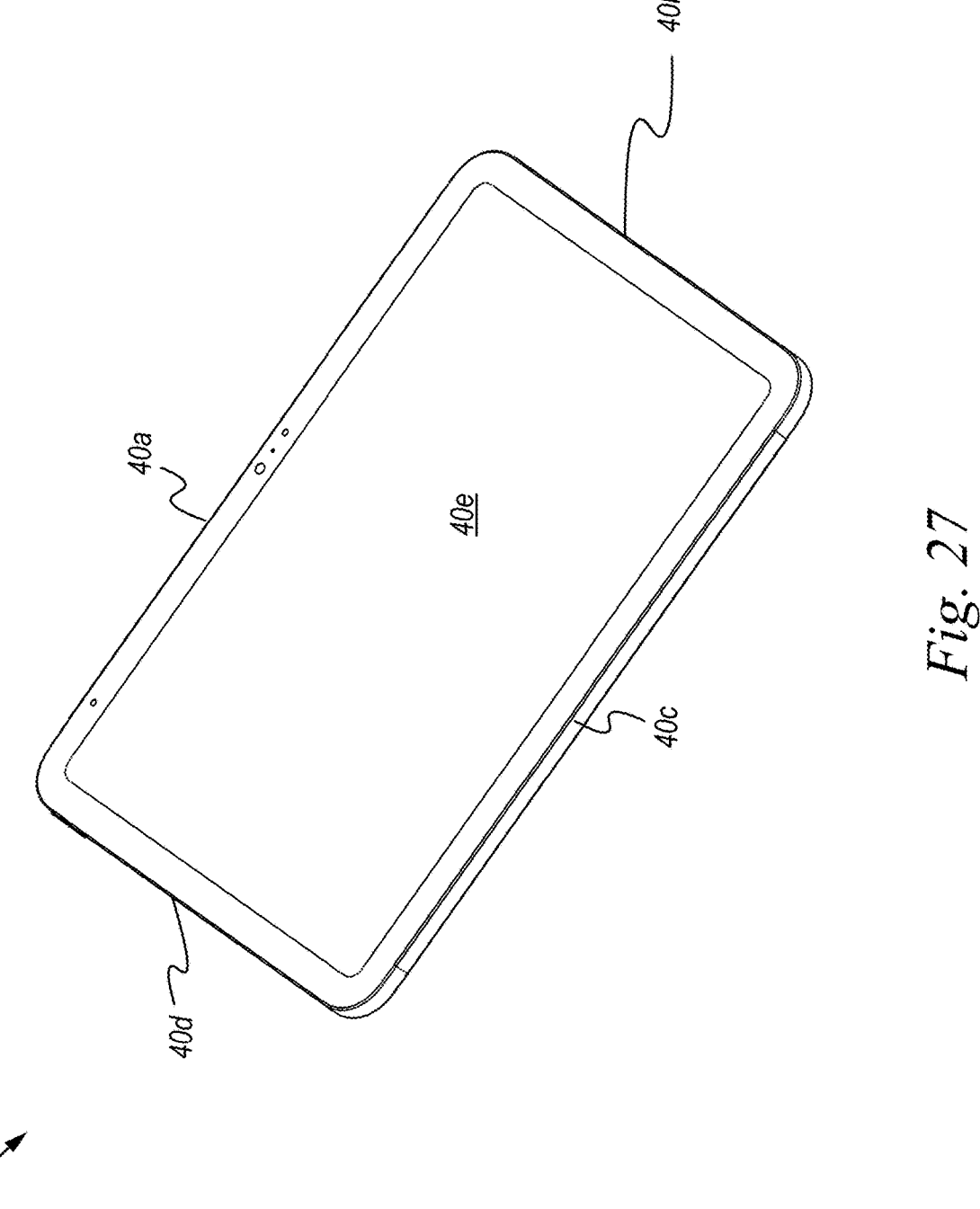
FIG. 27 is a second back perspective view of the portable electronic device of FIG. 25.

Turning to FIG. 27, depicted therein is a second back perspective view of portable electronic device 40.

Figure 28:
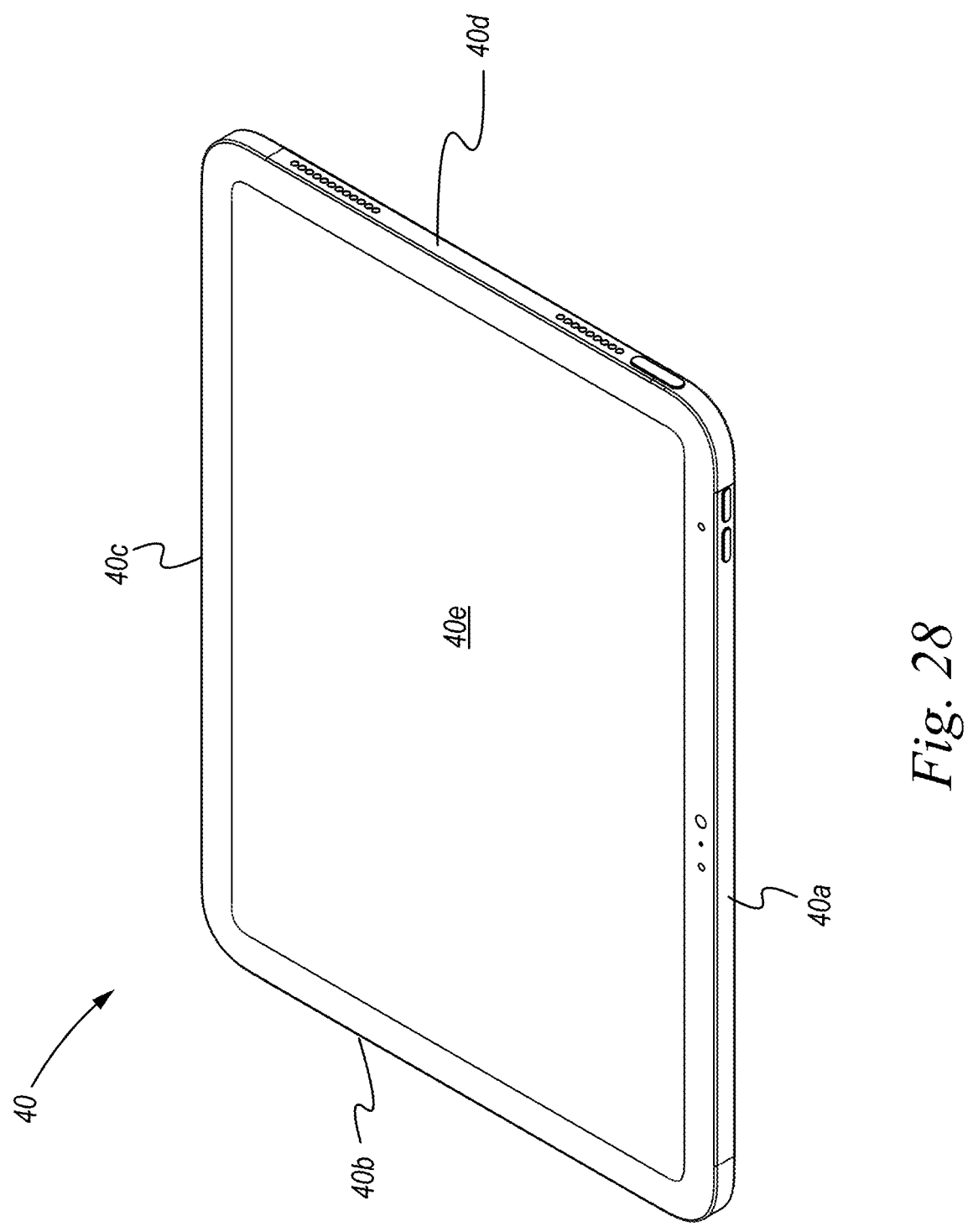
FIG. 28 is a first front perspective view of the portable electronic device of FIG. 25.

Turning to FIG. 28, depicted therein is a first front perspective view of portable electronic device 40.

Figure 29:
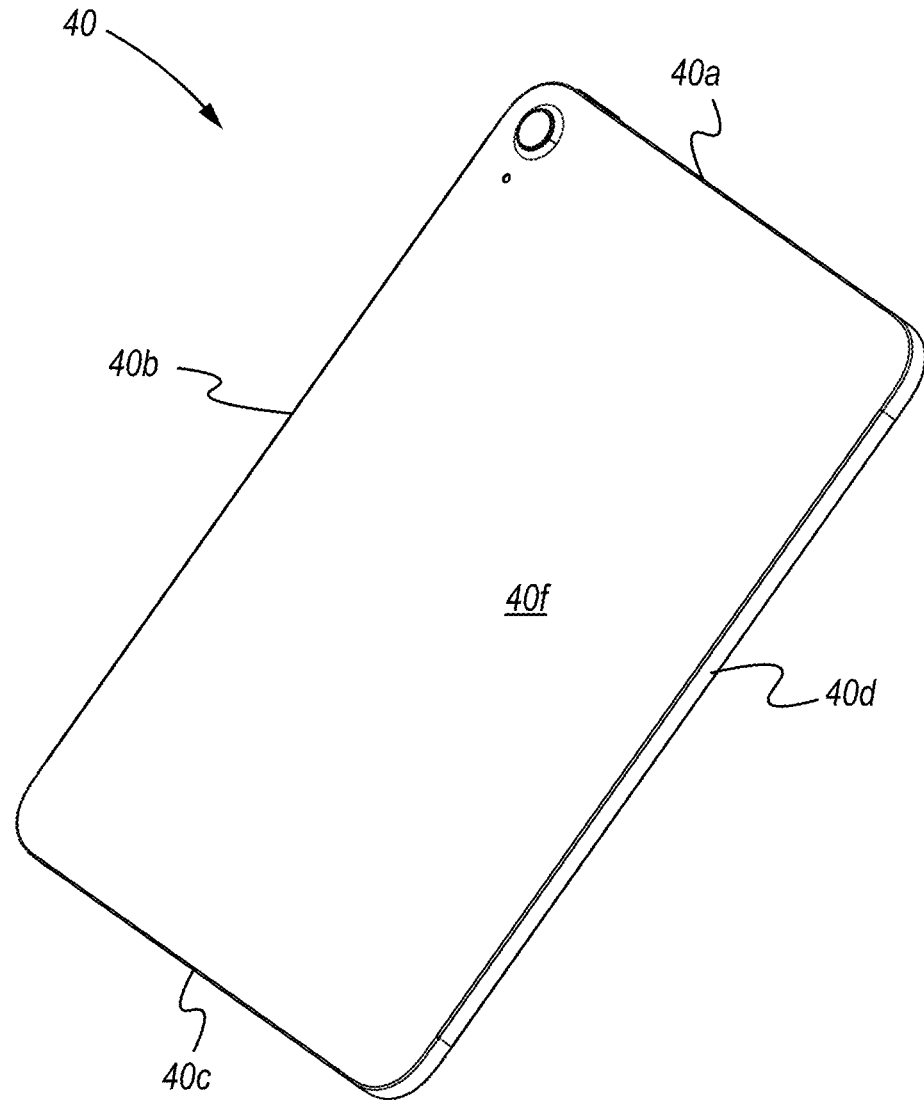
FIG. 29 is a second front perspective view of the portable electronic device of FIG. 25.

Turning to FIG. 29, depicted therein is a second front perspective view of portable electronic device 40.

Figure 30:
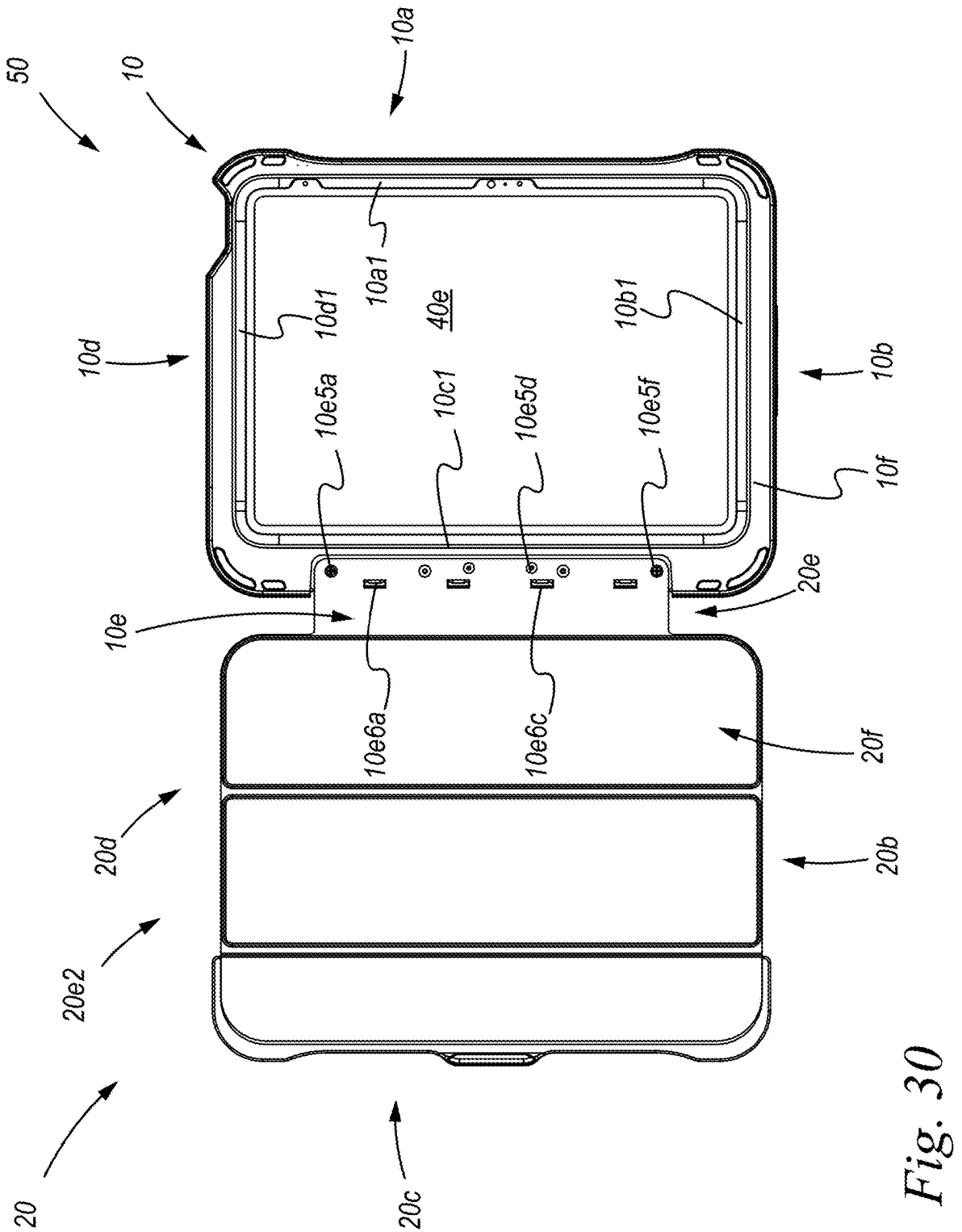
FIG. 30 is a front elevational view of a partial case-stand assembly excluding the trim assembly.

Turning to FIG. 30, depicted therein is a front elevational view of partial case-stand assembly 50.

Figure 31:
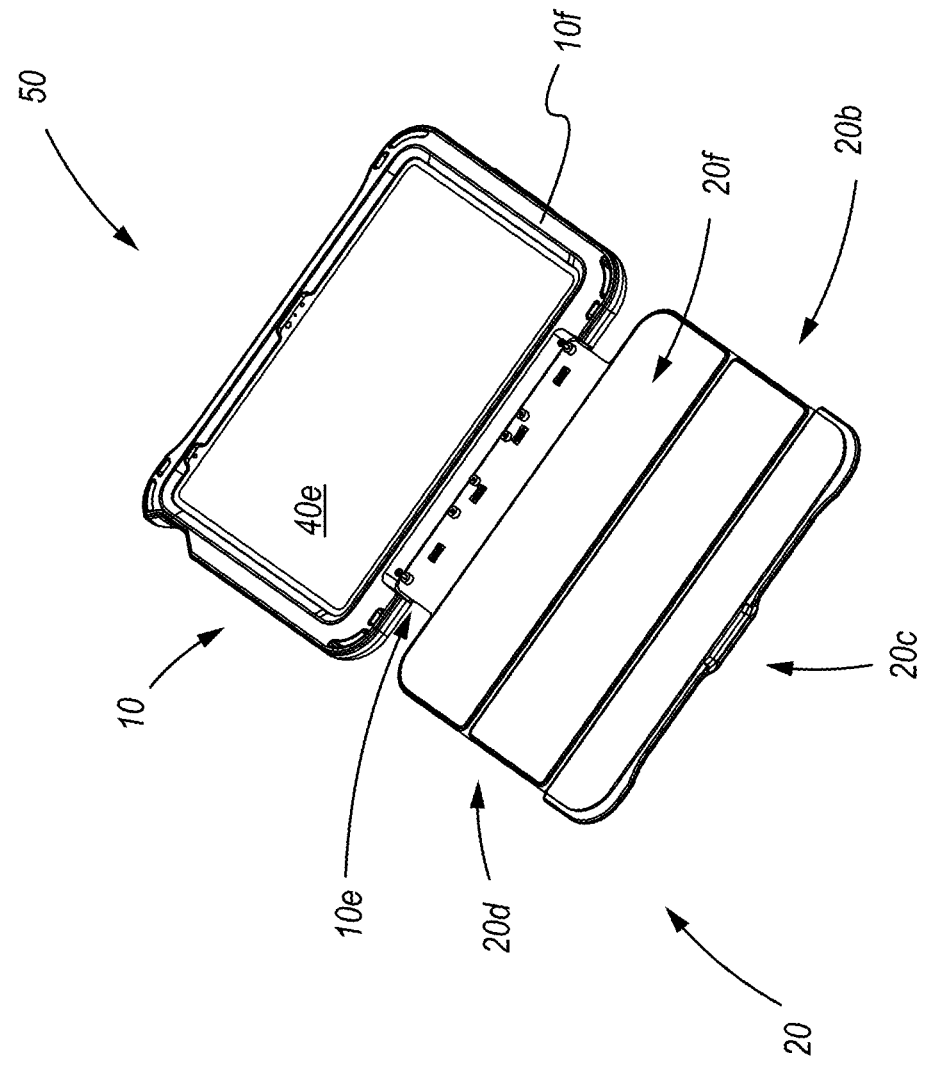
FIG. 31 is a first front perspective view of the partial case-stand assembly of FIG. 30.

Turning to FIG. 31, depicted therein is a first front perspective view of partial case-stand assembly 50.

Figure 32:
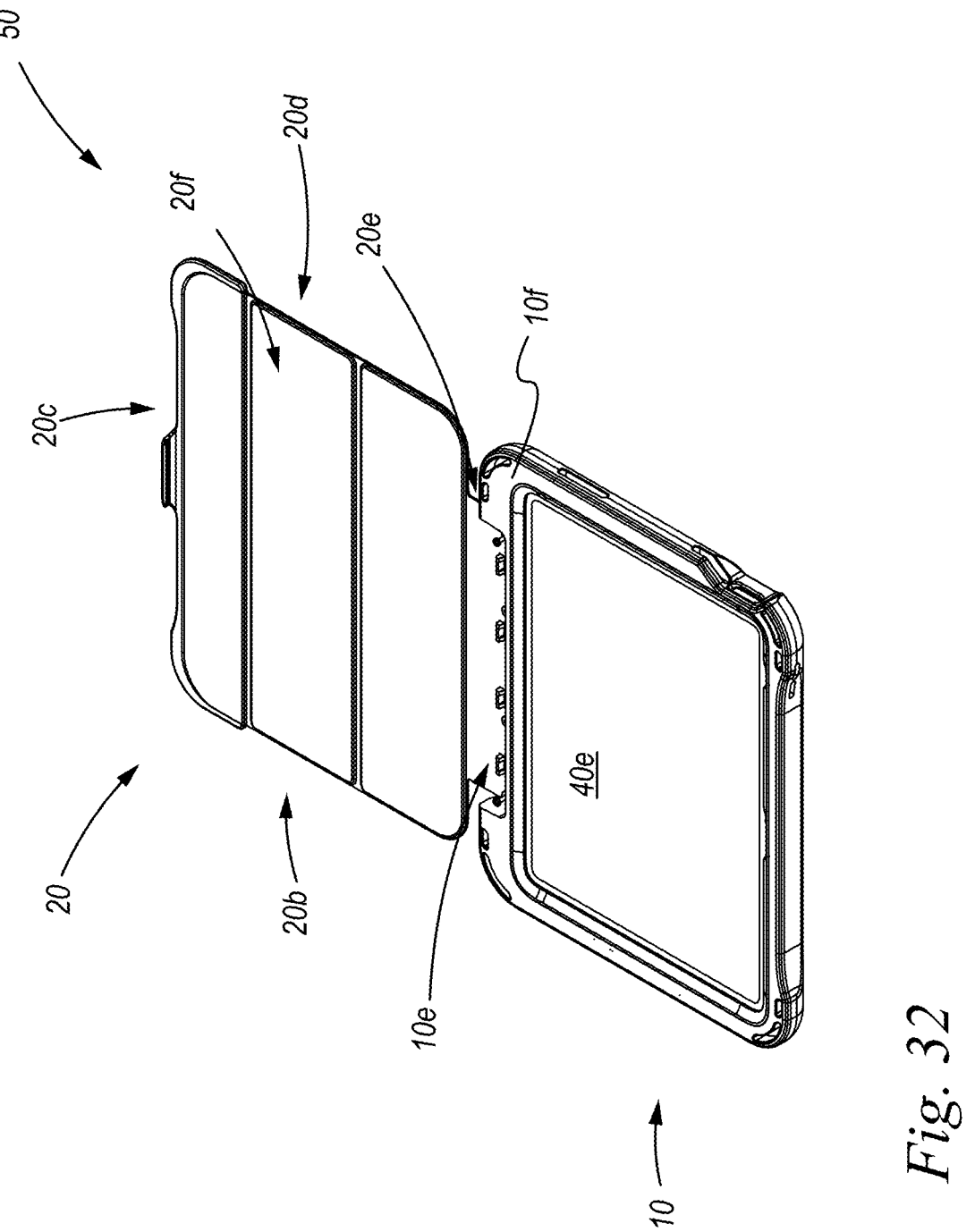
FIG. 32 is a second front perspective view of the partial case-stand assembly of FIG. 30.

Turning to FIG. 32, depicted therein is a second front perspective view of partial case-stand assembly 50.

Figure 33:
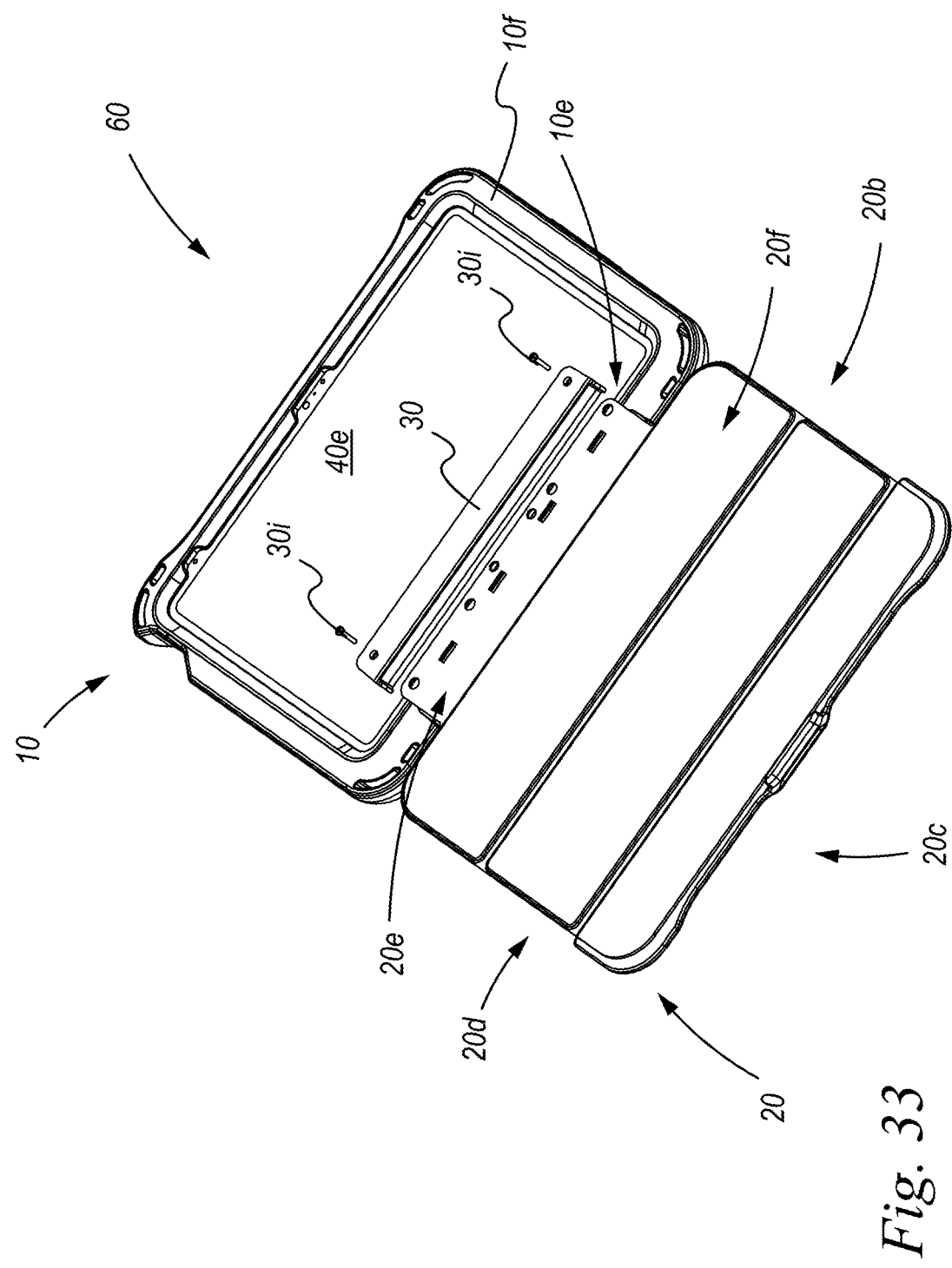
FIG. 33 is a first front perspective exploded view of a full case-stand assembly including trim assembly.

Turning to FIG. 33, depicted therein is a first front perspective exploded view of full case-stand assembly 60.

Figure 34:
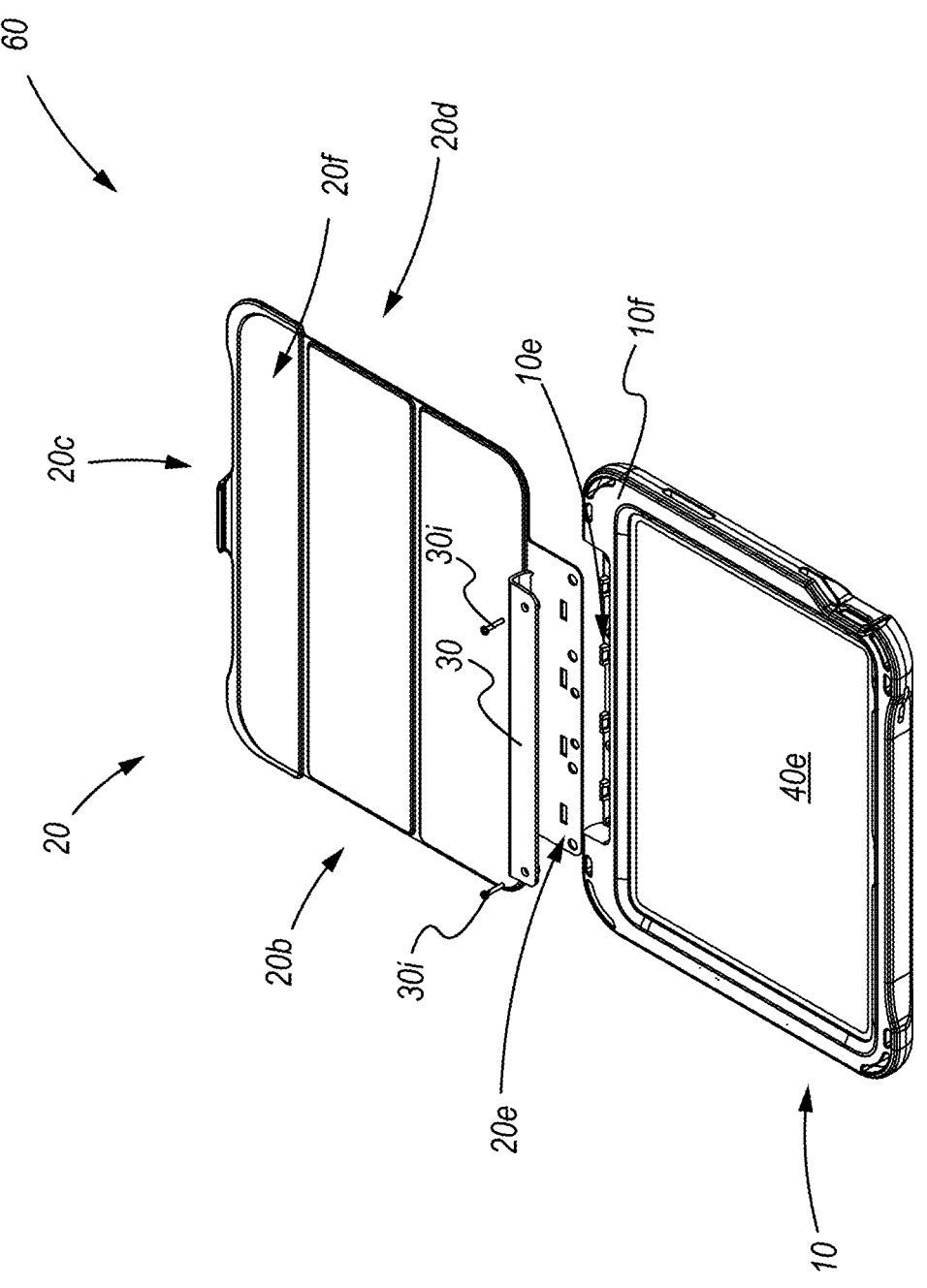
FIG. 34 is a second front perspective exploded view of the full case-stand assembly of FIG. 33.

Turning to FIG. 34, depicted therein is a second front perspective exploded view of full case-stand assembly 60.

Figure 35:
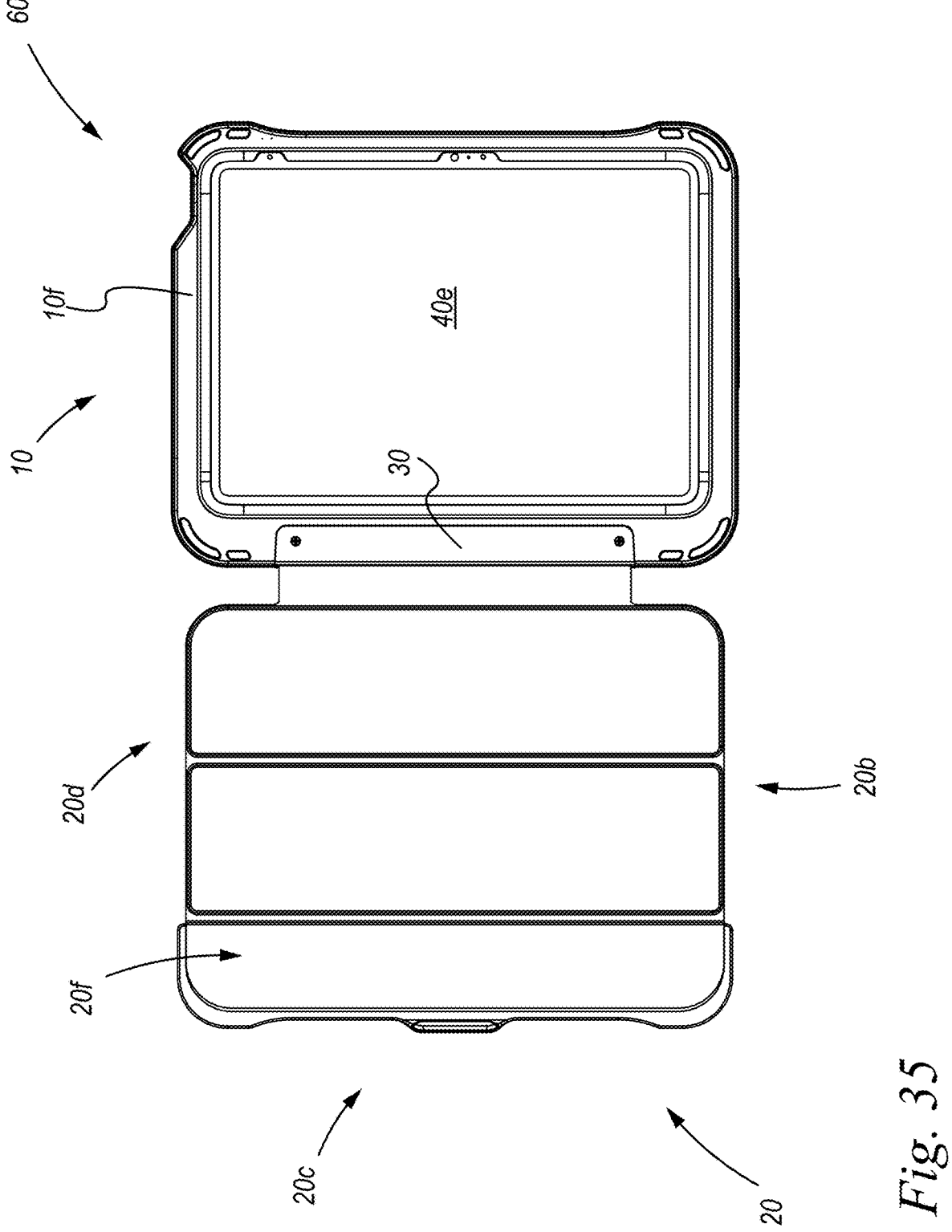
FIG. 35 is a front elevational view of the full case-stand assembly of FIG. 33 in an open unfolded configuration.

Turning to FIG. 35, depicted therein is a front elevational view of full case-stand assembly 60 in an open unfolded configuration.

Figure 36:
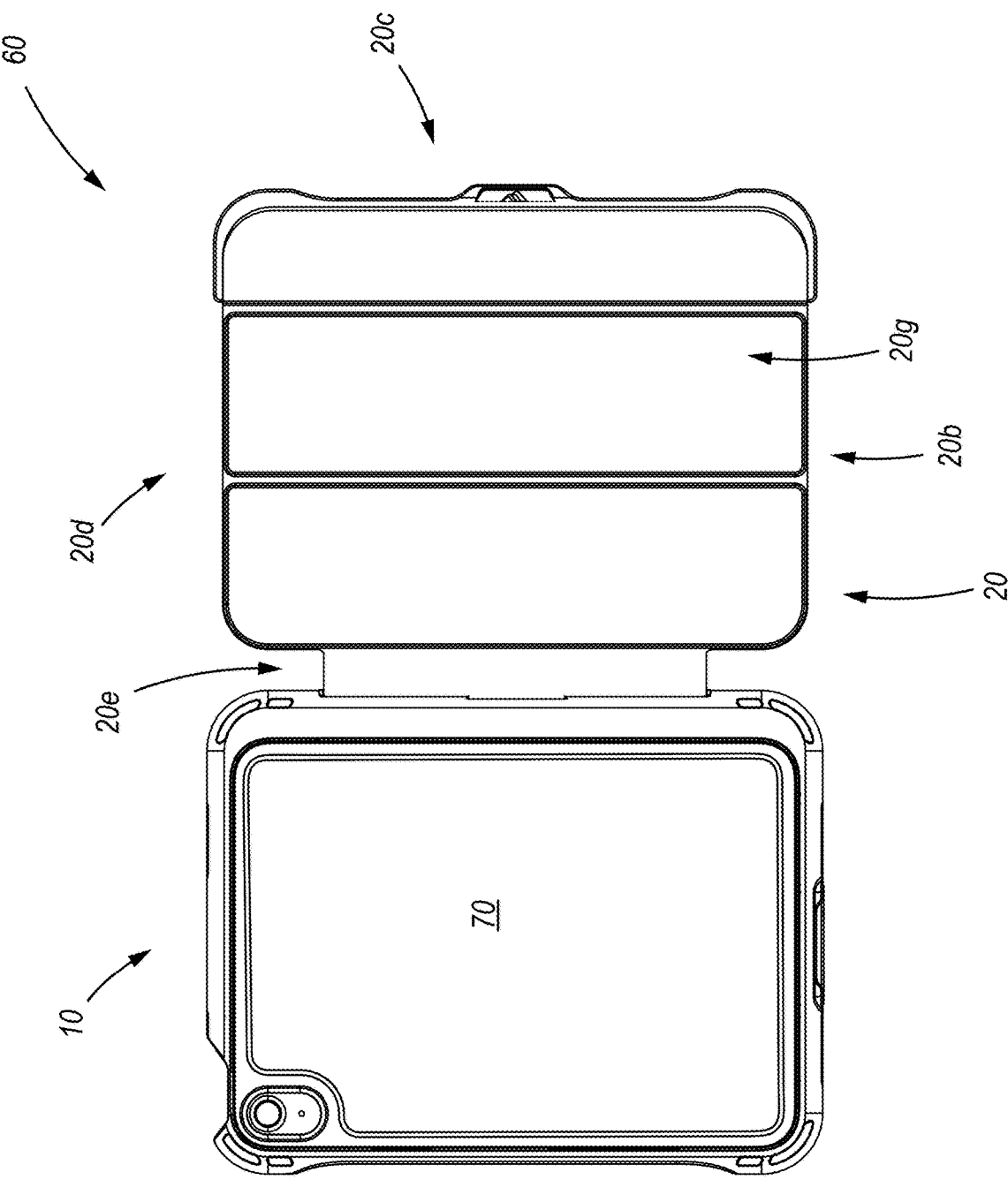
FIG. 36 is a back elevational view of the full case-stand assembly of FIG. 33 in an open unfolded configuration.

Turning to FIG. 36, depicted therein is a back elevational view of full case-stand assembly 60 in an open unfolded configuration and depicting back assembly 70 coupled with frame assembly 10.

Figure 37:
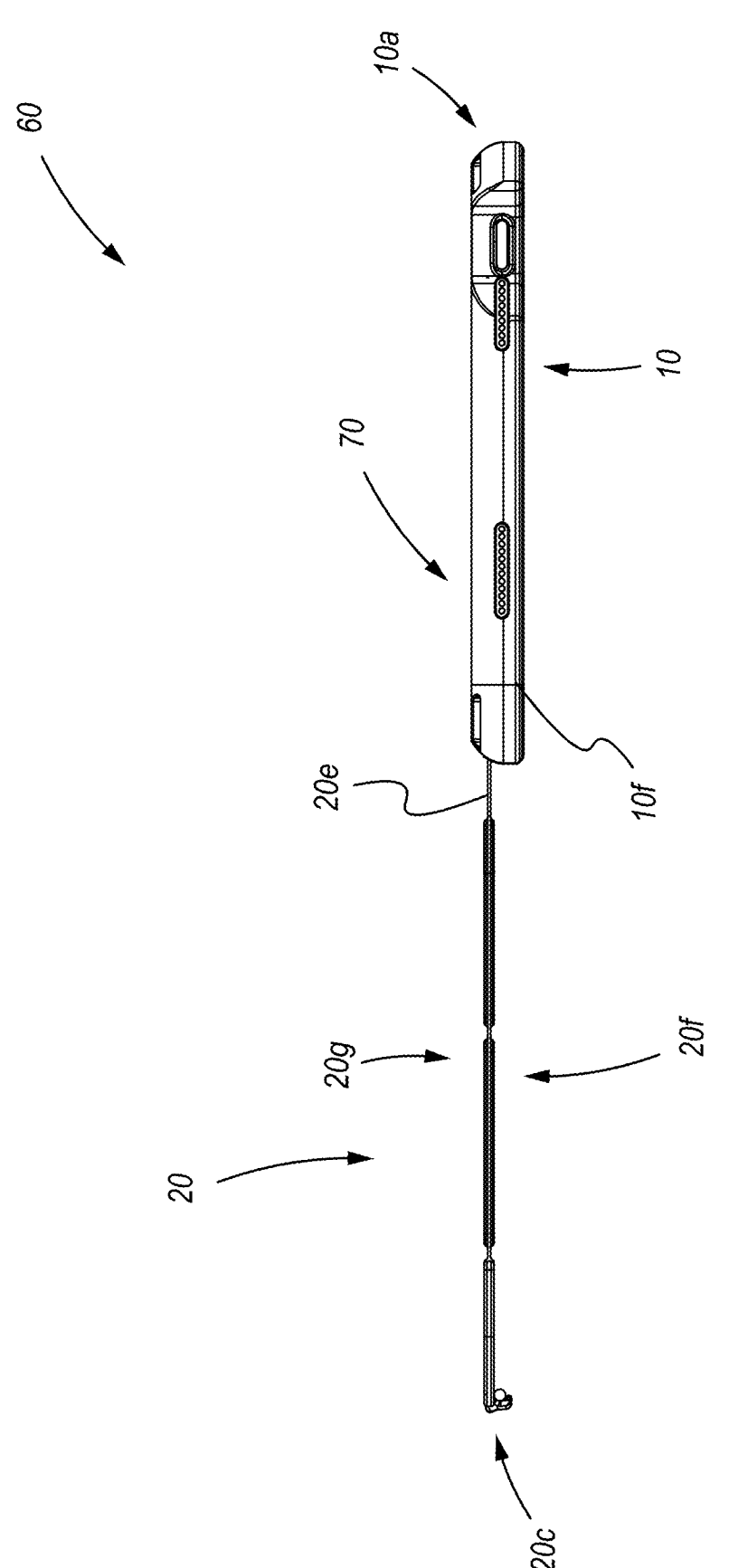
FIG. 37 is a bottom plan view of the full case-stand assembly of FIG. 33 in an open unfolded configuration.

Turning to FIG. 37, depicted therein is a bottom plan view of full case-stand assembly 60 in an open unfolded configuration.

Figure 38:
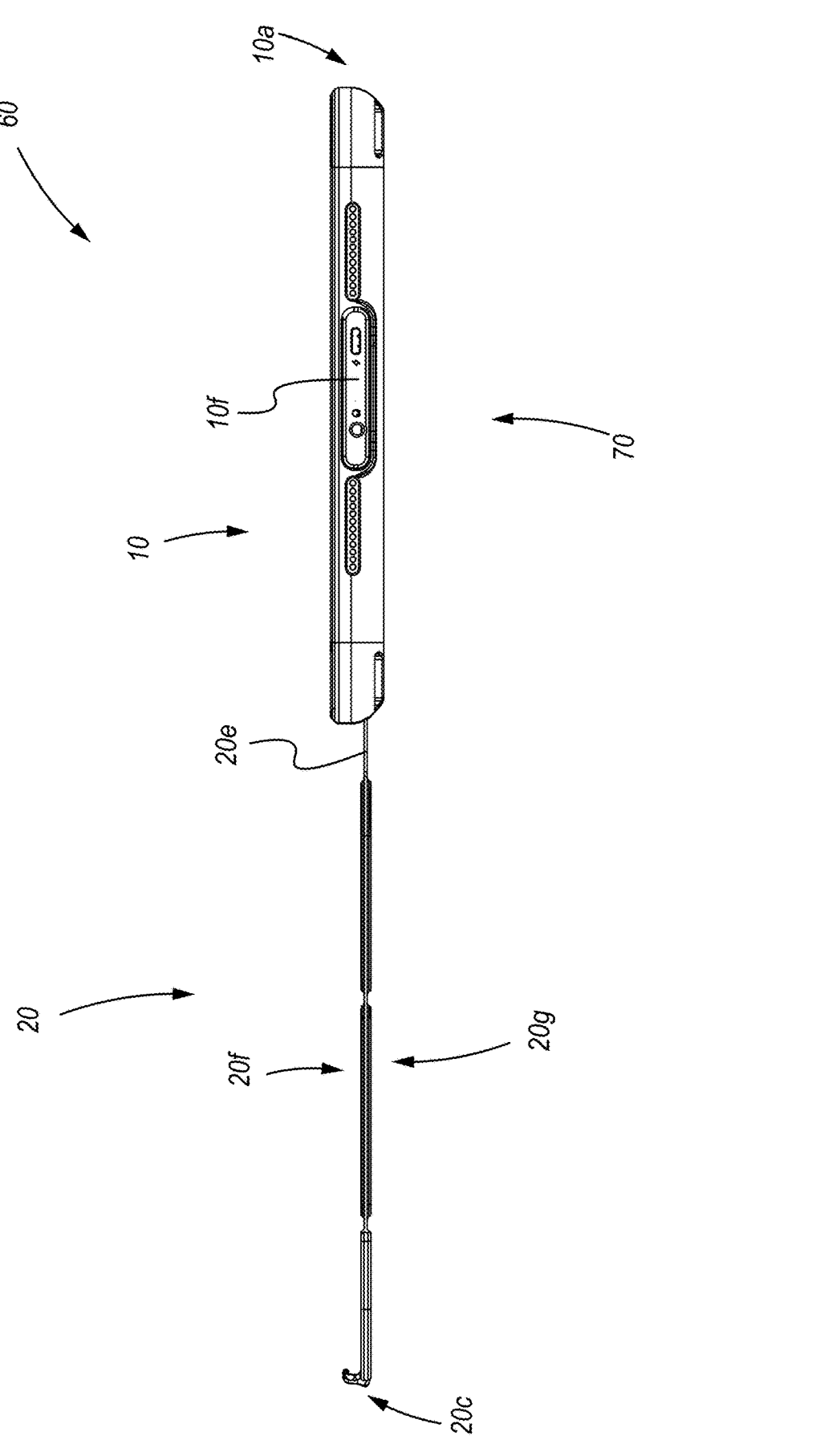
FIG. 38 is a first back perspective view of the full case-stand assembly of FIG. 33 in an open unfolded configuration.

Turning to FIG. 38, depicted therein is a first back perspective view of full case-stand assembly 60 in an open unfolded configuration.

Figure 39:
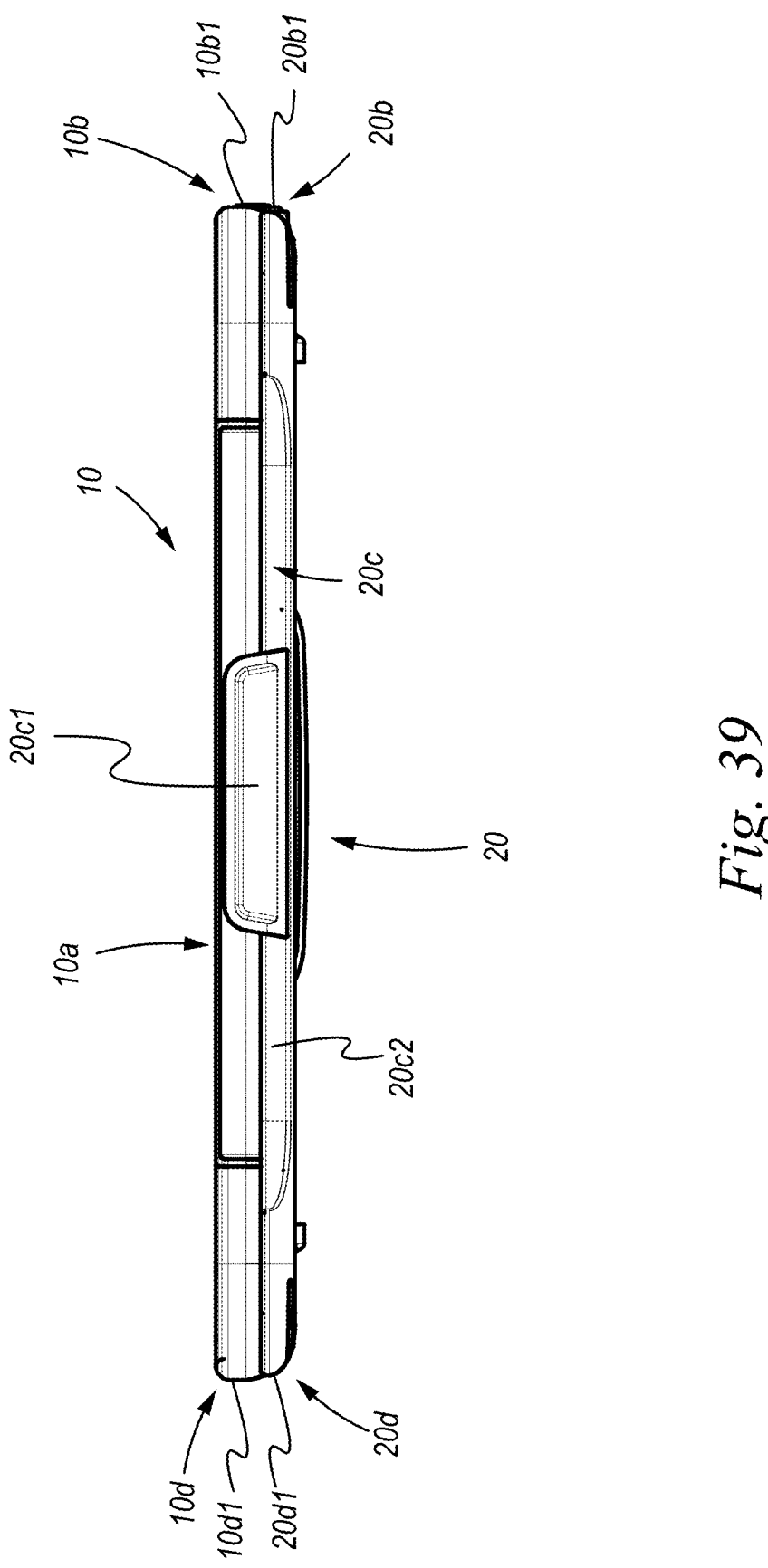
FIG. 39 is a first front perspective view of the full case-stand assembly of FIG. 33 in an open unfolded configuration.

Turning to FIG. 39, depicted therein is a first front perspective view of full case-stand assembly 60 in an open unfolded configuration.

Figure 40:
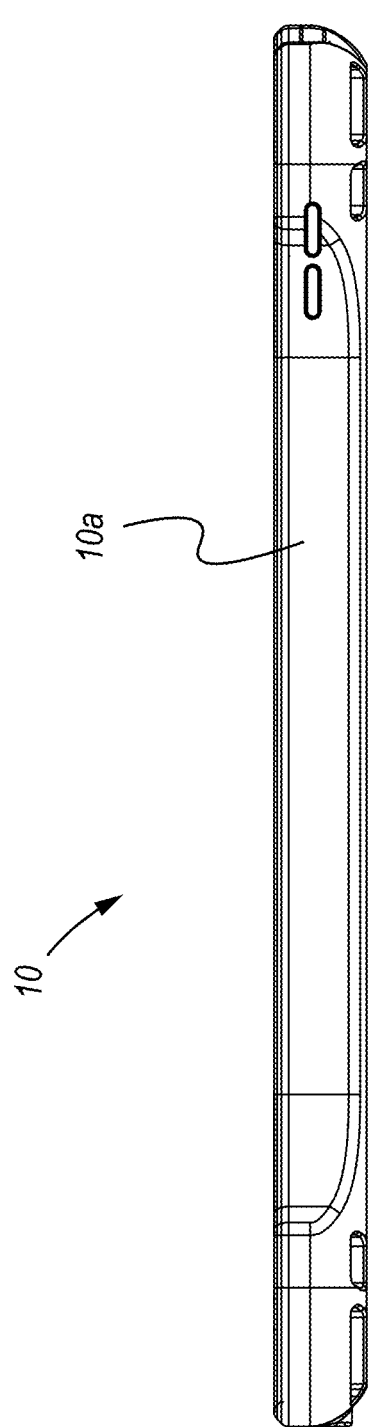
FIG. 40 is a left side elevational view of the full case-stand assembly of FIG. 33 in an open unfolded configuration.

Turning to FIG. 40, depicted therein is a left side elevational view of full case-stand assembly 60 in an open unfolded configuration.

Figure 41:
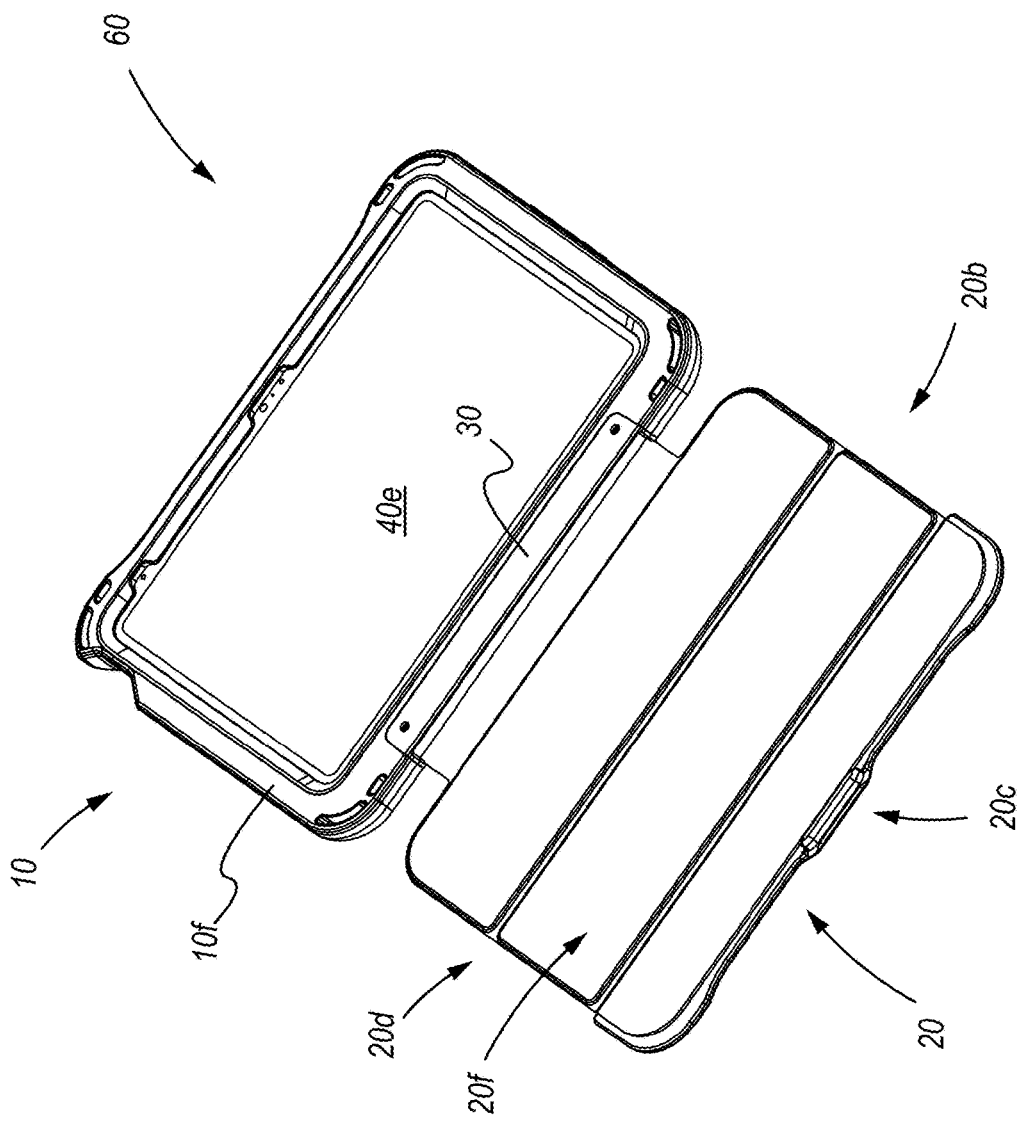
FIG. 41 is a right side elevational view of the full case-stand assembly of FIG. 33 in an open unfolded configuration.

Turning to FIG. 41, depicted therein is a right side elevational view of full case-stand assembly 60 in an open unfolded configuration.

Figure 42:
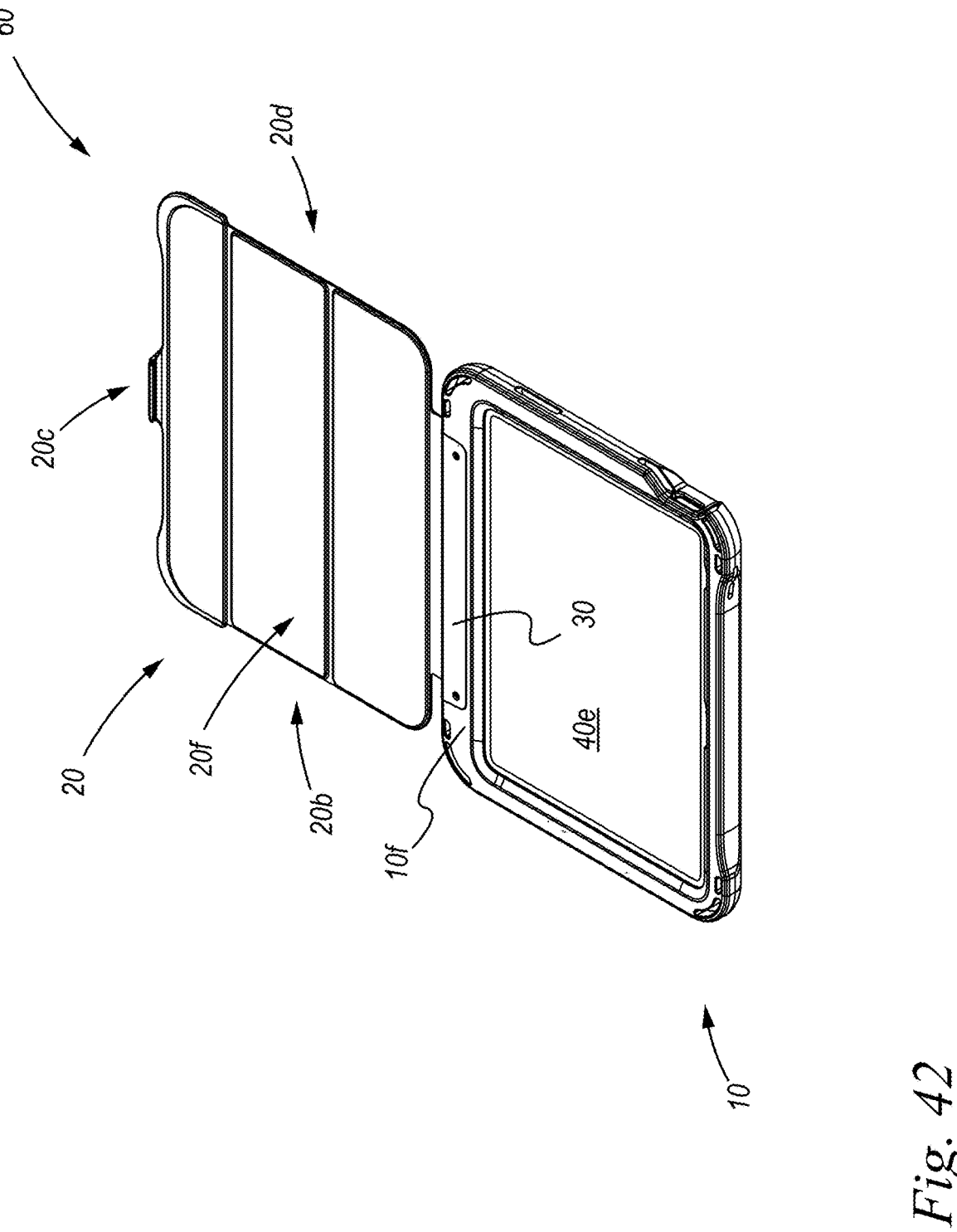
FIG. 42 is a top plan view of the full case-stand assembly of FIG. 33 in an open unfolded configuration.

Turning to FIG. 42, depicted therein is a top plan view of full case-stand assembly 60 in an open unfolded configuration.

Figure 43:
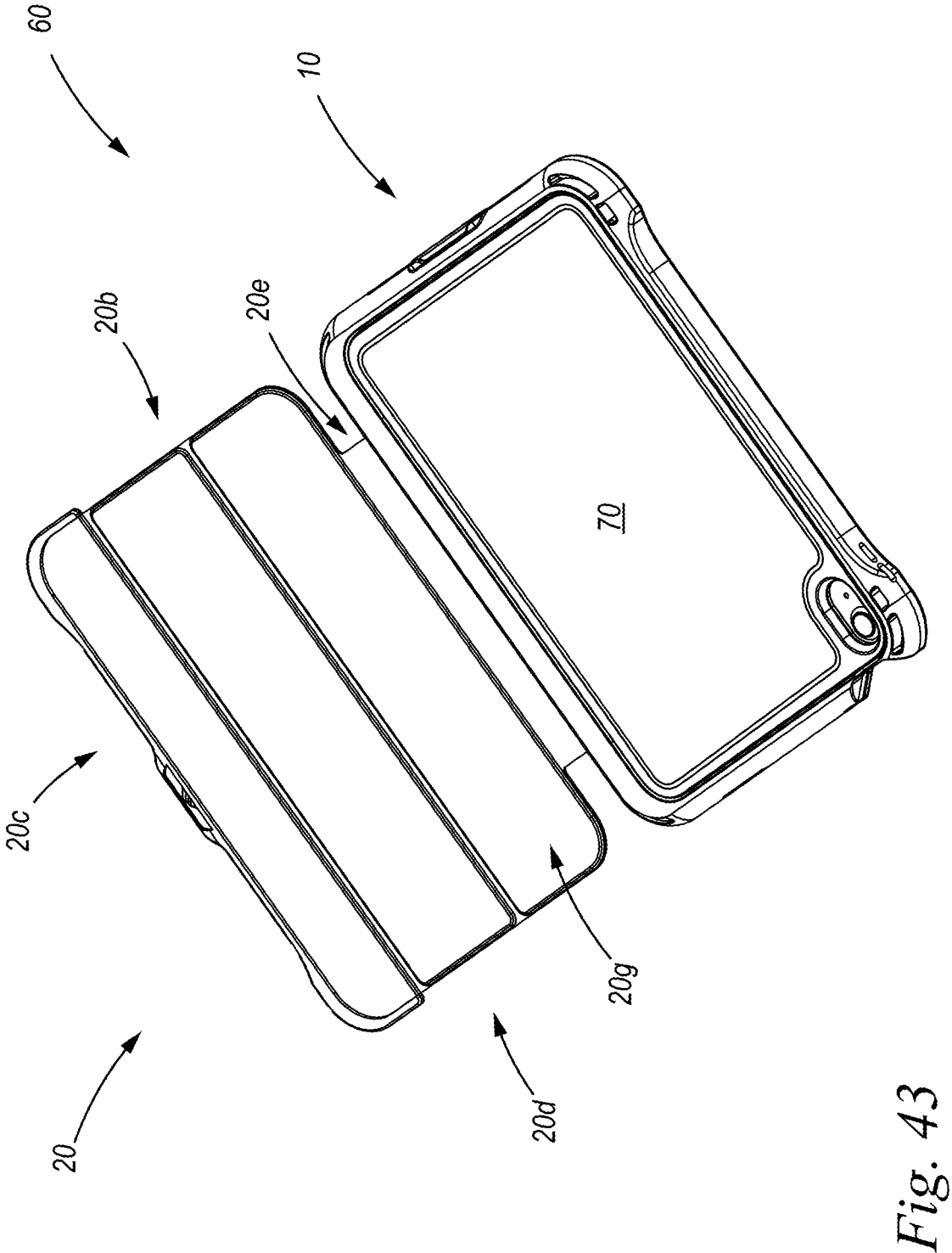
FIG. 43 is a second front perspective view of the full case-stand assembly of FIG. 33 in an open unfolded configuration.

Turning to FIG. 43, depicted therein is a second front perspective view of full case-stand assembly 60 in an open unfolded configuration.

Figure 44:
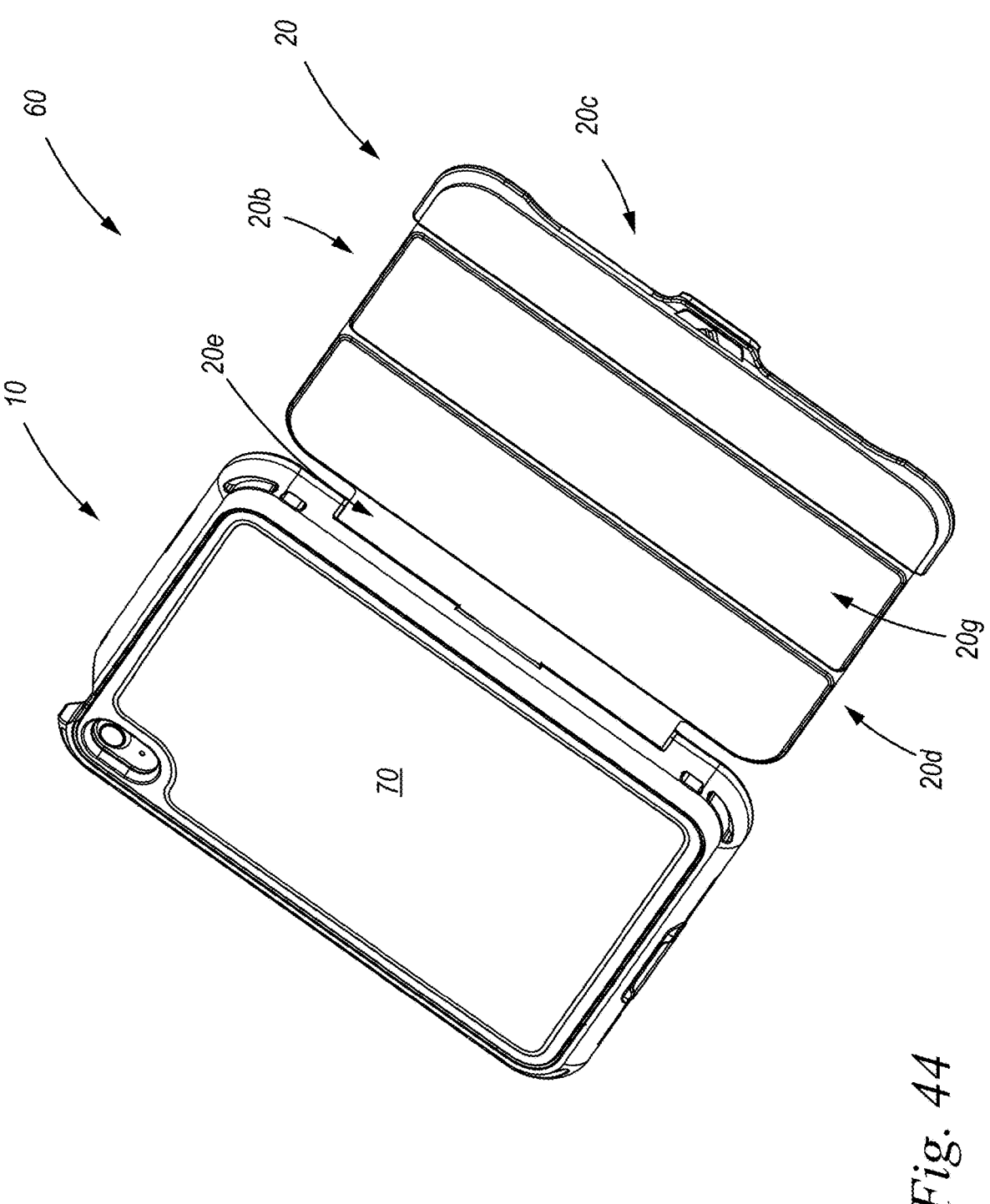
FIG. 44 is a second back perspective view of the full case-stand assembly of FIG. 33 in an open unfolded configuration.

Turning to FIG. 44, depicted therein is a second back perspective view of full case-stand assembly 60 in an open unfolded configuration.

Figure 45:
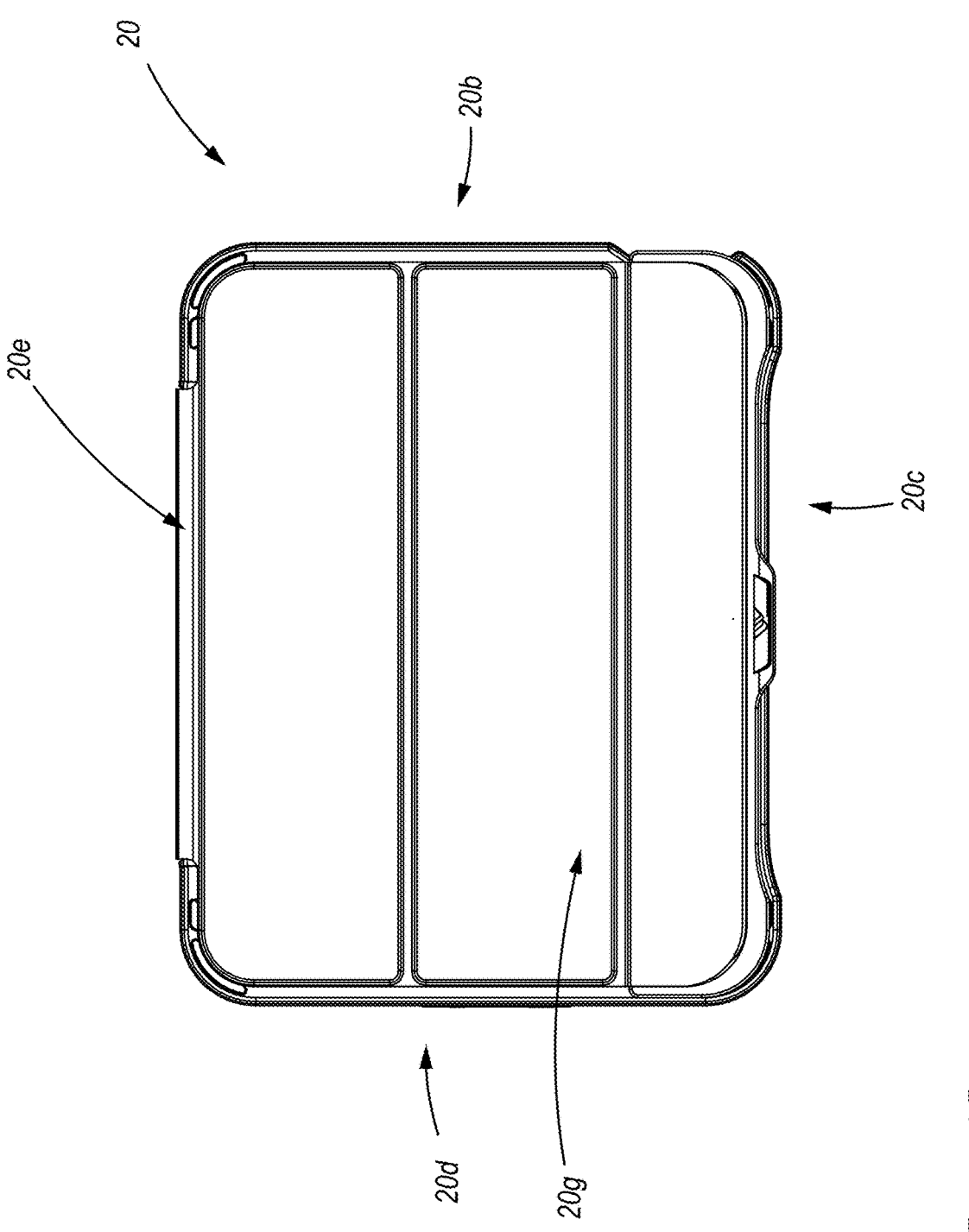
FIG. 45 is a front elevational view of the full case-stand assembly of FIG. 33 in a closed configuration.

Turning to FIG. 45, depicted therein is a front elevational view of full case-stand assembly 60 in a closed configuration.

Figure 46:
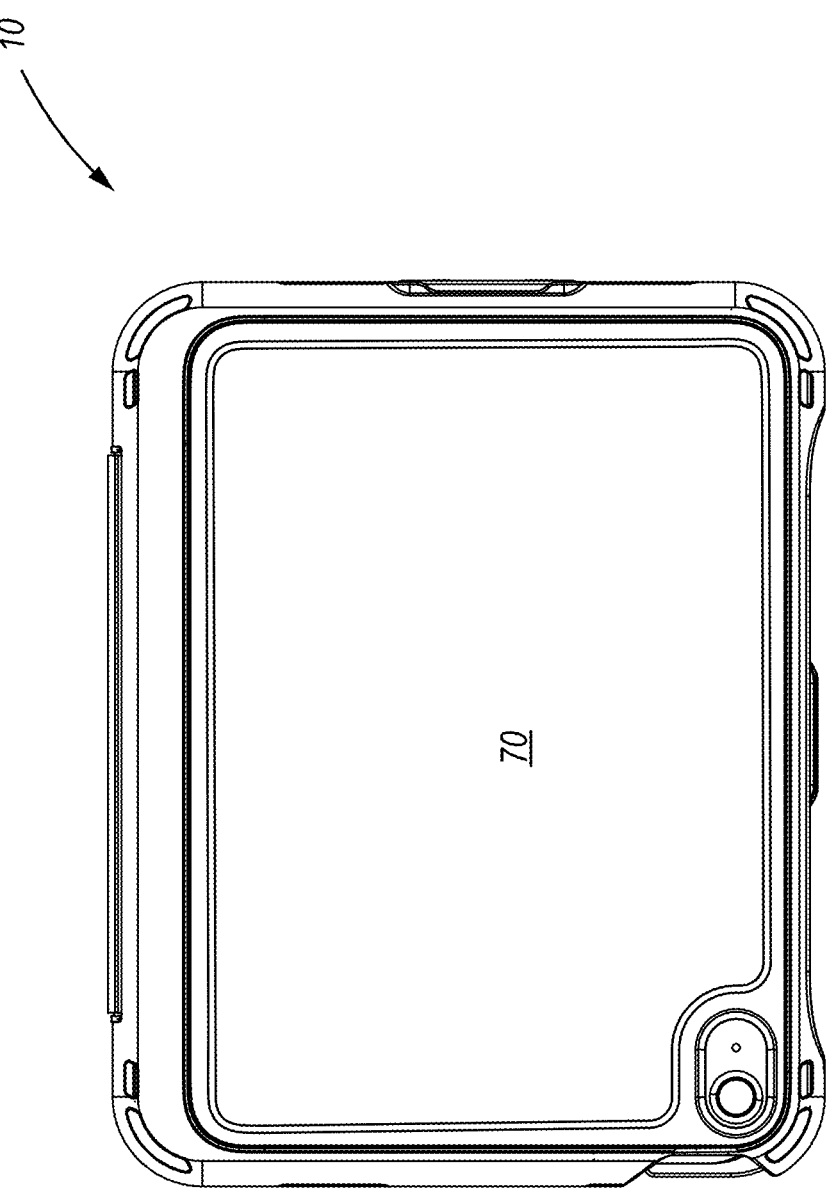
FIG. 46 is a back elevational view of the full case-stand assembly of FIG. 33 in a closed configuration.

Turning to FIG. 46, depicted therein is a back elevational view of full case-stand assembly 60 in the closed configuration.

Figure 47:
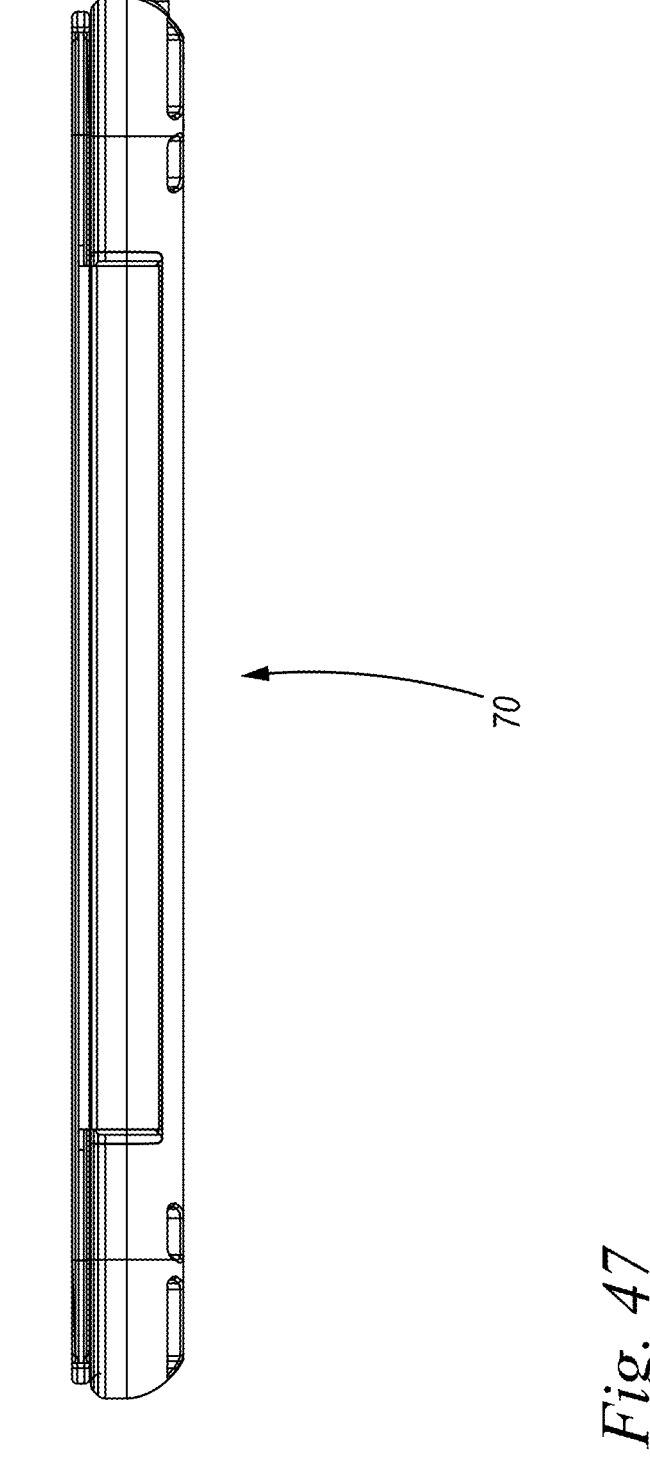
FIG. 47 is a left side elevational view of the full case-stand assembly of FIG. 33 in a closed configuration.

Turning to FIG. 47, depicted therein is a left side elevational view of full case-stand assembly 60 in the closed configuration.

Figure 48:
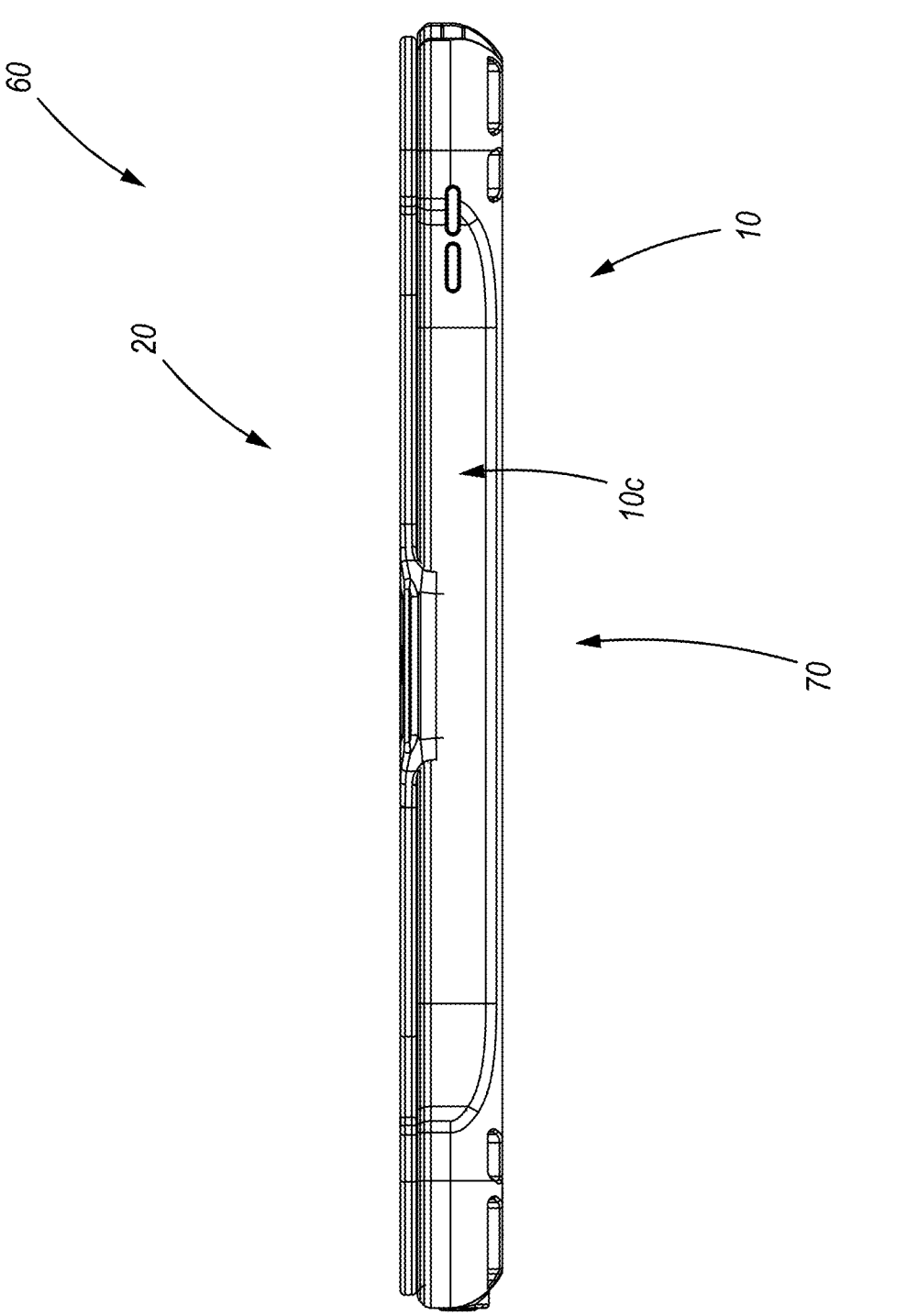
FIG. 48 is a right side elevational view of the full case-stand assembly of FIG. 33 in a closed configuration.

Turning to FIG. 48, depicted therein is a right side elevational view of full case-stand assembly 60 in the closed configuration.

Figure 49:
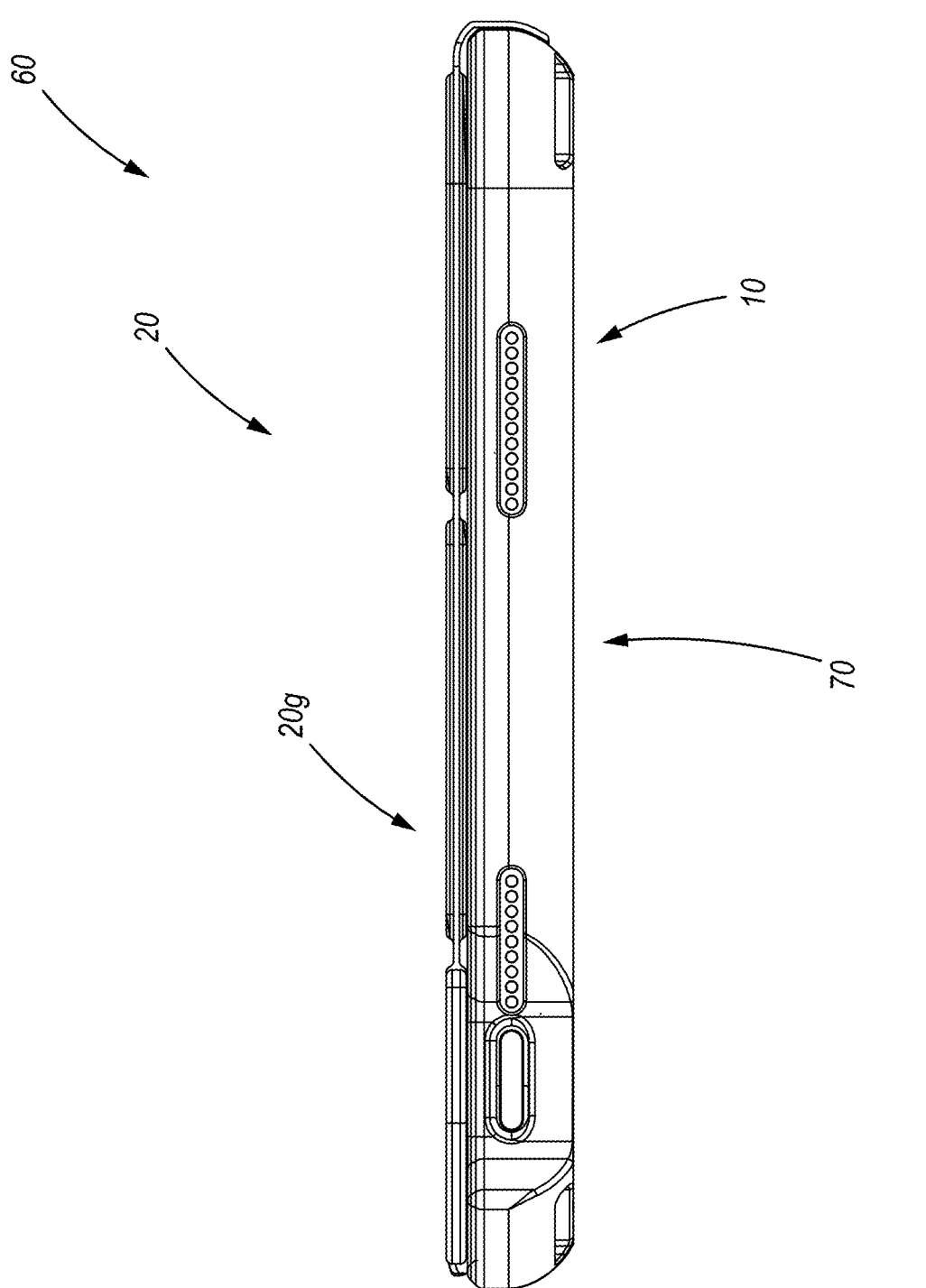
FIG. 49 is a top plan view of the full case-stand assembly of FIG. 33 in a closed configuration.

Turning to FIG. 49, depicted therein is a top plan view of full case-stand assembly 60 in the closed configuration.

Figure 50:
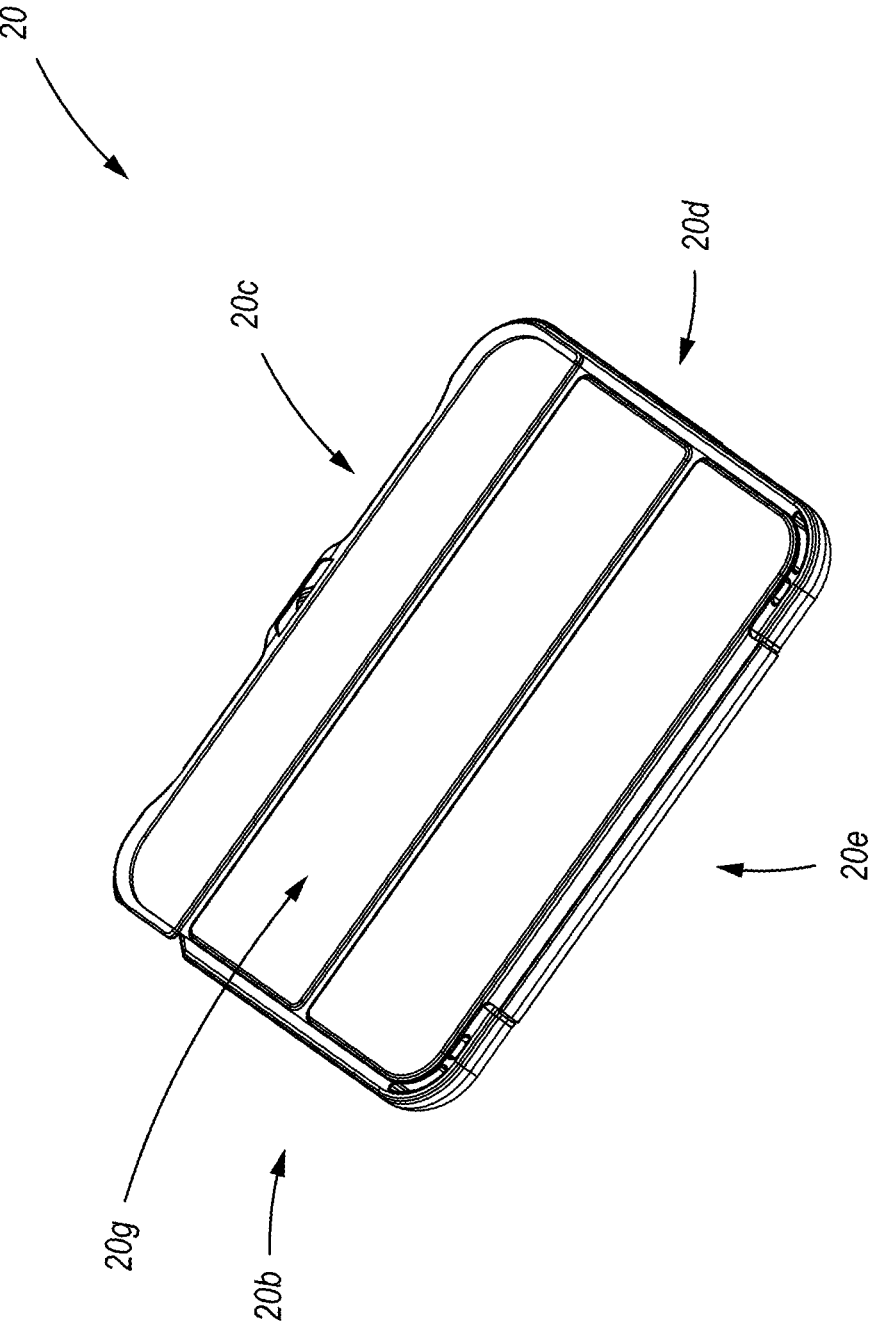
FIG. 50 is a first back perspective view of the full case-stand assembly of FIG. 33 in a closed configuration.

Turning to FIG. 50, depicted therein is a first back perspective view of full case-stand assembly 60 in the closed configuration.

Figure 51:
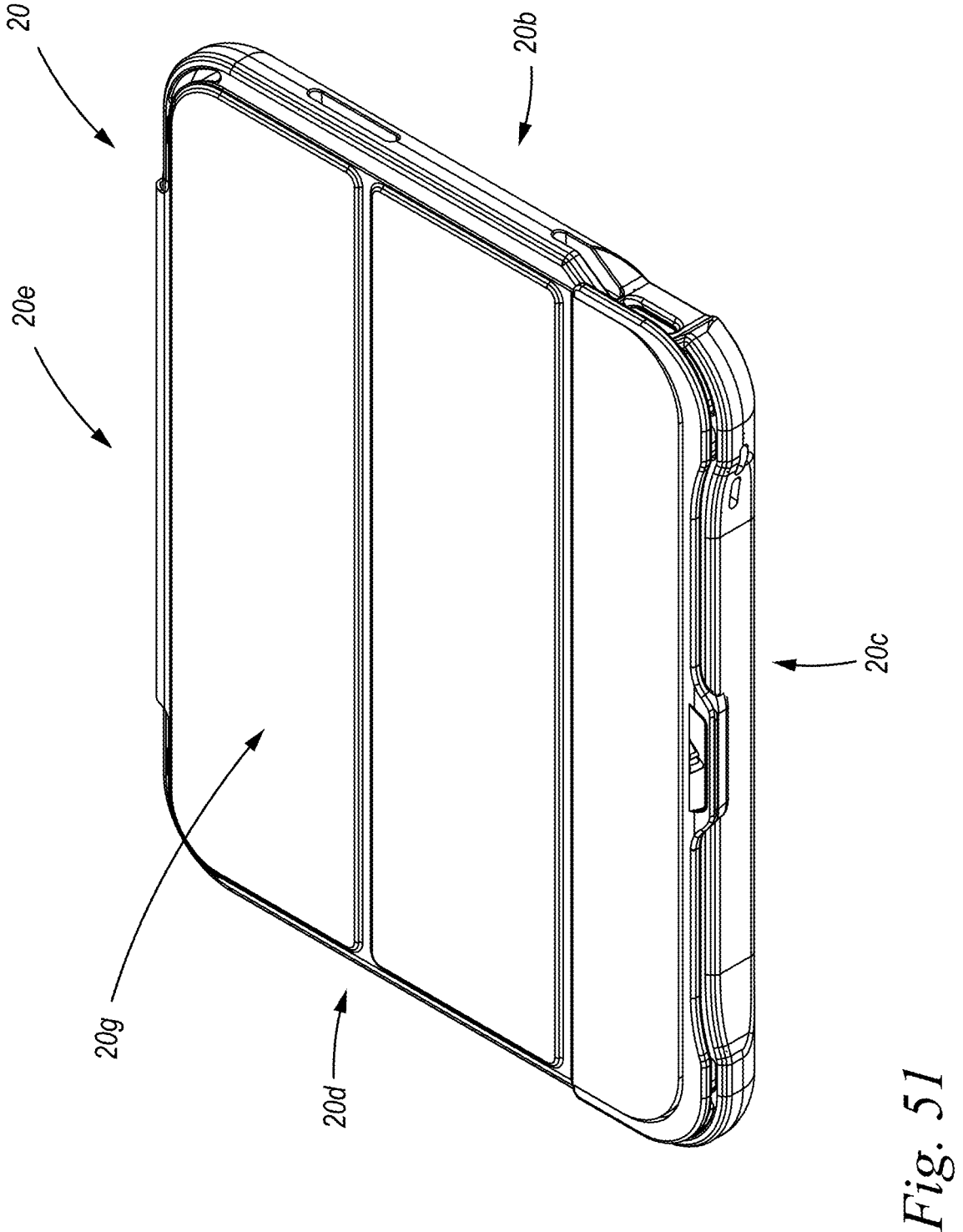
FIG. 51 is a second back perspective view of the full case-stand assembly of FIG. 33 in a closed configuration.

Turning to FIG. 51, depicted therein is a second back perspective view of full case-stand assembly 60 in the closed configuration, viewed from an alternate angle.

Figure 52:
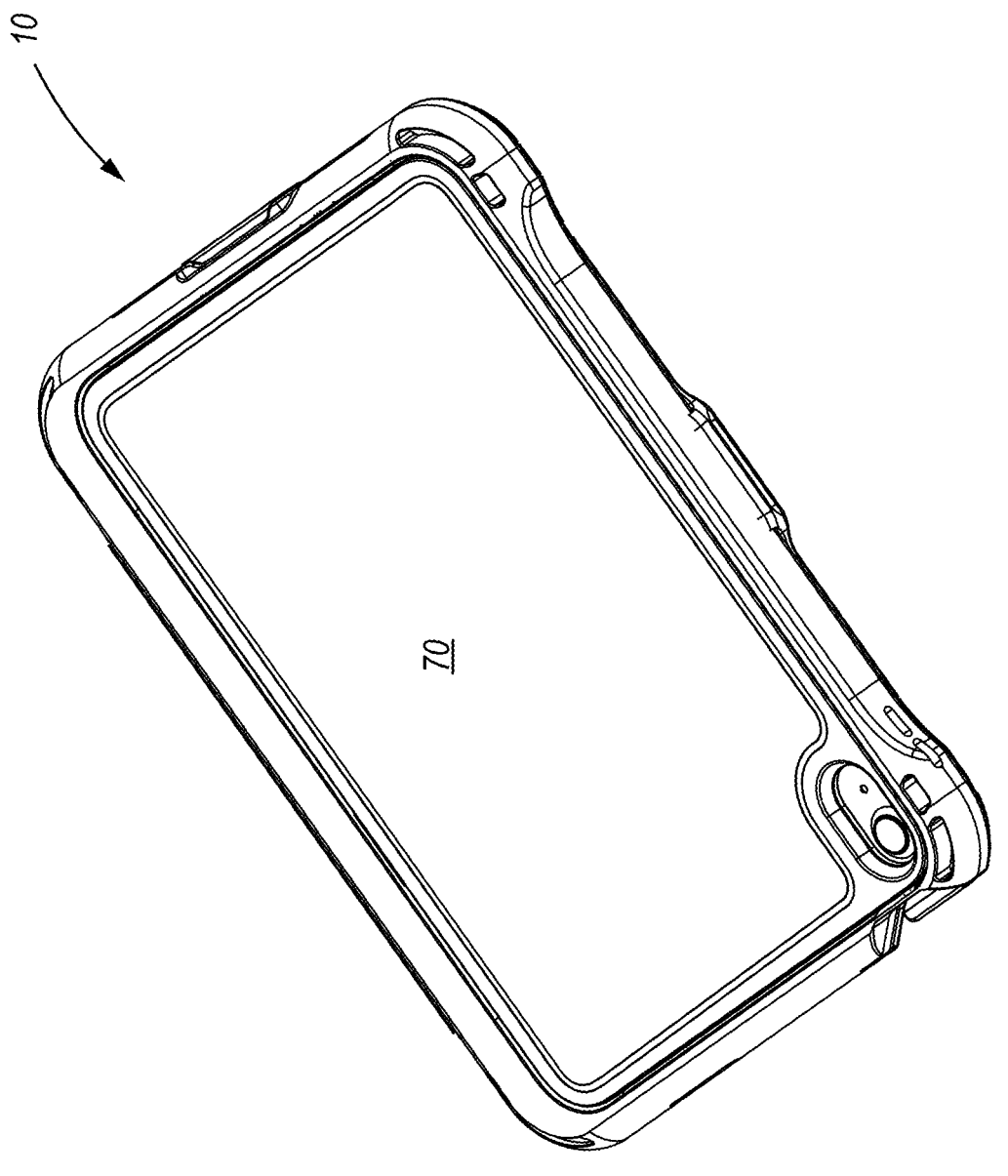
FIG. 52 is a first front perspective view of the full case-stand assembly of FIG. 33 in a closed configuration.

Turning to FIG. 52, depicted therein is a first front perspective view of full case-stand assembly 60 in the closed configuration.

Figure 53:
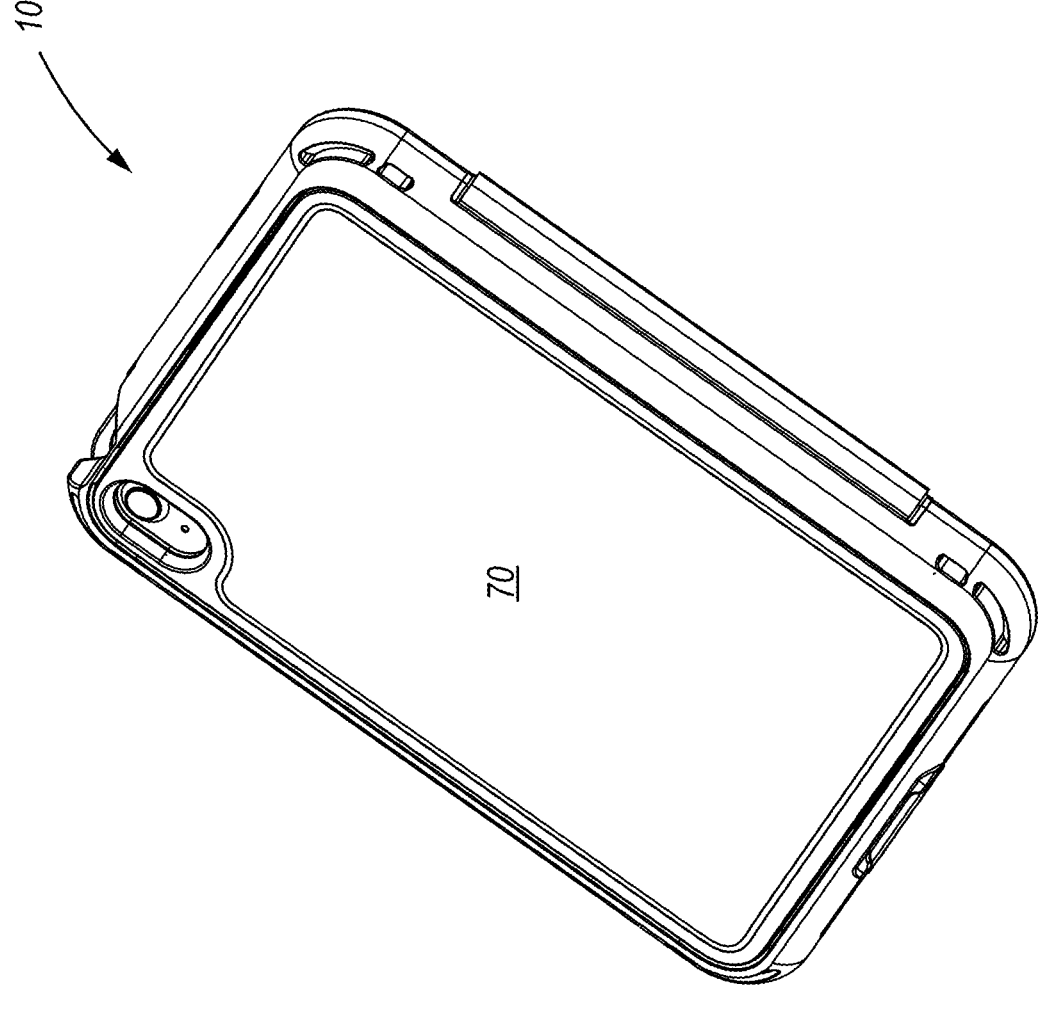
FIG. 53 is a second front perspective view of the full case-stand assembly of FIG. 33 in a closed configuration.

Turning to FIG. 53, depicted therein is a second front perspective view of full case-stand assembly 60 in the closed configuration, shown from an alternate angle.

Figure 54:
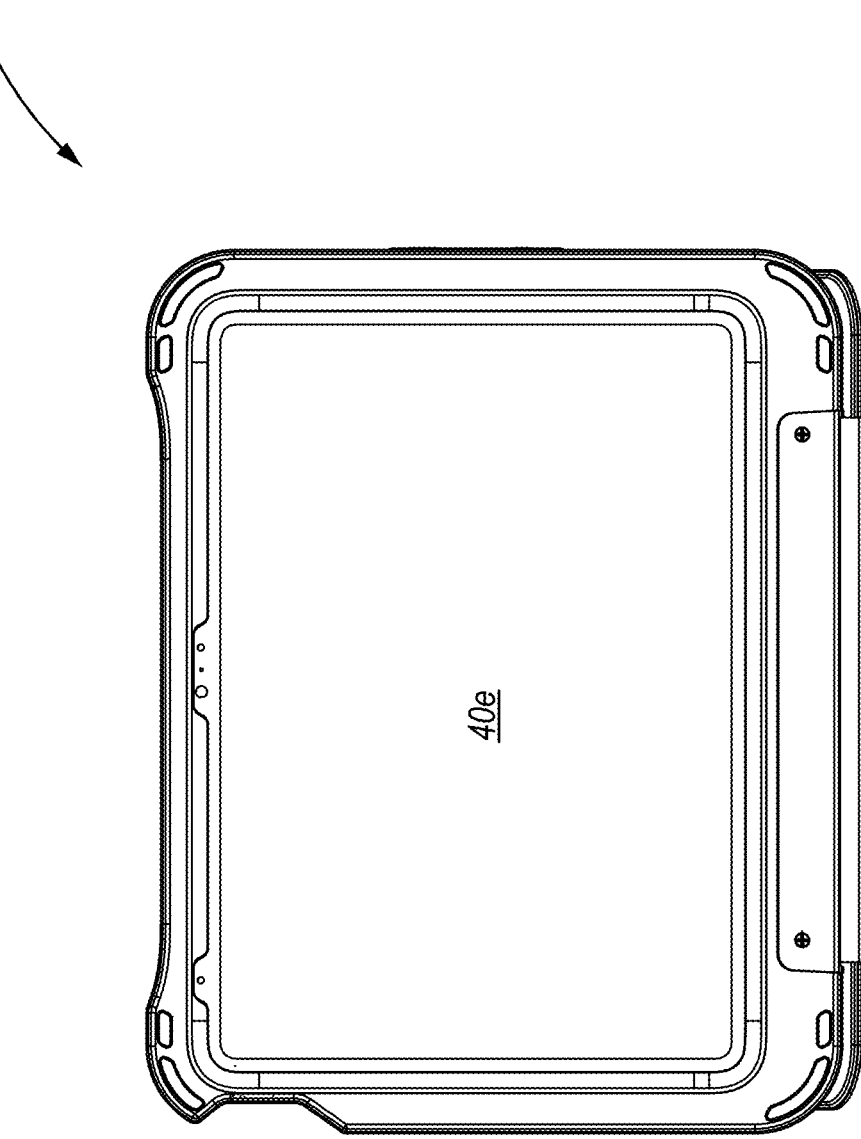
FIG. 54 is a front elevational view of the full case-stand assembly of FIG. 33 in a closed configuration.

Turning to FIG. 54, depicted therein is a front elevational view of full case-stand assembly 60 in an closed configuration.

Figure 55:
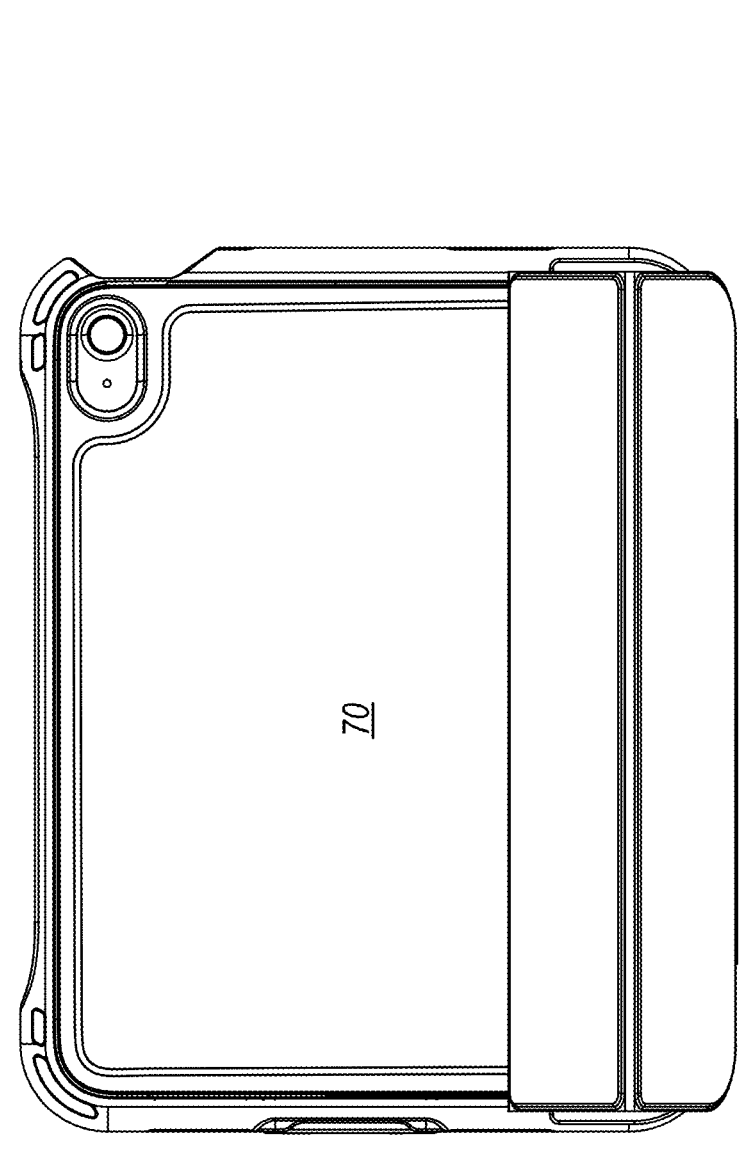
FIG. 55 is a back elevational view of the full case-stand assembly of FIG. 33 in a closed configuration.

Turning to FIG. 55, depicted therein is a back elevational view of full case-stand assembly 60 in the closed configuration.

Figure 56:
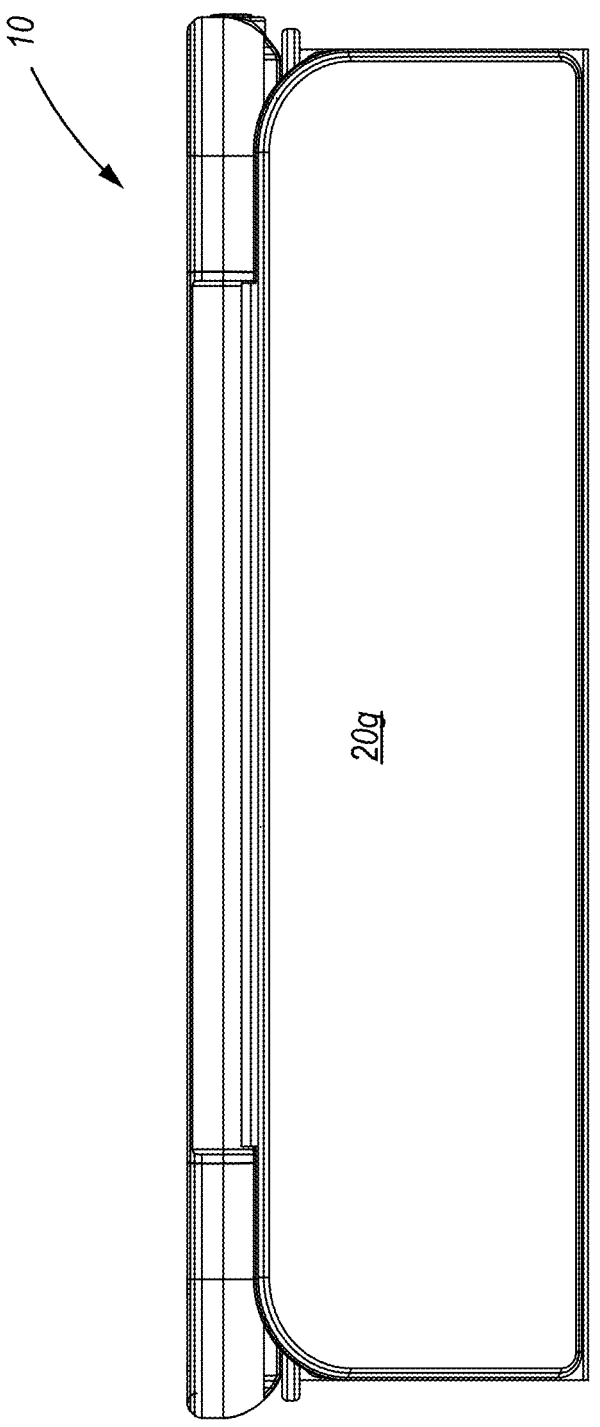
FIG. 56 is a left side elevational view of the full case-stand assembly of FIG. 33 in a closed configuration.

Turning to FIG. 56, depicted therein is a left side elevational view of full case-stand assembly 60 in the closed configuration.

Figure 57:
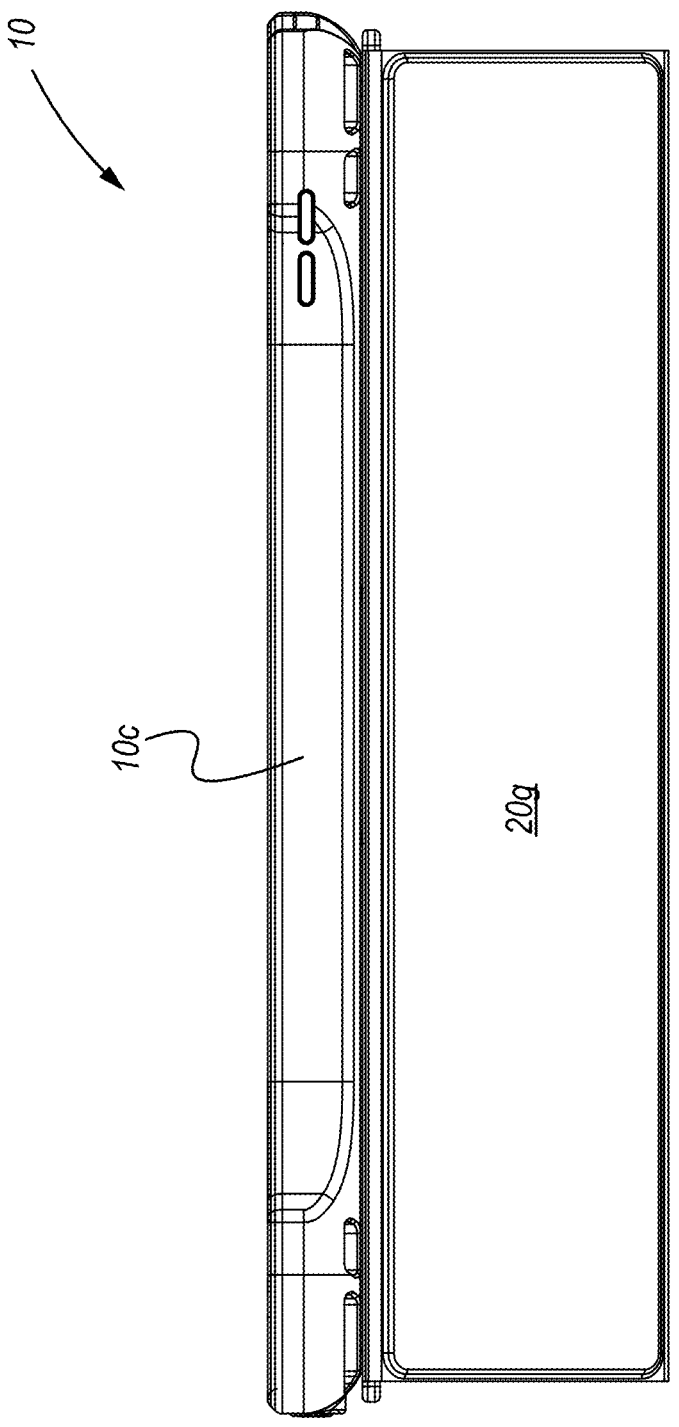
FIG. 57 is a right side elevational view of the full case-stand assembly of FIG. 33 in a closed configuration.

Turning to FIG. 57, depicted therein is a right side elevational view of full case-stand assembly 60 in the closed configuration.

Figure 58:
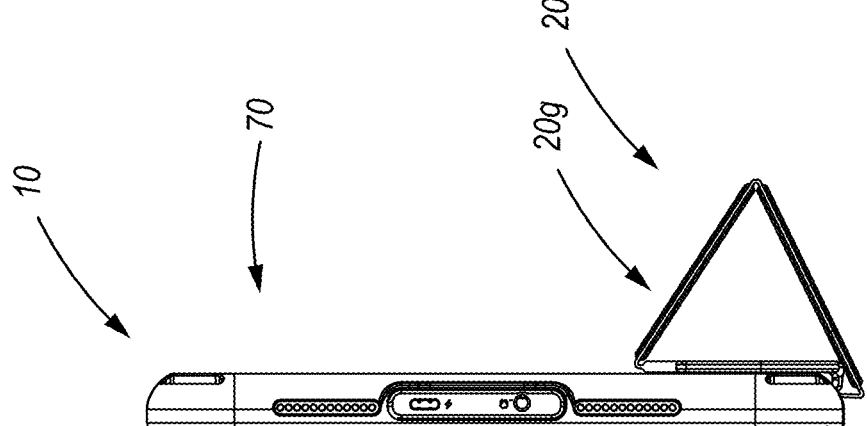
FIG. 58 is a top plan view of the full case-stand assembly of FIG. 33 in a closed configuration.

Turning to FIG. 58, depicted therein is a top plan view of full case-stand assembly 60 in the closed configuration.

Figure 59:
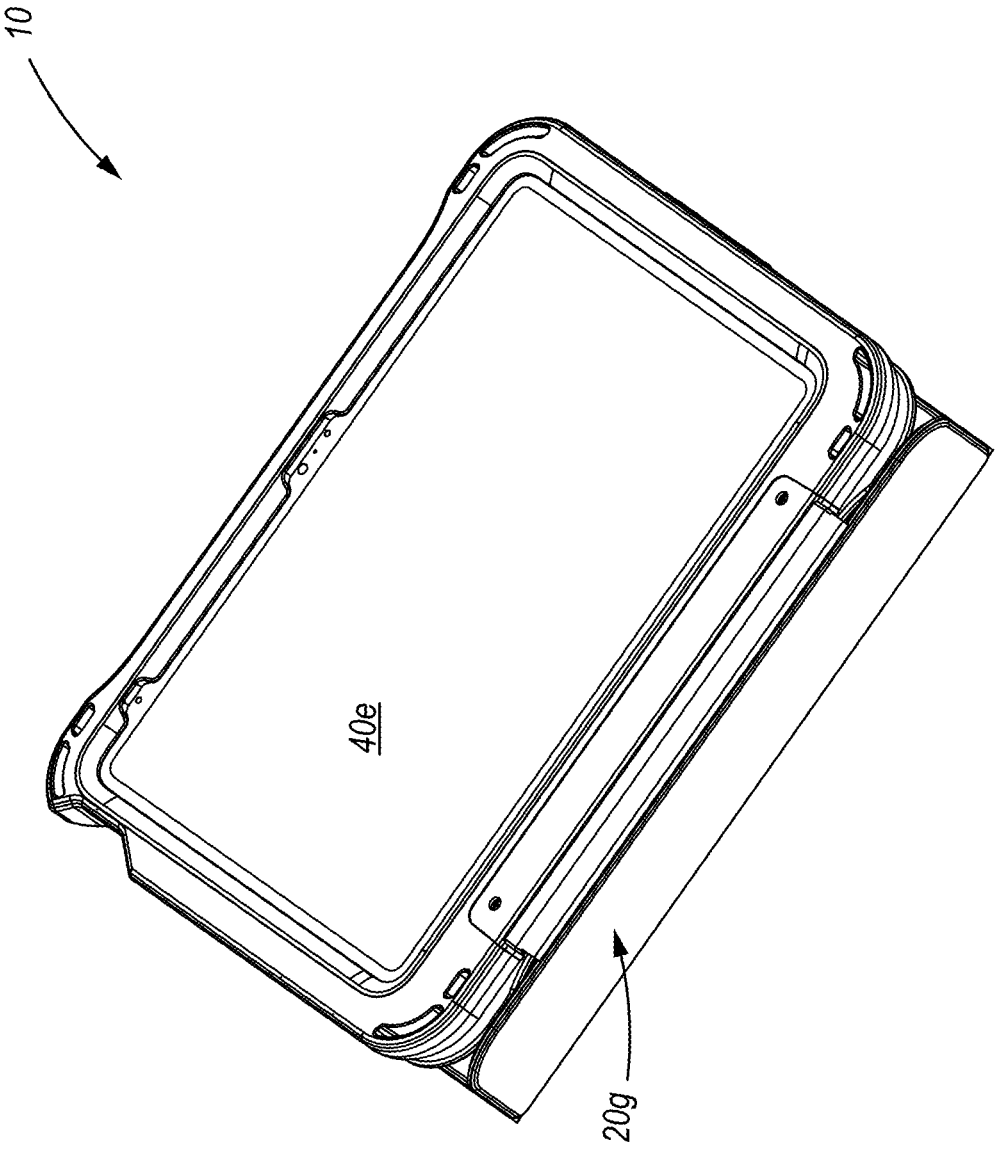
FIG. 59 is a first back perspective view of the full case-stand assembly of FIG. 33 in a closed configuration.

Turning to FIG. 59, depicted therein is a first back perspective view of full case-stand assembly 60 in the closed configuration.

Figure 60:
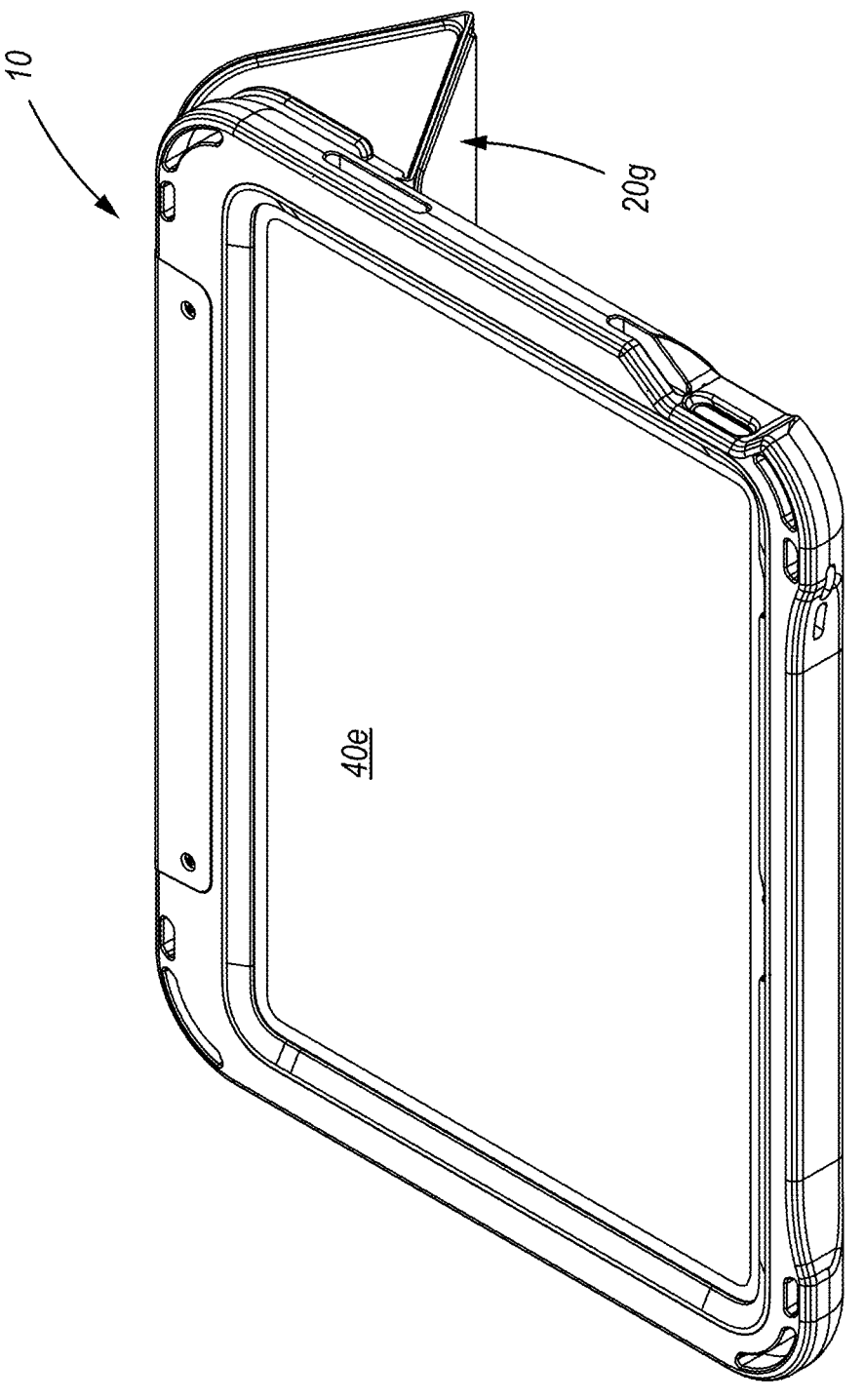
FIG. 60 is a second back perspective view of the full case-stand assembly of FIG. 33 in a closed configuration.

Turning to FIG. 60, depicted therein is a second back perspective view of full case-stand assembly 60 in the closed configuration, viewed from an alternate angle.

Figure 61:
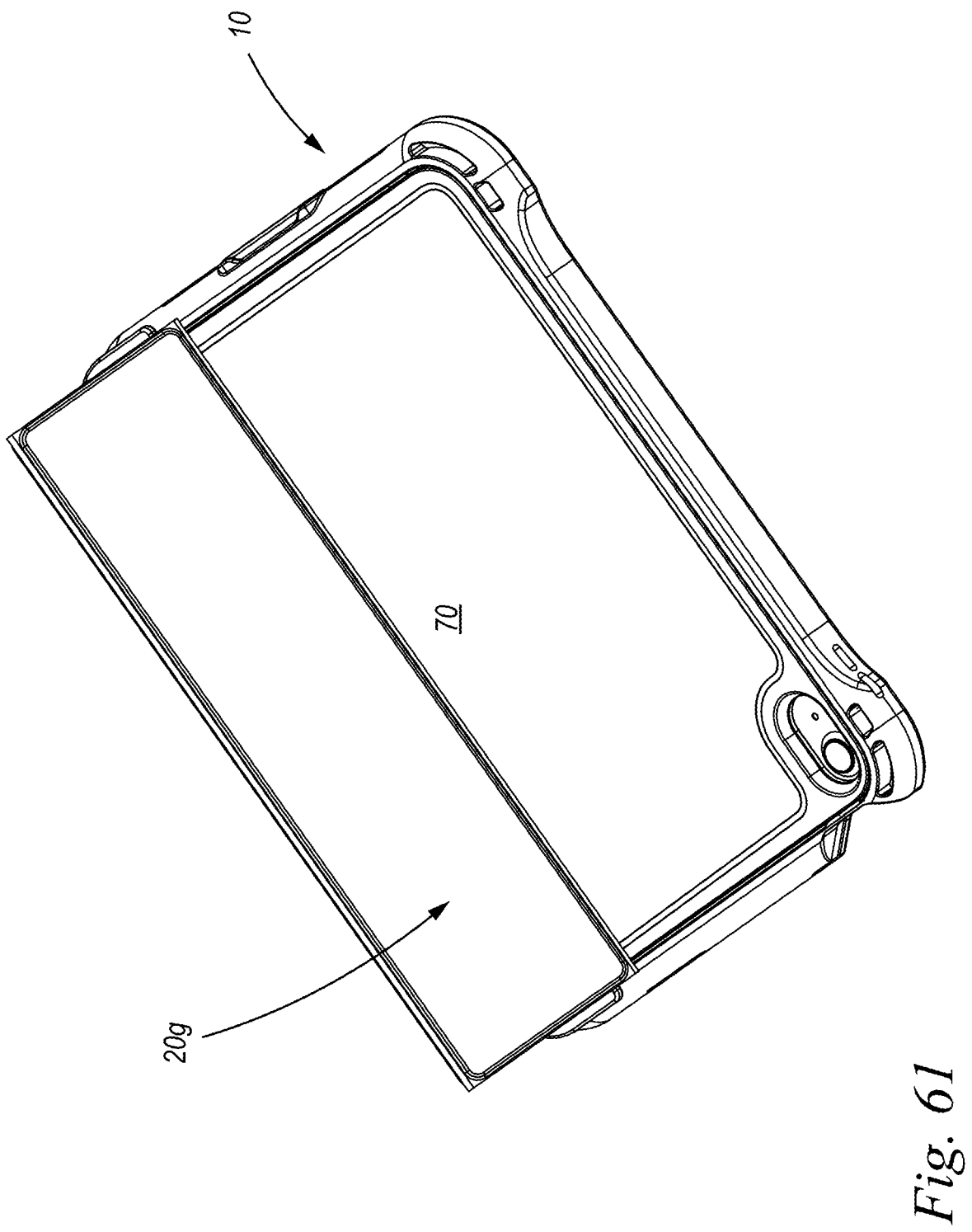
FIG. 61 is a first front perspective view of the full case-stand assembly of FIG. 33 in a closed configuration.

Turning to FIG. 61, depicted therein is a first front perspective view of full case-stand assembly 60 in the closed configuration.

Figure 62:
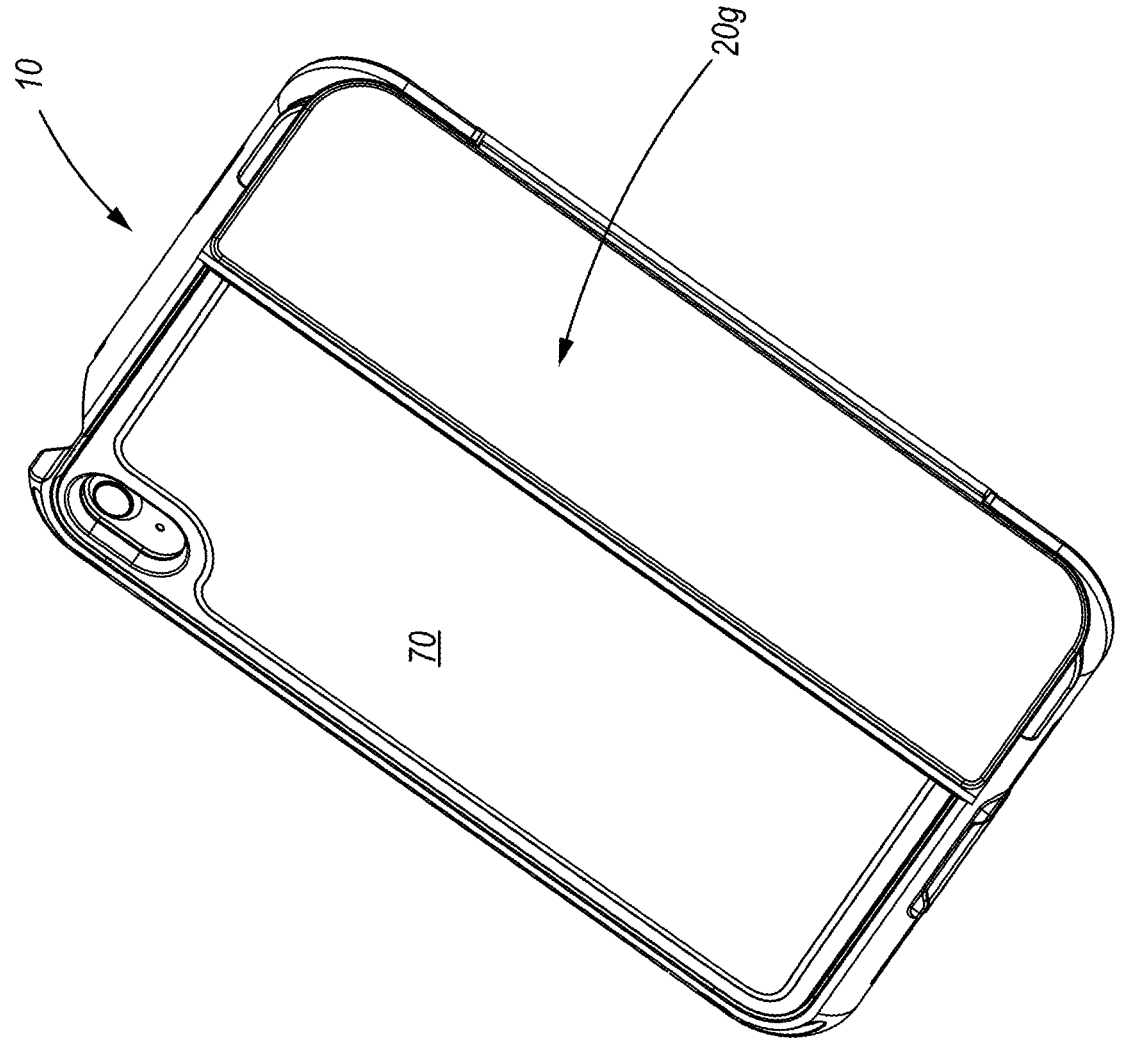
FIG. 62 is a second front perspective view of the full case-stand assembly of FIG. 33 in a closed configuration.

Turning to FIG. 62, depicted therein is a second front perspective view of full case-stand assembly 60 in the closed configuration, shown from an alternate angle.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may gen-erally be performed in any order. Also, although various operational flows are presented in a sequence(s), it should be understood that the various operations may be performed in other orders than those which are illustrated, or may be performed concurrently. Examples of such alternate order-ings may include overlapping, interleaved, interrupted, reor-dered, incremental, preparatory, supplemental, simultane-ous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case system for a portable electronic device, the system comprising:

I. a frame assembly including:

A. side portions each having a flange portion,

B. a recessed structure defined by end portions, a back portion, and a base portion, C. a standoff plurality including standoffs extending upward from the base portion, D. a tab plurality including tabs positioned between the standoffs, and E. an edge portion along the recessed structure; and II. a stand assembly including:

A. side portions,

B. a coupling structure having a first aperture plurality arranged to receive the standoff plurality and a second aperture plurality arranged to receive the tab plurality, C. a front portion including front panel portions separated by front crease portions, and D. a back portion including back panel portions separated by back crease portions, wherein the frame assembly is couplable with the portable electronic device, wherein the stand assembly is removably coupled to the recessed structure via the coupling structure and is retained in the recessed structure by the standoff plu-rality and the tab plurality, wherein the tabs of the tab plurality are positioned between adjacent standoffs of the standoff plurality, wherein the standoff plurality extends upward from the base portion to overlie the coupling structure, and wherein the coupling structure is seated on the base portion between the standoff plurality and the tab plurality.

2. The case system of claim 1, further including a trim assembly, wherein the trim assembly includes side portions defining an outer surface having boss members arranged to engage selected standoffs of the standoff plurality, and wherein the standoff plurality is positioned on the base portion adjacent the edge portion.

3. The case system of claim 2, wherein the tabs engage corresponding portions of the stand assembly.

4. The case system of claim 1, wherein the flange portions extend inward over the recessed structure.

5. The case system of claim 2, wherein the boss members comprise first and second boss members.

6. The case system of claim 1, wherein the front panel portions and the back panel portions are foldable about the front crease portions and the back crease portions.

7. The case system of claim 6, wherein the coupling structure and the recessed structure are configured for removable engagement.

8. The case system of claim 1, wherein the portable electronic device has a display exposed through the frame assembly.

9. A case system for a portable electronic device, the system comprising:

I. a frame assembly having a recessed structure including a standoff plurality and a tab plurality; and II. a stand assembly having a coupling structure with a first aperture plurality arranged to receive the standoff plurality and a second aperture plurality arranged to receive the tab plurality, wherein the frame assembly is couplable with the portable electronic device, and wherein the stand assembly is removably coupled to the recessed structure by engagement of the standoff plurality and the tab plurality with the first aperture plurality and the second aperture plurality, further including a trim assembly coupled to the frame assembly by engagement of boss members with the standoff plurality, wherein the coupling structure is received in the recessed structure and seated on a base portion thereof, wherein tabs of the tab plurality are positioned between adjacent standoffs of the standoff plurality, wherein the standoff plurality extends upward from the base portion of the recessed structure to overlie the coupling structure, and wherein the coupling structure is seated on the base portion between the standoff plurality and the tab plurality.

10. The case system of claim 9, wherein the boss members are dimensioned to engage a pair of standoffs.

11. The case system of claim 9, wherein the stand assembly includes a front portion and a back portion foldable along front crease portions and back crease portions.

12. The case system of claim 10, wherein the recessed structure includes a base portion and an edge portion.

13. The case system of claim 12, wherein the frame assembly includes side portions each having a flange portion.

14. The case system of claim 11, wherein the front portion includes first, second, and third front panel portions separated by first and second front crease portions, and the back portion includes first, second, and third back panel portions separated by first and second back crease portions.

15. A case system for a portable electronic device, the system comprising:

I. a frame assembly including a recessed structure having a base portion, a standoff plurality extending from the base portion, and a tab plurality positioned relative to the standoff plurality;

II. a stand assembly including a coupling structure with apertures dimensioned for engagement with the standoff plurality and the tab plurality; and III. a trim assembly including boss members configured to engage selected standoffs of the standoff plurality, wherein the frame assembly is couplable with the portable electronic device, and wherein the stand assembly and the trim assembly are removable from the recessed structure while the portable electronic device remains coupled with the frame assembly, wherein the coupling structure is received in the recessed structure, wherein the tab plurality is positioned between adjacent standoffs of the standoff plurality, wherein the standoff plurality extends upward from the base portion to overlie the coupling structure, and wherein the coupling structure is seated on the base portion between the standoff plurality and the tab plurality.

16. The case system of claim 15, wherein the stand assembly includes stand assembly includes side portions, one of the side portions including a frame member and a latch member.

17. The case system of claim 15, wherein standoffs of the standoff plurality include central threaded holes dimensioned to receive threaded fasteners.

18. The case system of claim 16, wherein tabs of the tab plurality extend upward from the base portion.

19. The case system of claim 17, wherein the the standoffs are arranged in a distributed array across the recessed structure.

20. The case system of claim 19, wherein the the trim assembly includes side portions defining an outer surface.

\* \* \* \* \*